United States Patent
Kim et al.

(10) Patent No.: US 9,344,221 B2
(45) Date of Patent: May 17, 2016

(54) INTERLEAVING AND DEINTERLEAVING METHOD

(71) Applicant: NEWRACOM, INC., Irvine, CA (US)

(72) Inventors: Jeehoon Kim, Daejeon (KR); Jongee Oh, Irvine, CA (US); Jeongchul Shin, Daejeon (KR); Hyoungjin Kwon, Daejeon (KR)

(73) Assignee: NEWRACOM, INC., Irvine, CA (US)

( * ) Notice: Subject to any disclaimer, the term of this patent is extended or adjusted under 35 U.S.C. 154(b) by 0 days.

(21) Appl. No.: 14/700,031

(22) Filed: Apr. 29, 2015

(65) Prior Publication Data

US 2015/0326351 A1  Nov. 12, 2015

Related U.S. Application Data

(60) Provisional application No. 61/985,981, filed on Apr. 29, 2014.

(30) Foreign Application Priority Data

Apr. 21, 2015 (KR) .................. 10-2015-0055779

(51) Int. Cl.
*H04L 1/00* (2006.01)
*H04W 84/12* (2009.01)

(52) U.S. Cl.
CPC ............. *H04L 1/0071* (2013.01); *H04W 84/12* (2013.01)

(58) Field of Classification Search
CPC ........ H04L 1/0071; H04L 1/0681; H04L 1/06
See application file for complete search history.

(56) References Cited

U.S. PATENT DOCUMENTS

| | | | |
|---|---|---|---|
| 2005/0152473 A1* | 7/2005 | Maltsev et al. | 375/299 |
| 2007/0022262 A1* | 1/2007 | Lee | H03M 13/276 711/157 |
| 2007/0043982 A1* | 2/2007 | Arivoli et al. | 714/701 |
| 2007/0110180 A1* | 5/2007 | Hammerschmidt et al. | 375/267 |
| 2009/0100300 A1* | 4/2009 | Kim et al. | 714/702 |
| 2010/0311432 A1* | 12/2010 | Lauer et al. | 455/450 |
| 2011/0161782 A1* | 6/2011 | Engin | G11C 7/1042 714/763 |
| 2012/0327868 A1* | 12/2012 | Taghavi Nasrabadi et al. | 370/329 |
| 2013/0156124 A1* | 6/2013 | Wang | H04L 1/0071 375/267 |

OTHER PUBLICATIONS

"Part 11: Wireless LAN Medium Access Control (MAC) and Physical layer (PHY) Specifications", IEEE Standards 802.11™-2012 (Revision of IEEE Standard 802.11-2007), Mar. 29, 2012, pp. 1-2695, IEEE (The Institute of Electrical and Electronic Engineers, Inc.), New York, NY, USA.

(Continued)

*Primary Examiner* — Aristocratis Fotakis

(57) ABSTRACT

An interleaving method by a transmitting device is provided. The transmitting device divides a bandwidth into a plurality of bands, and divides an interleaver matrix into a plurality of matrices corresponding to the plurality of bands respectively in a predetermined direction. Next, the transmitting device arranges data of a user assigned to a corresponding band among the plurality of bands in each matrix of the plurality of matrices.

17 Claims, 72 Drawing Sheets

(56) References Cited

OTHER PUBLICATIONS

"Part 11: Wireless LAN Medium Access Control (MAC) and Physical Layer (PHY) Specifications, Amendment 4: Enhancements for Very High Throughput for Operation in Bands below 6 GHz", IEEE Standards 802.11ac™-2013, 2013, pp. 1-395, IEEE (The Institute of Electrical and Electronic Engineers, Inc.), New York, NY, USA.

"Part 11: Wireless LAN Medium Access Control (MAC) and Physical Layer (PHY) Specifications, Amendment 2: Sub 1 GHz License Exempt Operation", IEEE P802.11ah™/D.5.0, Mar. 2015, pp. 1-604, IEEE (The Institute of Electical and Electronic Engineers, Inc.), New York, NY, USA.

* cited by examiner

FIG. 12

| SC idx | Object |
|---|---|
| -32 | Guard |
| -31 | Guard |
| -30 | Guard |
| -29 | Guard |
| -28 | |
| -27 | |
| -26 | |
| -25 | |
| -24 | |
| -23 | |
| -22 | |
| -21 | Pilot |
| -20 | |
| -19 | |
| -18 | |
| -17 | |
| -16 | |
| -15 | |
| -14 | |
| -13 | |
| -12 | |
| -11 | |
| -10 | |
| -9 | |
| -8 | |
| -7 | Pilot |
| -6 | |
| -5 | |
| -4 | |
| -3 | |
| -2 | |
| -1 | |

| SC idx | Object |
|---|---|
| 0 | DC |
| 1 | |
| 2 | |
| 3 | |
| 4 | |
| 5 | |
| 6 | |
| 7 | Pilot |
| 8 | |
| 9 | |
| 10 | |
| 11 | |
| 12 | |
| 13 | |
| 14 | |
| 15 | |
| 16 | |
| 17 | |
| 18 | |
| 19 | |
| 20 | |
| 21 | Pilot |
| 22 | |
| 23 | |
| 24 | |
| 25 | |
| 26 | |
| 27 | |
| 28 | |
| 29 | Guard |
| 30 | Guard |
| 31 | Guard |

FIG. 13

| SC idx | Object |
|---|---|
| -64 | Guard |
| -63 | Guard |
| -66 | Guard |
| -61 | Guard |
| -60 | Guard |
| -59 | Guard |
| -58 | |
| -57 | |
| -56 | |
| -55 | |
| -54 | |
| -53 | Pilot |
| -52 | |
| -51 | |
| -50 | |
| -49 | |
| -48 | |
| -47 | |
| -46 | |
| -45 | |
| -44 | |
| -43 | |
| -42 | |
| -41 | |
| -40 | |
| -39 | |
| -38 | |
| -37 | |
| -36 | |
| -35 | |
| -34 | |
| -33 | |

| SC idx | Object |
|---|---|
| -32 | |
| -31 | |
| -30 | |
| -29 | |
| -28 | |
| -27 | |
| -26 | |
| -25 | Pilot |
| -24 | |
| -23 | |
| -22 | |
| -21 | |
| -20 | |
| -19 | |
| -18 | |
| -17 | |
| -16 | |
| -15 | |
| -14 | |
| -13 | |
| -12 | |
| -11 | Pilot |
| -10 | |
| -9 | |
| -8 | |
| -7 | |
| -6 | |
| -5 | |
| -4 | |
| -3 | |
| -2 | |
| -1 | DC |

| SC idx | Object |
|---|---|
| 0 | DC |
| 1 | DC |
| 2 | |
| 3 | |
| 4 | |
| 5 | |
| 6 | |
| 7 | |
| 8 | |
| 9 | |
| 10 | |
| 11 | Pilot |
| 12 | |
| 13 | |
| 14 | |
| 15 | |
| 16 | |
| 17 | |
| 18 | |
| 19 | |
| 20 | |
| 21 | |
| 22 | |
| 23 | |
| 24 | |
| 25 | Pilot |
| 26 | |
| 27 | |
| 28 | |
| 29 | |
| 30 | |
| 31 | |

| SC idx | Object |
|---|---|
| 32 | |
| 33 | |
| 34 | |
| 35 | |
| 36 | |
| 37 | |
| 38 | |
| 39 | |
| 40 | |
| 41 | |
| 42 | |
| 43 | |
| 44 | |
| 45 | |
| 46 | |
| 47 | |
| 48 | |
| 49 | |
| 50 | |
| 51 | |
| 52 | |
| 53 | Pilot |
| 54 | |
| 55 | |
| 56 | |
| 57 | |
| 58 | |
| 59 | Guard |
| 60 | Guard |
| 61 | Guard |
| 62 | Guard |
| 63 | Guard |

FIG. 14

| SC idx | Object | SC idx | Object | SC idx | Object | SC idx | Object | SC idx | Object | SC idx | Object | SC idx | Object | SC idx | Object |
|---|---|---|---|---|---|---|---|---|---|---|---|---|---|---|---|
| -128 | Guard | -96 |  | -64 |  | -32 |  | 0 | DC | 32 |  | 64 |  | 96 |  |
| -127 | Guard | -95 |  | -63 |  | -31 |  | 1 | DC | 33 |  | 65 |  | 97 |  |
| -126 | Guard | -94 |  | -66 |  | -30 |  | 2 |  | 34 |  | 66 |  | 98 |  |
| -125 | Guard | -93 |  | -61 |  | -29 |  | 3 |  | 35 |  | 67 |  | 99 |  |
| -124 | Guard | -92 |  | -60 |  | -28 |  | 4 |  | 36 |  | 68 |  | 100 |  |
| -123 | Guard | -91 |  | -59 |  | -27 |  | 5 |  | 37 |  | 69 |  | 101 |  |
| -122 |  | -90 |  | -58 |  | -26 |  | 6 |  | 38 |  | 70 |  | 102 |  |
| -121 |  | -89 |  | -57 |  | -25 |  | 7 |  | 39 | Pilot | 71 |  | 103 | Pilot |
| -120 |  | -88 |  | -56 |  | -24 |  | 8 |  | 40 |  | 72 |  | 104 |  |
| -119 |  | -87 |  | -55 |  | -23 |  | 9 |  | 41 |  | 73 |  | 105 |  |
| -118 |  | -86 |  | -54 |  | -22 |  | 10 |  | 42 |  | 74 |  | 106 |  |
| -117 |  | -85 |  | -53 |  | -21 |  | 11 | Pilot | 43 |  | 75 | Pilot | 107 |  |
| -116 |  | -84 |  | -52 |  | -20 |  | 12 |  | 44 |  | 76 |  | 108 |  |
| -115 |  | -83 |  | -51 |  | -19 |  | 13 |  | 45 |  | 77 |  | 109 |  |
| -114 |  | -82 |  | -50 |  | -18 |  | 14 |  | 46 |  | 78 |  | 110 |  |
| -113 |  | -81 |  | -49 |  | -17 |  | 15 |  | 47 |  | 79 |  | 111 |  |
| -112 |  | -80 |  | -48 |  | -16 |  | 16 |  | 48 |  | 80 |  | 112 |  |
| -111 |  | -79 |  | -47 |  | -15 |  | 17 |  | 49 |  | 81 |  | 113 |  |
| -110 |  | -78 |  | -46 |  | -14 |  | 18 |  | 50 |  | 82 |  | 114 |  |
| -109 |  | -77 |  | -45 |  | -13 |  | 19 |  | 51 |  | 83 |  | 115 |  |
| -108 |  | -76 |  | -44 |  | -12 |  | 20 |  | 52 |  | 84 |  | 116 |  |
| -107 |  | -75 | Pilot | -43 |  | -11 | Pilot | 21 |  | 53 |  | 85 |  | 117 |  |
| -106 |  | -74 |  | -42 |  | -10 |  | 22 |  | 54 |  | 86 |  | 118 |  |
| -105 |  | -73 |  | -41 |  | -9 |  | 23 |  | 55 |  | 87 |  | 119 |  |
| -104 |  | -72 |  | -40 |  | -8 |  | 24 |  | 56 |  | 88 |  | 120 |  |
| -103 | Pilot | -71 |  | -39 | Pilot | -7 |  | 25 |  | 57 |  | 89 |  | 121 |  |
| -102 |  | -70 |  | -38 |  | -6 |  | 26 |  | 58 |  | 90 |  | 122 |  |
| -101 |  | -69 |  | -37 |  | -5 |  | 27 |  | 59 |  | 91 |  | 123 | Guard |
| -100 |  | -68 |  | -36 |  | -4 |  | 28 |  | 60 |  | 92 |  | 124 | Guard |
| -99 |  | -67 |  | -35 |  | -3 |  | 29 |  | 61 |  | 93 |  | 125 | Guard |
| -98 |  | -66 |  | -34 |  | -2 |  | 30 |  | 66 |  | 94 |  | 126 | Guard |
| -97 |  | -65 |  | -33 |  | -1 | DC | 31 |  | 63 |  | 95 |  | 127 | Guard |

FIG. 15

Pseudo DC

| SC idx | | Object | SC idx | | Object | SC idx | | Object | SC idx | | Object | SC idx | | Object | SC idx | | Object |
|---|---|---|---|---|---|---|---|---|---|---|---|---|---|---|---|---|---|
| All | Part | | All | Part | | All | Part | | All | Part | | All | Part | | All | Part | |
| -96 | -32 | Guard | -64 | 0 | | -32 | -32 | | 0 | 0 | DC | 32 | -32 | | 64 | 0 | |
| -95 | -31 | Guard | -63 | 1 | | -31 | -31 | | 1 | 1 | DC | 33 | -31 | | 65 | 1 | |
| -94 | -30 | Guard | -66 | 2 | | -30 | -30 | | 2 | 2 | | 34 | -30 | | 66 | 2 | |
| -93 | -29 | Guard | -61 | 3 | | -29 | -29 | | 3 | 3 | | 35 | -29 | | 67 | 3 | |
| -92 | -28 | Guard | -60 | 4 | | -28 | -28 | | 4 | 4 | | 36 | -28 | | 68 | 4 | |
| -91 | -27 | Guard | -59 | 5 | | -27 | -27 | | 5 | 5 | | 37 | -27 | | 69 | 5 | |
| -90 | -26 | | -58 | 6 | | -26 | -26 | | 6 | 6 | | 38 | -26 | | 70 | 6 | |
| -89 | -25 | | -57 | 7 | | -25 | -25 | Pilot | 7 | 7 | | 39 | -25 | | 71 | 7 | |
| -88 | -24 | | -56 | 8 | | -24 | -24 | | 8 | 8 | | 40 | -24 | | 72 | 8 | |
| -87 | -23 | | -55 | 9 | | -23 | -23 | | 9 | 9 | | 41 | -23 | | 73 | 9 | |
| -86 | -22 | | -54 | 10 | | -22 | -22 | | 10 | 10 | | 42 | -22 | | 74 | 10 | |
| -85 | -21 | | -53 | 11 | Pilot | -21 | -21 | | 11 | 11 | Pilot | 43 | -21 | | 75 | 11 | Pilot |
| -84 | -20 | | -52 | 12 | | -20 | -20 | | 12 | 12 | | 44 | -20 | | 76 | 12 | |
| -83 | -19 | | -51 | 13 | | -19 | -19 | | 13 | 13 | | 45 | -19 | | 77 | 13 | |
| -82 | -18 | | -50 | 14 | | -18 | -18 | | 14 | 14 | | 46 | -18 | | 78 | 14 | |
| -81 | -17 | | -49 | 15 | | -17 | -17 | | 15 | 15 | | 47 | -17 | | 79 | 15 | |
| -80 | -16 | | -48 | 16 | | -16 | -16 | | 16 | 16 | | 48 | -16 | | 80 | 16 | |
| -79 | -15 | | -47 | 17 | | -15 | -15 | | 17 | 17 | | 49 | -15 | | 81 | 17 | |
| -78 | -14 | | -46 | 18 | | -14 | -14 | | 18 | 18 | | 50 | -14 | | 82 | 18 | |
| -77 | -13 | | -45 | 19 | | -13 | -13 | | 19 | 19 | | 51 | -13 | | 83 | 19 | |
| -76 | -12 | | -44 | 20 | | -12 | -12 | | 20 | 20 | | 52 | -12 | | 84 | 20 | |
| -75 | -11 | Pilot | -43 | 21 | | -11 | -11 | Pilot | 21 | 21 | | 53 | -11 | Pilot | 85 | 21 | |
| -74 | -10 | | -42 | 22 | | -10 | -10 | | 22 | 22 | | 54 | -10 | | 86 | 22 | |
| -73 | -9 | | -41 | 23 | | -9 | -9 | | 23 | 23 | | 55 | -9 | | 87 | 23 | |
| -72 | -8 | | -40 | 24 | | -8 | -8 | | 24 | 24 | | 56 | -8 | | 88 | 24 | |
| -71 | -7 | | -39 | 25 | | -7 | -7 | | 25 | 25 | Pilot | 57 | -7 | | 89 | 25 | |
| -70 | -6 | | -38 | 26 | | -6 | -6 | | 26 | 26 | | 58 | -6 | | 90 | 26 | Guard |
| -69 | -5 | | -37 | 27 | | -5 | -5 | | 27 | 27 | | 59 | -5 | | 91 | 27 | Guard |
| -68 | -4 | | -36 | 28 | | -4 | -4 | | 28 | 28 | | 60 | -4 | | 92 | 28 | Guard |
| -67 | -3 | | -35 | 29 | | -3 | -3 | | 29 | 29 | | 61 | -3 | | 93 | 29 | Guard |
| -66 | -2 | | -34 | 30 | | -2 | -2 | | 30 | 30 | | 66 | -2 | | 94 | 30 | Guard |
| -65 | -1 | | -33 | 31 | | -1 | -1 | DC | 31 | 31 | | 63 | -1 | DC | 95 | 31 | Guard |

FIG. 16B

| SC idx All | SC idx Part | Object |
|---|---|---|
| 0 | -64 | DC |
| 1 | -63 | DC |
| 2 | -66 | Guard |
| 3 | -61 | Guard |
| 4 | -60 | Guard |
| 5 | -59 | Guard |
| 6 | -58 | |
| 7 | -57 | |
| 8 | -56 | |
| 9 | -55 | |
| 10 | -54 | |
| 11 | -53 | Pilot |
| 12 | -52 | |
| 13 | -51 | |
| 14 | -50 | |
| 15 | -49 | |
| 16 | -48 | |
| 17 | -47 | |
| 18 | -46 | |
| 19 | -45 | |
| 20 | -44 | |
| 21 | -43 | |
| 22 | -42 | |
| 23 | -41 | |
| 24 | -40 | |
| 25 | -39 | |
| 26 | -38 | |
| 27 | -37 | |
| 28 | -36 | |
| 29 | -35 | |
| 30 | -34 | |
| 31 | -33 | |

| SC idx All | SC idx Part | Object |
|---|---|---|
| 32 | -32 | |
| 33 | -31 | |
| 34 | -30 | |
| 35 | -29 | |
| 36 | -28 | |
| 37 | -27 | |
| 38 | -26 | |
| 39 | -25 | Pilot |
| 40 | -24 | |
| 41 | -23 | |
| 42 | -22 | |
| 43 | -21 | |
| 44 | -20 | |
| 45 | -19 | |
| 46 | -18 | |
| 47 | -17 | |
| 48 | -16 | |
| 49 | -15 | |
| 50 | -14 | |
| 51 | -13 | |
| 52 | -12 | |
| 53 | -11 | Pilot |
| 54 | -10 | |
| 55 | -9 | |
| 56 | -8 | |
| 57 | -7 | |
| 58 | -6 | |
| 59 | -5 | |
| 60 | -4 | |
| 61 | -3 | |
| 66 | -2 | |
| 63 | -1 | Pseudo DC |

| SC idx All | SC idx Part | Object |
|---|---|---|
| 64 | 0 | Pseudo DC |
| 65 | 1 | Pseudo DC |
| 66 | 2 | |
| 67 | 3 | |
| 68 | 4 | |
| 69 | 5 | |
| 70 | 6 | |
| 71 | 7 | |
| 72 | 8 | |
| 73 | 9 | |
| 74 | 10 | |
| 75 | 11 | Pilot |
| 76 | 12 | |
| 77 | 13 | |
| 78 | 14 | |
| 79 | 15 | |
| 80 | 16 | |
| 81 | 17 | |
| 82 | 18 | |
| 83 | 19 | |
| 84 | 20 | |
| 85 | 21 | |
| 86 | 22 | |
| 87 | 23 | |
| 88 | 24 | |
| 89 | 25 | Pilot |
| 90 | 26 | |
| 91 | 27 | |
| 92 | 28 | |
| 93 | 29 | |
| 94 | 30 | |
| 95 | 31 | |

| SC idx All | SC idx Part | Object |
|---|---|---|
| 96 | 32 | |
| 97 | 33 | |
| 98 | 34 | |
| 99 | 35 | |
| 100 | 36 | |
| 101 | 37 | |
| 102 | 38 | |
| 103 | 39 | |
| 104 | 40 | |
| 105 | 41 | |
| 106 | 42 | |
| 107 | 43 | |
| 108 | 44 | |
| 109 | 45 | |
| 110 | 46 | |
| 111 | 47 | |
| 112 | 48 | |
| 113 | 49 | |
| 114 | 50 | |
| 115 | 51 | |
| 116 | 52 | |
| 117 | 53 | Pilot |
| 118 | 54 | |
| 119 | 55 | |
| 120 | 56 | |
| 121 | 57 | |
| 122 | 58 | |
| 123 | 59 | Guard |
| 124 | 60 | Guard |
| 125 | 61 | Guard |
| 126 | 66 | Guard |
| 127 | 63 | Guard |

FIG. 17A

| SC idx All | SC idx Part | Object |
|---|---|---|
| -128 | -32 | Guard |
| -127 | -31 | Guard |
| -126 | -30 | Guard |
| -125 | -29 | Guard |
| -124 | -28 | Guard |
| -123 | -27 | Guard |
| -122 | -26 | |
| -121 | -25 | |
| -120 | -24 | |
| -119 | -23 | |
| -118 | -22 | |
| -117 | -21 | |
| -116 | -20 | |
| -115 | -19 | |
| -114 | -18 | |
| -113 | -17 | |
| -112 | -16 | |
| -111 | -15 | |
| -110 | -14 | |
| -109 | -13 | |
| -108 | -12 | |
| -107 | -11 | |
| -106 | -10 | |
| -105 | -9 | |
| -104 | -8 | |
| -103 | -7 | Pilot |
| -102 | -6 | |
| -101 | -5 | |
| -100 | -4 | |
| -99 | -3 | |
| -98 | -2 | |
| -97 | -1 | |

| SC idx All | SC idx Part | Object |
|---|---|---|
| -96 | 0 | |
| -95 | 1 | |
| -94 | 2 | |
| -93 | 3 | |
| -92 | 4 | |
| -91 | 5 | |
| -90 | 6 | |
| -89 | 7 | |
| -88 | 8 | |
| -87 | 9 | |
| -86 | 10 | |
| -85 | 11 | |
| -84 | 12 | |
| -83 | 13 | |
| -82 | 14 | |
| -81 | 15 | |
| -80 | 16 | |
| -79 | 17 | |
| -78 | 18 | |
| -77 | 19 | |
| -76 | 20 | |
| -75 | 21 | Pilot |
| -74 | 22 | |
| -73 | 23 | |
| -72 | 24 | |
| -71 | 25 | |
| -70 | 26 | |
| -69 | 27 | |
| -68 | 28 | |
| -67 | 29 | |
| -66 | 30 | |
| -65 | 31 | |

| SC idx All | SC idx Part | Object |
|---|---|---|
| -64 | -32 | |
| -63 | -31 | |
| -66 | -30 | |
| -61 | -29 | |
| -60 | -28 | |
| -59 | -27 | |
| -58 | -26 | |
| -57 | -25 | |
| -56 | -24 | |
| -55 | -23 | |
| -54 | -22 | |
| -53 | -21 | |
| -52 | -20 | |
| -51 | -19 | |
| -50 | -18 | |
| -49 | -17 | |
| -48 | -16 | |
| -47 | -15 | |
| -46 | -14 | |
| -45 | -13 | |
| -44 | -12 | |
| -43 | -11 | |
| -42 | -10 | |
| -41 | -9 | |
| -40 | -8 | |
| -39 | -7 | Pilot |
| -38 | -6 | |
| -37 | -5 | |
| -36 | -4 | |
| -35 | -3 | |
| -34 | -2 | |
| -33 | -1 | |

| SC idx All | SC idx Part | Object |
|---|---|---|
| -32 | 0 | |
| -31 | 1 | |
| -30 | 2 | |
| -29 | 3 | |
| -28 | 4 | |
| -27 | 5 | |
| -26 | 6 | |
| -25 | 7 | |
| -24 | 8 | |
| -23 | 9 | |
| -22 | 10 | |
| -21 | 11 | |
| -20 | 12 | |
| -19 | 13 | |
| -18 | 14 | |
| -17 | 15 | |
| -16 | 16 | |
| -15 | 17 | |
| -14 | 18 | |
| -13 | 19 | |
| -12 | 20 | |
| -11 | 21 | Pilot |
| -10 | 22 | |
| -9 | 23 | |
| -8 | 24 | |
| -7 | 25 | |
| -6 | 26 | Guard |
| -5 | 27 | Guard |
| -4 | 28 | Guard |
| -3 | 29 | Guard |
| -2 | 30 | Guard |
| -1 | 31 | DC |

FIG. 17B

| SC idx All | SC idx Part | Object |
|---|---|---|
| 0 | -32 | DC |
| 1 | -31 | DC |
| 2 | -30 | Guard |
| 3 | -29 | Guard |
| 4 | -28 | Guard |
| 5 | -27 | Guard |
| 6 | -26 | |
| 7 | -25 | |
| 8 | -24 | |
| 9 | -23 | |
| 10 | -22 | |
| 11 | -21 | Pilot |
| 12 | -20 | |
| 13 | -19 | |
| 14 | -18 | |
| 15 | -17 | |
| 16 | -16 | |
| 17 | -15 | |
| 18 | -14 | |
| 19 | -13 | |
| 20 | -12 | |
| 21 | -11 | |
| 22 | -10 | |
| 23 | -9 | |
| 24 | -8 | |
| 25 | -7 | |
| 26 | -6 | |
| 27 | -5 | |
| 28 | -4 | |
| 29 | -3 | |
| 30 | -2 | |
| 31 | -1 | |

| SC idx All | SC idx Part | Object |
|---|---|---|
| 32 | 0 | |
| 33 | 1 | |
| 34 | 2 | |
| 35 | 3 | |
| 36 | 4 | |
| 37 | 5 | |
| 38 | 6 | |
| 39 | 7 | Pilot |
| 40 | 8 | |
| 41 | 9 | |
| 42 | 10 | |
| 43 | 11 | |
| 44 | 12 | |
| 45 | 13 | |
| 46 | 14 | |
| 47 | 15 | |
| 48 | 16 | |
| 49 | 17 | |
| 50 | 18 | |
| 51 | 19 | |
| 52 | 20 | |
| 53 | 21 | |
| 54 | 22 | |
| 55 | 23 | |
| 56 | 24 | |
| 57 | 25 | |
| 58 | 26 | |
| 59 | 27 | |
| 60 | 28 | |
| 61 | 29 | |
| 66 | 30 | |
| 63 | 31 | |

| SC idx All | SC idx Part | Object |
|---|---|---|
| 64 | -32 | |
| 65 | -31 | |
| 66 | -30 | |
| 67 | -29 | |
| 68 | -28 | |
| 69 | -27 | |
| 70 | -26 | |
| 71 | -25 | |
| 72 | -24 | |
| 73 | -23 | |
| 74 | -22 | |
| 75 | -21 | Pilot |
| 76 | -20 | |
| 77 | -19 | |
| 78 | -18 | |
| 79 | -17 | |
| 80 | -16 | |
| 81 | -15 | |
| 82 | -14 | |
| 83 | -13 | |
| 84 | -12 | |
| 85 | -11 | |
| 86 | -10 | |
| 87 | -9 | |
| 88 | -8 | |
| 89 | -7 | |
| 90 | -6 | |
| 91 | -5 | |
| 92 | -4 | |
| 93 | -3 | |
| 94 | -2 | |
| 95 | -1 | |

| SC idx All | SC idx Part | Object |
|---|---|---|
| 96 | 0 | |
| 97 | 1 | |
| 98 | 2 | |
| 99 | 3 | |
| 100 | 4 | |
| 101 | 5 | |
| 102 | 6 | |
| 103 | 7 | Pilot |
| 104 | 8 | |
| 105 | 9 | |
| 106 | 10 | |
| 107 | 11 | |
| 108 | 12 | |
| 109 | 13 | |
| 110 | 14 | |
| 111 | 15 | |
| 112 | 16 | |
| 113 | 17 | |
| 114 | 18 | |
| 115 | 19 | |
| 116 | 20 | |
| 117 | 21 | |
| 118 | 22 | |
| 119 | 23 | |
| 120 | 24 | |
| 121 | 25 | |
| 122 | 26 | Guard |
| 123 | 27 | Guard |
| 124 | 28 | Guard |
| 125 | 29 | Guard |
| 126 | 30 | Guard |
| 127 | 31 | Guard |

FIG. 20

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|---|---|---|---|---|---|---|---|---|---|
| 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 | 51 |
| 52 | 53 | 54 | 55 | 56 | 57 | 58 | 59 | 60 | 61 | 62 | 63 | 64 | 65 | 66 | 67 | 68 | 69 | 70 | 71 | 72 | 73 | 74 | 75 | 76 | 77 |
| 78 | 79 | 80 | 81 | 82 | 83 | 84 | 85 | 86 | 87 | 88 | 89 | 90 | 91 | 92 | 93 | 94 | 95 | 96 | 97 | 98 | 99 | 100 | 101 | 102 | 103 |
| 104 | 105 | 106 | 107 | 108 | 109 | 110 | 111 | 112 | 113 | 114 | 115 | 116 | 117 | 118 | 119 | 120 | 121 | 122 | 123 | 124 | 125 | 126 | 127 | 128 | 129 |
| 130 | 131 | 132 | 133 | 134 | 135 | 136 | 137 | 138 | 139 | 140 | 141 | 142 | 143 | 144 | 145 | 146 | 147 | 148 | 149 | 150 | 151 | 152 | 153 | 154 | 155 |
| 156 | 157 | 158 | 159 | 160 | 161 | 162 | 163 | 164 | 165 | 166 | 167 | 168 | 169 | 170 | 171 | 172 | 173 | 174 | 175 | 176 | 177 | 178 | 179 | 180 | 181 |
| 182 | 183 | 184 | 185 | 186 | 187 | 188 | 189 | 190 | 191 | 192 | 193 | 194 | 195 | 196 | 197 | 198 | 199 | 200 | 201 | 202 | 203 | 204 | 205 | 206 | 207 |
| 208 | 209 | 210 | 211 | 212 | 213 | 214 | 215 | 216 | 217 | 218 | 219 | 220 | 221 | 222 | 223 | 224 | 225 | 226 | 227 | 228 | 229 | 230 | 231 | 232 | 233 |

| 0 | 1 | 2 | 3 | 4 | 5 | 6 | 7 | 8 | 9 | 10 | 11 | 12 | 13 | 14 | 15 | 16 | 17 | 0 | 1 | 2 | 3 | 4 | 5 |
|---|---|---|---|---|---|---|---|---|---|---|---|---|---|---|---|---|---|---|---|---|---|---|---|
| 18 | 19 | 20 | 21 | 22 | 23 | 24 | 25 | 26 | 27 | 28 | 29 | 30 | 31 | 32 | 33 | 34 | 35 | 6 | 7 | 8 | 9 | 10 | 11 |
| 36 | 37 | 38 | 39 | 40 | 41 | 42 | 43 | 44 | 45 | 46 | 47 | 48 | 49 | 50 | 51 | 52 | 53 | 12 | 13 | 14 | 15 | 16 | 17 |
| 54 | 55 | 56 | 57 | 58 | 59 | 60 | 61 | 62 | 63 | 64 | 65 | 66 | 67 | 68 | 69 | 70 | 71 | 18 | 19 | 20 | 21 | 22 | 23 |
| 72 | 73 | 74 | 75 | 76 | 77 | 78 | 79 | 80 | 81 | 82 | 83 | 84 | 85 | 86 | 87 | 88 | 89 | 24 | 25 | 26 | 27 | 28 | 29 |
| 90 | 91 | 92 | 93 | 94 | 95 | 96 | 97 | 98 | 99 | 100 | 101 | 102 | 103 | 104 | 105 | 106 | 107 | 30 | 31 | 32 | 33 | 34 | 35 |
| 108 | 109 | 110 | 111 | 112 | 113 | 114 | 115 | 116 | 117 | 118 | 119 | 120 | 121 | 122 | 123 | 124 | 125 | 36 | 37 | 38 | 39 | 40 | 41 |
| 126 | 127 | 128 | 129 | 130 | 131 | 132 | 133 | 134 | 135 | 136 | 137 | 138 | 139 | 140 | 141 | 142 | 143 | 42 | 43 | 44 | 45 | 46 | 47 |
| 144 | 145 | 146 | 147 | 148 | 149 | 150 | 151 | 152 | 153 | 154 | 155 | 156 | 157 | 158 | 159 | 160 | 161 | 48 | 49 | 50 | 51 | 52 | 53 |

9 rows 18   6

|   | 0 | 1 | 2 | 3 | 4 | 5 | 6 | 7 | 8 | 9 | 10 | 11 | 12 | 13 | 0 | 1 | 2 | 3 | 4 | 5 | 6 |
|---|---|---|---|---|---|---|---|---|---|---|----|----|----|----|---|---|---|---|---|---|---|
|   | 14 | 15 | 16 | 17 | 18 | 19 | 20 | 21 | 22 | 23 | 24 | 25 | 26 | 27 | 7 | 8 | 9 | 10 | 11 | 12 | 13 |
|   | 28 | 29 | 30 | 31 | 32 | 33 | 34 | 35 | 36 | 37 | 38 | 39 | 40 | 41 | 14 | 15 | 16 | 17 | 18 | 19 | 20 |
|   | 42 | 43 | 44 | 45 | 46 | 47 | 48 | 49 | 50 | 51 | 52 | 53 | 54 | 55 | 21 | 22 | 23 | 24 | 25 | 26 | 27 |
|   | 56 | 57 | 58 | 59 | 60 | 61 | 62 | 63 | 64 | 65 | 66 | 67 | 68 | 69 | 28 | 29 | 30 | 31 | 32 | 33 | 34 |
|   | 70 | 71 | 72 | 73 | 74 | 75 | 76 | 77 | 78 | 79 | 80 | 81 | 82 | 83 | 35 | 36 | 37 | 38 | 39 | 40 | 41 |
|   | 84 | 85 | 86 | 87 | 88 | 89 | 90 | 91 | 92 | 93 | 94 | 95 | 96 | 97 | 42 | 43 | 44 | 45 | 46 | 47 | 48 |
|   | 98 | 99 | 100 | 101 | 102 | 103 | 104 | 105 | 106 | 107 | 108 | 109 | 110 | 111 | 49 | 50 | 51 | 52 | 53 | 54 | 55 |

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 |
|---|---|---|---|---|---|---|---|---|---|---|---|---|---|---|---|---|---|---|---|---|---|---|---|---|---|---|
| 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 | 51 | 52 | 53 |
| 54 | 55 | 56 | 57 | 58 | 59 | 60 | 61 | 62 | 63 | 64 | 65 | 66 | 67 | 68 | 69 | 70 | 71 | 72 | 73 | 74 | 75 | 76 | 77 | 78 | 79 | 80 |
| 81 | 82 | 83 | 84 | 85 | 86 | 87 | 88 | 89 | 90 | 91 | 92 | 93 | 94 | 95 | 96 | 97 | 98 | 99 | 100 | 101 | 102 | 103 | 104 | 105 | 106 | 107 |
| 108 | 109 | 110 | 111 | 112 | 113 | 114 | 115 | 116 | 117 | 118 | 119 | 120 | 121 | 122 | 123 | 124 | 125 | 126 | 127 | 128 | 129 | 130 | 131 | 132 | 133 | 134 |
| 135 | 136 | 137 | 138 | 139 | 140 | 141 | 142 | 143 | 144 | 145 | 146 | 147 | 148 | 149 | 150 | 151 | 152 | 153 | 154 | 155 | 156 | 157 | 158 | 159 | 160 | 161 |
| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 |
| 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 | 51 | 52 | 53 |

| | | | | | | | | | | | | | | | | | | | | | | | | | | | | |
|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 |
| 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 |
| 56 | 57 | 58 | 59 | 60 | 61 | 62 | 63 | 64 | 65 | 66 | 67 | 68 | 69 | 70 | 71 | 72 | 73 | 74 | 75 | 76 | 77 | 78 | 79 | 80 | 81 | 82 | 83 |
| 84 | 85 | 86 | 87 | 88 | 89 | 90 | 91 | 92 | 93 | 94 | 95 | 96 | 97 | 98 | 99 | 100 | 101 | 102 | 103 | 104 | 105 | 106 | 107 | 108 | 109 | 110 | 111 |
| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 |
| 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 |
| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 |
| 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 |

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|----|----|----|----|----|----|----|----|----|----|----|----|----|----|----|----|
| 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 | 51 |
| 52 | 53 | 54 | 55 | 56 | 57 | 58 | 59 | 60 | 61 | 62 | 63 | 64 | 65 | 66 | 67 | 68 | 69 | 70 | 71 | 72 | 73 | 74 | 75 | 76 | 77 |
| 78 | 79 | 80 | 81 | 82 | 83 | 84 | 85 | 86 | 87 | 88 | 89 | 90 | 91 | 92 | 93 | 94 | 95 | 96 | 97 | 98 | 99 | 100 | 101 | 102 | 103 |
| 104 | 105 | 106 | 107 | 108 | 109 | 110 | 111 | 112 | 113 | 114 | 115 | 116 | 117 | 118 | 119 | 120 | 121 | 122 | 123 | 124 | 125 | 126 | 127 | 128 | 129 |
| 130 | 131 | 132 | 133 | 134 | 135 | 136 | 137 | 138 | 139 | 140 | 141 | 142 | 143 | 144 | 145 | 146 | 147 | 148 | 149 | 150 | 151 | 152 | 153 | 154 | 155 |
| 156 | 157 | 158 | 159 |  |  |  |  |  |  |  |  |  |  |  |  |  |  |  |  |  |  |  |  |  |  |
| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
| 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 | 51 |

FIG. 64

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|---|---|---|---|---|---|---|---|---|---|
| 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 | 51 |
| 52 | 53 | 54 | 55 | 56 | 57 | 58 | 59 | 60 | 61 | 62 | 63 | 64 | 65 | 66 | 67 | 68 | 69 | 70 | 71 | 72 | 73 | 74 | 75 | 76 | 77 |
| 78 | 79 | 80 | 81 | 82 | 83 | 84 | 85 | 86 | 87 | 88 | 89 | 90 | 91 | 92 | 93 | 94 | 95 | 96 | 97 | 98 | 99 | 100 | 101 | 102 | 103 |
| 104 | 105 | 106 | 107 | 108 | 109 | 110 | 111 | 112 | 113 | 114 | 115 | 116 | 117 | 118 | 119 | 120 | 121 | 122 | 123 | 124 | 125 | 126 | 127 | 128 | 129 |
| 130 | 131 | 132 | 133 | 134 | 135 | 136 | 137 | 138 | 139 | 140 | 141 | 142 | 143 | 144 | 145 | 146 | 147 | 148 | 149 | 150 | 151 | 152 | 153 | 154 | 155 |
| 156 | 157 | 158 | 159 | 160 | 161 | 162 | 163 | 164 | 165 | 166 | 167 | 168 | 169 | 170 | 171 | 172 | 173 | 174 | 0 | 1 | 2 | 3 | 4 | 5 | 6 |
| 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
| 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | |

USER 0 + USER 1

| | A | B | C | D | E | F | G | H | I | J | K | L | M | N | O | P | Q | R | S | T | U | V | W | X | Y | Z |
|---|---|---|---|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
| | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 | 51 |
| | 52 | 53 | 54 | 55 | 56 | 57 | 58 | 59 | 60 | 61 | 62 | 63 | 64 | 65 | 66 | 67 | 68 | 69 | 70 | 71 | 72 | 73 | 74 | 75 | 76 | 77 |
| | 78 | 79 | 80 | 81 | 82 | 83 | 84 | 85 | 86 | 87 | 88 | 89 | 90 | 91 | 92 | 93 | 94 | 95 | 96 | 97 | 98 | 99 | 100 | 101 | 102 | 103 |
| | 104 | 105 | 106 | 107 | 108 | 109 | 110 | 111 | 112 | 113 | 114 | 115 | 116 | 117 | 118 | 119 | 120 | 121 | 122 | 123 | 124 | 125 | 126 | 127 | 128 | 129 |
| | 130 | 131 | 132 | 133 | 134 | 135 | 136 | 137 | 138 | 139 | 140 | 141 | 142 | 143 | 144 | 145 | 146 | 147 | 148 | 149 | 150 | 151 | 152 | 153 | 154 | 155 |
| | 156 | 157 | 158 | 159 | 160 | 161 | 162 | 163 | 164 | 165 | 166 | 167 | 168 | 169 | 170 | 171 | 172 | 173 | 174 | 175 | 176 | 177 | 178 | 179 | 180 | 181 |
| | 182 | 183 | 184 | 185 | 186 | 187 | 188 | 189 | 190 | 191 | 192 | 193 | 194 | 195 | 196 | 197 | 198 | 199 | 200 | 201 | 202 | 203 | 204 | 205 | 206 | 207 |
| | 208 | 209 | 210 | 211 | 212 | 213 | 214 | 215 | | | | | | | | | | | | | | | | | | |

FIG. 71

INTERLEAVING AND DEINTERLEAVING METHOD

CROSS-REFERENCE TO RELATED APPLICATION

This application claims priority to and the benefit of U.S. Provisional Application No. 61/985,981, filed on Apr. 29, 2014 in the U.S. Patent and Trademark Office and priority to and the benefit of Korean Patent Application No. 10-2015-0055779, filed on Apr. 21, 2015 in the Korean Intellectual Property Office, the entire contents of which are incorporated herein by reference.

BACKGROUND (a) Field

The described technology relates generally to an interleaving and deinterleaving method. More particularly, the described technology relates generally to an interleaving and deinterleaving method in wireless local area network (WLAN).

(b) Description of the Related Art

A WLAN is being standardized by the IEEE (Institute of Electrical and Electronics Engineers) Part 11 under the name of "Wireless LAN Medium Access Control (MAC) and Physical Layer (PHY) Specifications."

After an original standard was published on 1999, new version standards are continuously published by amendments. The IEEE standard 802.11a (IEEE Std 802.11a-1999) supporting 2.4 GHz band was published on 1999, and the IEEE standard 802.11g (IEEE Std 802.11g-2003) supporting 5 GHz band was published on 2003. These standards are called legacy. Subsequently, the IEEE standard 802.11n (IEEE Std 802.11n-2009) for enhancements for higher throughput (HT) was published on 2009, and the IEEE standard 802.11ac (IEEE 802.11ac-2013) for enhancements for very high throughput (VHT) was published on 2013. Recently, a high efficiency (HE) WLAN for enhancing the system throughput in high density scenarios is being developed by the IEEE 802.11ax task group.

In WLANs such as the HE WLAN, it is expected that data are transmitted for each band by using schemes such as orthogonal frequency division multiple access (OFDMA). Accordingly, an interleaving method for efficiently interleaving user data allocated for each band may be required.

In addition, when the data are transmitted for each band, a different tone allocation from a previous WLAN may be used. As a result, the number of data tones may be changed. Accordingly, when the number of data tones is changed, an interleaving method for supporting the changed number of data tones may be required.

SUMMARY

An embodiment of the present invention provides a new interleaving and deinterleaving method in a wireless communication network.

According to another embodiment of the present invention, an interleaving method is provided by a transmitting device. The method includes dividing a bandwidth into a plurality of bands and assigning data of a plurality of users to the plurality of bands, respectively. The method further includes dividing an interleaver matrix into a plurality of matrices corresponding to the plurality of bands respectively in a predetermined direction and arranging in each matrix of the plurality of matrices data of a user assigned to a corresponding band among the plurality of bands.

A plurality of elements in each matrix may correspond to a plurality of data tones in the corresponding band, respectively.

Arranging data of the user may include filling an element that does not correspond to the data tones in the interleaver matrix with a null.

The method may further include sequentially reading the arranged data from the interleaver matrix in a column direction. Arranging data of the user may include sequentially arranging the data of the corresponding user in each matrix in a row direction.

The predetermined direction may be a row direction.

The plurality of bands may include a first band and a second band, the plurality of users may include a first user assigned to the first band and a second user assigned to the second band, and the plurality of matrices may include a first matrix and a second matrix.

In this case, arranging data of the user may include arranging data of the first user in the first matrix and arranging data of the second user in the second matrix. The data of the first user may be arranged in only the first matrix and the data of the second user may be arranged in only the second matrix.

Alternatively, arranging data of the user may include arranging data of the first user in the first matrix and arranging data of the second user in the second matrix. A part of the data of the second user may be arranged in a last row of the first matrix.

A number of columns in each matrix may be substantially proportional to a bandwidth of the corresponding band.

Each row of the interleaver matrix may be extended by a greatest number of coded bits per subcarrier among the plurality of users assigned to the plurality of bands.

Each row of the interleaver matrix may be extended to N rows when the greatest number of coded bits per subcarrier is N. Arranging data of the user may include filling with a null (N-M) rows among the extended N rows in each row of a matrix corresponding to a user whose number of coded bits per subcarrier is M being less than N.

The predetermined direction may be a column direction.

The plurality of bands may include a first band and a second band, the plurality of users may include a first user assigned to the first band and a second user assigned to the second band, and the plurality of matrices may include a first matrix and a second matrix.

In this case, arranging data of the user may include arranging data of the first user in the first matrix and arranging data of the second user in the second matrix. The data of the first user may be arranged in only the first matrix and the data of the second user may be arranged in only the second matrix.

Alternatively, arranging data of the user may include arranging data of the first user in the first matrix and arranging data of the second user in the second matrix. A last row of the first matrix may be overlapped with an initial row of the second matrix, and a part of the data of the first user and a part of the data of the second user may be arranged in the overlapped row.

A number of rows in each matrix may be substantially proportional to a bandwidth of the corresponding band.

Each row of each matrix may be extended by a number of coded bits per subcarrier for a user assigned to the corresponding band.

When a number of coded bits per subcarrier for a user corresponding to a certain matrix from among the plurality of matrices is N, each row of the certain matrix may be extended to N rows.

According to yet another embodiment of the present invention, a deinterleaving method is provided by a receiving device. The method includes receiving data of a band corresponding to a user of the receiving device from among data that are transmitted on a plurality of bands by a transmitting device, sequentially arranging the received data on a deinterleaver matrix in a column direction, and sequentially reading data from the deinterleaver matrix in a row direction. The data transmitted on the plurality of bands are interleaved by an interleaver matrix that is divided into a plurality of matrices corresponding to the plurality of bands respectively in a predetermined direction, and data of a user assigned to a corresponding band among the plurality of bands are arranged in each matrix of the plurality of matrices.

According to still embodiment of the present invention, a deinterleaving method is provided by a receiving device. The method includes receiving data that are transmitted on a plurality of bands by a transmitting device, sequentially arranging the receiving data on a deinterleaver matrix in a column direction, and sequentially reading data from an area, which corresponds to a user of the receiving device in the deinterleaver matrix, in a row direction. The data transmitted on the plurality of bands are interleaved by an interleaver matrix that is divided into a plurality of matrices corresponding to the plurality of bands respectively in a predetermined direction, and data of a user assigned to a corresponding band among the plurality of bands are arranged in each matrix of the plurality of matrices.

The predetermined direction may be a row direction. The plurality of matrices may include a first matrix and a second matrix, and the interleaver matrix may be designed to allow a part of data of a user corresponding to the second matrix to be arranged in a last row of the first matrix.

The predetermined direction may be a column direction. The plurality of matrices may include a first matrix and a second matrix, and the interleaver matrix may be designed to allow a last row of the first matrix to be overlapped with an initial row of the second matrix.

According to further embodiment of the present invention, an interleaving apparatus is provided by a transmitting device. The interleaving apparatus includes a band parser and an interleaver. The interleaver includes an interleaver matrix that is divided into a plurality of matrices corresponding to a plurality of bands respectively in a predetermined direction. The band parser divides a bandwidth into the plurality of bands, assigns data of a plurality of users to the plurality of bands, respectively, and arranges in each matrix of the plurality of matrices data of a user assigned to a corresponding band among the plurality of bands.

According to further embodiment of the present invention, a deinterleaving apparatus is provided by a receiving device. The deinterleaving apparatus includes a processor and a transceiver. The transceiver receives data of a band corresponding to a user of the receiving device from among data that are transmitted on a plurality of bands by a transmitting device. The processor sequentially arranges the received data on a deinterleaver matrix in a column direction, and sequentially reads data from the deinterleaver matrix in a row direction. The data transmitted on the plurality of bands are interleaved by an interleaver matrix that is divided into a plurality of matrices corresponding to the plurality of bands respectively in a predetermined direction, and data of a user assigned to a corresponding band among the plurality of bands are arranged in each matrix of the plurality of matrices.

According to further embodiment of the present invention, a deinterleaving apparatus is provided by a receiving device. The deinterleaving apparatus includes a processor and a transceiver. The transceiver receives data that are transmitted on a plurality of bands by a transmitting device. The processor sequentially arranges the receiving data on a deinterleaver matrix in a column direction, and sequentially reads data from an area, which corresponds to a user of the receiving device in the deinterleaver matrix, in a row direction. The data transmitted on the plurality of bands are interleaved by an interleaver matrix that is divided into a plurality of matrices corresponding to the plurality of bands respectively in a predetermined direction, and data of a user assigned to a corresponding band among the plurality of bands are arranged in each matrix of the plurality of matrices.

BRIEF DESCRIPTION OF THE DRAWINGS

FIG. 12 shows a tone allocation of a 20 MHz transmission mode in an IEEE 802.11ac WLAN.

FIG. 13 shows a tone allocation of a 40 MHz transmission mode in an IEEE 802.11ac WLAN.

FIG. 14 shows a tone allocation of an 80 MHz transmission mode in an IEEE 802.11ac WLAN.

FIG. 15 exemplifies a tone allocation of an OFDMA 60 MHz mode in a wireless communication network according to an embodiment of the present invention.

FIG. 16A and FIG. 16B exemplify a tone allocation of an OFDMA 80 MHz mode in a wireless communication network according to an embodiment of the present invention.

FIG. 17A and FIG. 17B exemplify a tone allocation of an OFDMA 80 MHz mode in a wireless communication network according to another embodiment of the present invention.

FIG. 20 shows an example of an interleaver matrix being applicable to 80 MHz bandwidth of an OFDMA 80 MHz mode in a wireless communication network according to an embodiment of the present invention.

FIG. 21 shows an example of an interleaver matrix being applicable to two bands of 20 MHz bandwidth in an OFDMA 40 MHz mode of a wireless communication network according to an embodiment of the present invention.

FIG. 22 shows an example of an interleaver matrix being applicable to four bands of 20 MHz bandwidth in an OFDMA 80 MHz mode of a wireless communication network according to an embodiment of the present invention.

FIG. 23 shows an example of an interleaver matrix being applicable to a band of 40 MHz bandwidth and two bands of 20 MHz bandwidth in an OFDMA 80 MHz mode of a wireless communication network according to an embodiment of the present invention.

FIG. 24 shows an example of an interleaver matrix being applicable to two bands of 40 MHz bandwidth in an OFDMA 80 MHz mode of a wireless communication network according to an embodiment of the present invention.

FIG. 25 shows an example of an interleaver matrix being applicable to a band of 60 MHz bandwidth and a band of 20 MHz bandwidth in an OFDMA 80 MHz mode of a wireless communication network according to an embodiment of the present invention.

FIG. 26 shows an example of an interleaver matrix being applicable to three bands of 20 MHz bandwidth in an OFDMA 60 MHz mode of a wireless communication network according to an embodiment of the present invention.

FIG. 27 shows an example of an interleaver matrix being applicable to a band of 40 MHz bandwidth and a band of 20 MHz bandwidth in an OFDMA 60 MHz mode of a wireless communication network according to an embodiment of the present invention.

FIG. 29 shows another example of an interleaver matrix being applicable to four bands of 20 MHz bandwidth in an OFDMA 80 MHz mode of a wireless communication network according to an embodiment of the present invention.

FIG. 30 shows another example of an interleaver matrix being applicable to a band of 40 MHz bandwidth and two bands of 20 MHz bandwidth in an OFDMA 80 MHz mode of a wireless communication network according to an embodiment of the present invention.

FIG. 32 shows another example of an interleaver matrix being applicable to a band of 60 MHz bandwidth and a band of 20 MHz bandwidth in an OFDMA 80 MHz mode of a wireless communication network according to an embodiment of the present invention.

FIG. 33 shows another example of an interleaver matrix being applicable to two bands of 20 MHz bandwidth in an OFDMA 40 MHz mode of a wireless communication network according to an embodiment of the present invention.

FIG. 34 shows another example of an interleaver matrix being applicable to four bands of 20 MHz bandwidth in an OFDMA 80 MHz mode of a wireless communication network according to an embodiment of the present invention.

FIG. 35 shows another example of an interleaver matrix being applicable to a band of 40 MHz bandwidth and two bands of 20 MHz bandwidth in an OFDMA 80 MHz mode of a wireless communication network according to an embodiment of the present invention.

FIG. 36 shows another example of an interleaver matrix being applicable to two bands of 40 MHz bandwidth in an OFDMA 80 MHz mode of a wireless communication network according to an embodiment of the present invention.

FIG. 37 shows another example of an interleaver matrix being applicable to a band of 60 MHz bandwidth and a band of 20 MHz bandwidth in an OFDMA 80 MHz mode of a wireless communication network according to an embodiment of the present invention.

FIG. 38 shows another example of an interleaver matrix being applicable to three bands of 20 MHz bandwidth in an OFDMA 60 MHz mode of a wireless communication network according to an embodiment of the present invention.

FIG. 39 shows another example of an interleaver matrix being applicable to a band of 40 MHz bandwidth and a band of 20 MHz bandwidth in an OFDMA 60 MHz mode of a wireless communication network according to an embodiment of the present invention.

FIG. 41 shows another example of an interleaver matrix being applicable to four bands of 20 MHz bandwidth in an OFDMA 80 MHz mode of a wireless communication network according to an embodiment of the present invention.

FIG. 42 shows another example of an interleaver matrix being applicable to a band of 40 MHz bandwidth and two bands of 20 MHz bandwidth in an OFDMA 80 MHz mode of a wireless communication network according to an embodiment of the present invention.

FIG. 43 shows another example of an interleaver matrix being applicable to two bands of 40 MHz bandwidth in an OFDMA 80 MHz mode of a wireless communication network according to an embodiment of the present invention.

FIG. 44 shows another example of an interleaver matrix being applicable to a band of 60 MHz bandwidth and a band of 20 MHz bandwidth in an OFDMA 80 MHz mode of a wireless communication network according to an embodiment of the present invention.

FIG. 45 and FIG. 46 show examples of an interleaver matrix being applicable to two bands of 20 MHz bandwidth in an OFDMA 40 MHz mode of a wireless communication network according to an embodiment of the present invention.

FIG. 47 and FIG. 48 show examples of an interleaver matrix being applicable to four bands of 20 MHz bandwidth in an OFDMA 80 MHz mode of a wireless communication network according to an embodiment of the present invention.

FIG. 49 and FIG. 50 show examples of an interleaver matrix being applicable to a band of 40 MHz bandwidth and two bands of 20 MHz bandwidth in an OFDMA 80 MHz mode of a wireless communication network according to an embodiment of the present invention.

FIG. 51 and FIG. 52 show examples of an interleaver matrix being applicable to two bands of 40 MHz bandwidth in an OFDMA 80 MHz mode of a wireless communication network according to an embodiment of the present invention.

FIG. 53 and FIG. 54 show examples of an interleaver matrix being applicable to a band of 60 MHz bandwidth and a band of 20 MHz bandwidth in an OFDMA 80 MHz mode of a wireless communication network according to an embodiment of the present invention.

FIG. 55 and FIG. 56 show examples of an interleaver matrix being applicable to two bands of 20 MHz bandwidth in an OFDMA 40 MHz mode of a wireless communication network according to an embodiment of the present invention.

FIG. 57 and FIG. 58 show examples of an interleaver matrix being applicable to four bands of 20 MHz bandwidth in an OFDMA 80 MHz mode of a wireless communication network according to an embodiment of the present invention.

FIG. 59 and FIG. 60 show examples of an interleaver matrix being applicable to a band of 40 MHz bandwidth and two bands of 20 MHz bandwidth in an OFDMA 80 MHz mode of a wireless communication network according to an embodiment of the present invention.

FIG. 61 and FIG. 62 show examples of an interleaver matrix being applicable to two bands of 40 MHz bandwidth in an OFDMA 80 MHz mode of a wireless communication network according to an embodiment of the present invention.

FIG. 63 and FIG. 64 show examples of an interleaver matrix being applicable to a band of 60 MHz bandwidth and a band of 20 MHz bandwidth in an OFDMA 80 MHz mode of a wireless communication network according to an embodiment of the present invention.

FIG. 66 and FIG. 67 show an example for explaining an interleaving method in a wireless communication network according to an embodiment of the present invention.

FIG. 69 and FIG. 71 show examples for explaining a deinterleaving method in a wireless communication network according to an embodiment of the present invention.

DETAILED DESCRIPTION OF THE EMBODIMENTS

Figure 1:
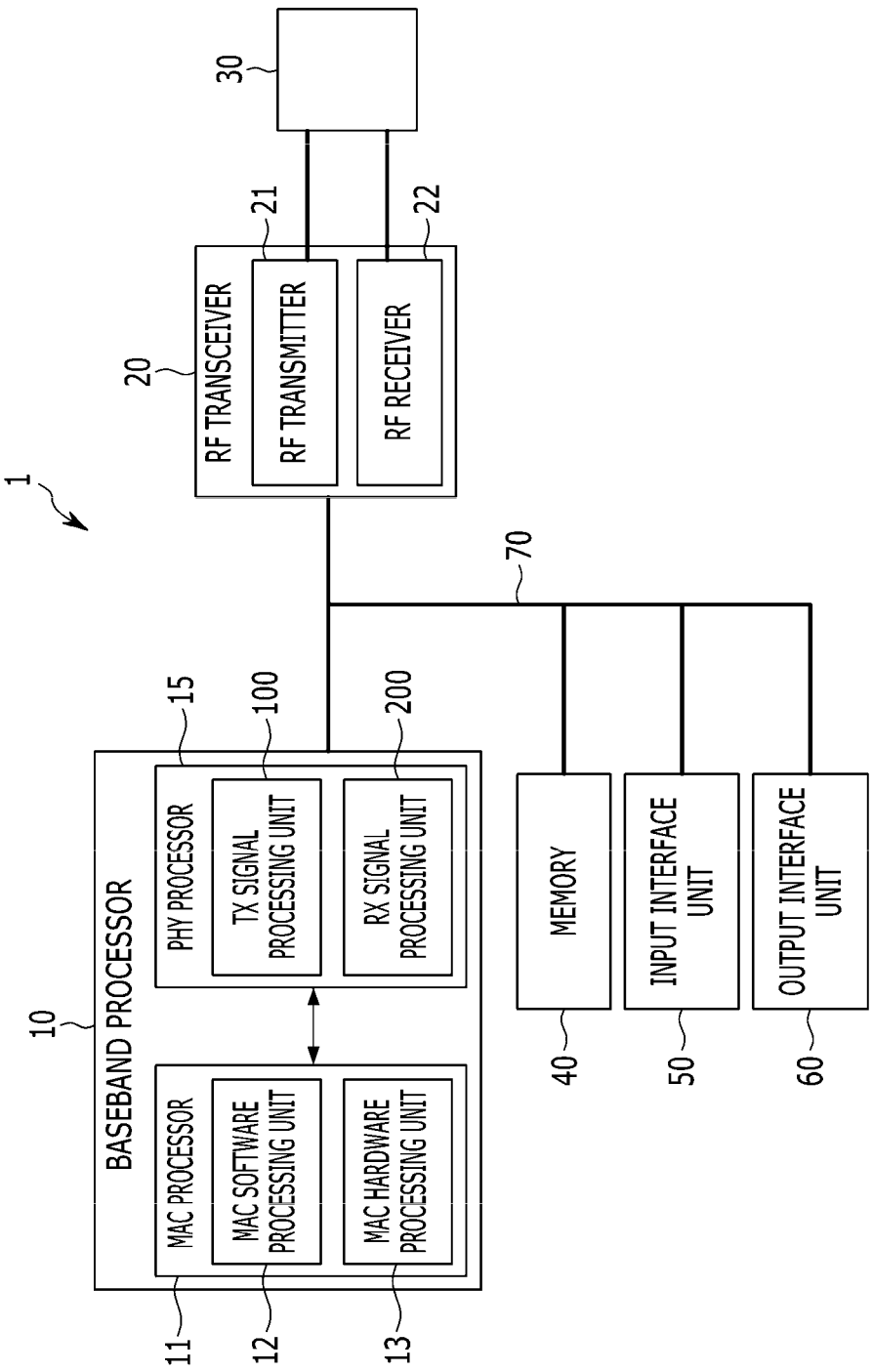
FIG. 1 is a schematic block diagram exemplifying a WLAN device.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In a wireless local area network (WLAN), a basic service set (BSS) includes a plurality of WLAN devices. The WLAN device may include a medium access control (MAC) layer and a physical (PHY) layer according to the IEEE (Institute of Electrical and Electronics Engineers) standard 802.11. In the plurality of WLAN devices, at least one WLAN device may be an access point and the other WLAN devices may be non-AP stations (non-AP STAs). Alternatively, all the plurality of WLAN devices may be non-AP STAs in Ad-hoc networking. In general, the AP STA and the non-AP STA may be collectively called the STA. However, for easy description, only the non-AP STA may be called the STA.

FIG. 1 is a schematic block diagram exemplifying a WLAN device.

Referring to FIG. 1, the WLAN device 1 includes a baseband processor 10, a radio frequency (RF) transceiver 20, an antenna unit 30, a memory 40, an input interface unit 50, an output interface unit 60, and a bus 70.

The baseband processor 10 performs baseband signal processing to be described below, and includes a MAC processor 11 and a PHY processor 15.

In one embodiment, the MAC processor 11 may include a MAC software processing unit 12 and a MAC hardware processing unit 13. The memory 40 may store software (hereinafter referred to as "MAC software") including at least some functions of the MAC layer. The MAC software processing unit 12 executes the MAC software to implement the some functions of the MAC layer, and the MAC hardware processing unit 13 may implement remaining functions of the MAC layer as hardware (hereinafter referred to "MAC hardware"). However, the MAC processor 11 is not limited to this.

The PHY processor 15 includes a transmitting signal processing unit 100 and a receiving signal processing unit 200.

The baseband processor 10, the memory 40, the input interface unit 50, and the output interface unit 60 may communicate with each other via the bus 70.

The RF transceiver 20 includes an RF transmitter 21 and an RF receiver 22.

The memory 40 may further store an operating system and applications. The input interface unit 50 receives information from a user, and the output interface unit 60 outputs information to the user.

The antenna unit 30 includes one or more antennas. When multiple-input multiple-output (MIMO) or multi-user MIMO (MU-MIMO) is used, the antenna unit 30 may include a plurality of antennas.

Figure 2:
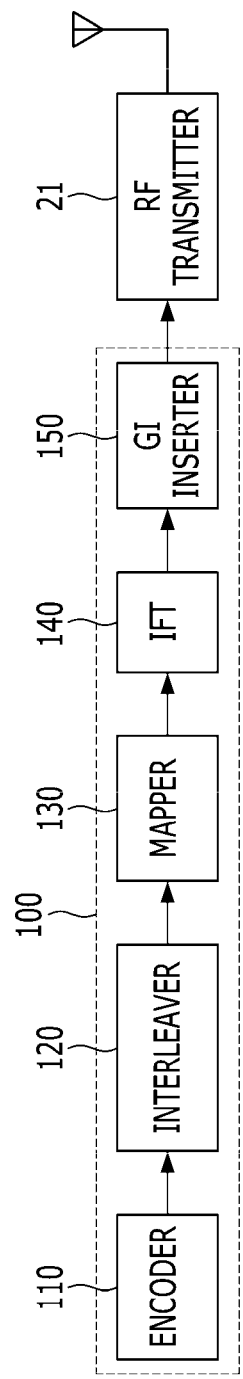
FIG. 2 is a schematic block diagram exemplifying a transmitting signal processing unit in a WLAN.

FIG. 2 is a schematic block diagram exemplifying a transmitting signal processing unit in a WLAN.

Referring to FIG. 2, a transmitting signal processing unit 100 includes an encoder 110, an interleaver 120, a mapper 130, an inverse Fourier transformer (IFT) 140, and a guard interval (GI) inserter 150.

The encoder 110 encodes input data. For example, the encoder 100 may be a forward error correction (FEC) encoder. The FEC encoder may include a binary convolutional code (BCC) encoder followed by a puncturing device, or may include a low-density parity-check (LDPC) encoder.

The transmitting signal processing unit 100 may further include a scrambler for scrambling the input data before the encoding to reduce the probability of long sequences of 0s or 1s. If BCC encoding is used in the encoder, the transmitting signal processing unit 100 may further include an encoder parser for demultiplexing the scrambled bits among a plurality of BCC encoders. If LDPC encoding is used in the encoder, the transmitting signal processing unit 100 may not use the encoder parser.

The interleaver 120 interleaves the bits of each stream output from the encoder to change order of bits. Interleaving may be applied only when BCC encoding is used. The mapper 130 maps the sequence of bits output from the interleaver to constellation points. If the LDPC encoding is used in the encoder, the mapper 130 may further perform LDPC tone mapping besides the constellation mapping.

When the MIMO or the MU-MIMO is used, the transmitting signal processing unit 100 may use a plurality of interleavers 120 and a plurality of mappers corresponding to the number of $N_{SS}$ of spatial streams. In this case, the transmitting signal processing unit 100 may further include a stream parser for dividing outputs of the BCC encoders or the LDPC encoder into blocks that are sent to different interleavers 120 or mappers 130. The transmitting signal processing unit 100 may further include a space-time block code (STBC) encoder for spreading the constellation points from the $N_{SS}$ spatial streams into $N_{STS}$ space-time streams and a spatial mapper for mapping the space-time streams to transmit chains. The spatial mapper may use direct mapping, spatial expansion, or beamforming The IFT 140 converts a block of the constellation points output from the mapper 130 or the spatial mapper to a time domain block (i.e., a symbol) by using an inverse discrete Fourier transform (IDFT) or an inverse fast Fourier transform (IFFT). If the STBC encoder and the spatial mapper are used, the inverse Fourier transformer 140 may be provided for each transmit chain.

When the MIMO or the MU-MIMO is used, the transmitting signal processing unit 100 may insert cyclic shift diversities (CSDs) to prevent unintentional beamforming. The CSD insertion may occur before or after the inverse Fourier transform. The CSD may be specified per transmit chain or may be specified per space-time stream. Alternatively, the CSD may be applied as a part of the spatial mapper.

When the MU-MIMO is used, some blocks before the spatial mapper may be provided for each user.

The GI inserter 150 prepends a GI to the symbol. The transmitting signal processing unit 100 may optionally perform windowing to smooth edges of each symbol after inserting the GI. The RF transmitter 21 converts the symbols into an RF signal and transmits the RF signal via the antenna unit 30. When the MIMO or the MU-MIMO is used, the GI inserter 150 and the RF transmitter 21 may be provided for each transmit chain.

Figure 3:
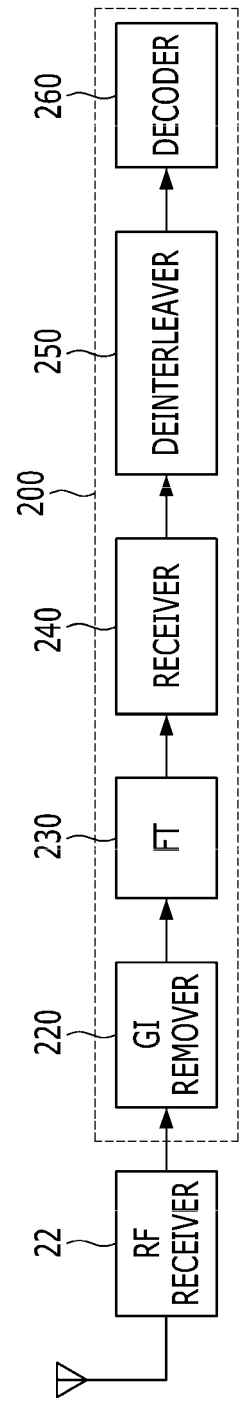
FIG. 3 is a schematic block diagram exemplifying a receiving signal processing unit in the WLAN.

FIG. 3 is a schematic block diagram exemplifying a receiving signal processing unit in the WLAN.

Referring to FIG. 3, a receiving signal processing unit 200 includes a GI remover 220, a Fourier transformer (FT) 230, a demapper 240, a deinterleaver 250, and a decoder 260.

An RF receiver 22 receives an RF signal via the antenna unit 30 and converts the RF signal into the symbols. The GI remover 220 removes the GI from the symbol. When the MIMO or the MU-MIMO is used, the RF receiver 22 and the GI remover 220 may be provided for each receive chain.

The FT 230 converts the symbol (i.e., the time domain block) into a block of the constellation points by using a discrete Fourier transform (DFT) or a fast Fourier transform (FFT). The Fourier transformer 230 may be provided for each receive chain.

When the MIMO or the MU-MIMO is used, the receiving signal processing unit 200 may a spatial demapper for converting the Fourier transformed receiver chains to constellation points of the space-time streams, and an STBC decoder for despreading the constellation points from the space-time streams into the spatial streams.

The demapper 240 demaps the constellation points output from the Fourier transformer 230 or the STBC decoder to the bit streams. If the LDPC encoding is used, the demapper 240 may further perform LDPC tone demapping before the constellation demapping. The deinterleaver 250 deinterleaves the bits of each stream output from the demapper 240. Deinterleaving may be applied only when BCC encoding is used.

When the MIMO or the MU-MIMO is used, the receiving signal processing unit 200 may use a plurality of demappers 240 and a plurality of deinterleavers 250 corresponding to the number of spatial streams. In this case, the receiving signal processing unit 200 may further include a stream deparser for combining the streams output from the deinterleavers 250.

The decoder 260 decodes the streams output from the deinterleaver 250 or the stream deparser. For example, the decoder 100 may be an FEC decoder. The FEC decoder may include a BCC decoder or an LDPC decoder. The receiving signal processing unit 200 may further include a descrambler for descrambling the decoded data. If BCC decoding is used in the decoder, the receiving signal processing unit 200 may further include an encoder deparser for multiplexing the data decoded by a plurality of BCC decoders. If LDPC decoding is used in the decoder, the receiving signal processing unit 100 may not use the encoder deparser.

Figure 4:
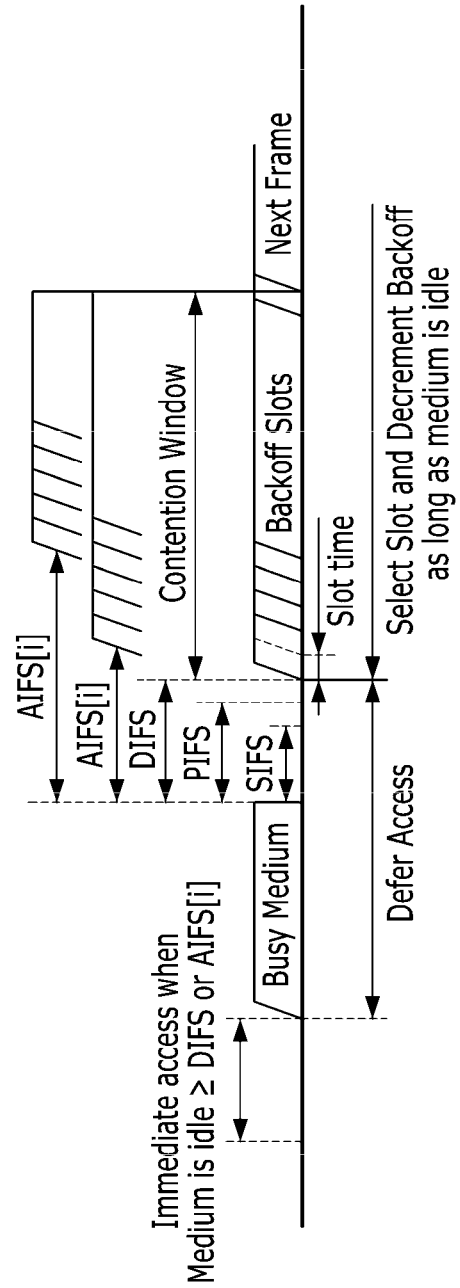
FIG. 4 exemplifies IFS relationships.

FIG. 4 exemplifies interframe space (IFS) relationships.

A data frame, a control frame, or a management frame may be exchanged between WLAN devices.

The data frame is used for transmission of data forwarded to a higher layer. The WLAN device transmits the data frame after performing backoff if a distributed coordination function IFS (DIFS) has elapsed from a time when the medium has been idle. The management frame is used for exchanging management information which is not forwarded to the higher layer. Subtype frames of the management frame include a beacon frame, an association request/response frame, a probe request/response frame, and an authentication request/response frame. The control frame is used for controlling access to the medium. Subtype frames of the control frame include a request to send (RTS) frame, a clear to send (CTS) frame, and an acknowledgement (ACK) frame. In the case that the control frame is not a response frame of the other frame, the WLAN device transmits the control frame after performing backoff if the DIFS has elapsed. In the case that the control frame is the response frame of the other frame, the WLAN device transmits the control frame without performing backoff if a short IFS (SIFS) has elapsed. The type and subtype of frame may be identified by a type field and a subtype field in a frame control field.

On the other hand, a Quality of Service (QoS) STA may transmit the frame after performing backoff if an arbitration IFS (AIFS) for access category (AC), i.e., AIFS[AC], has elapsed. In this case, the data frame, the management frame, or the control frame which is not the response frame may use the AIFC[AC].

Figure 5:
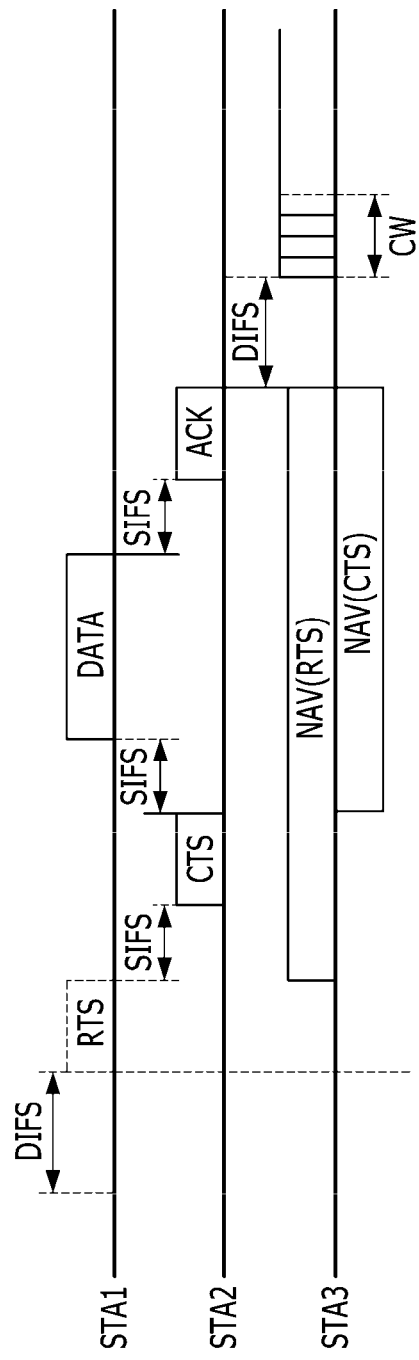
FIG. 5 is a schematic diagram explaining CSMA/CA based frame transmission procedure for avoiding collision between frames in a channel.

FIG. 5 is a schematic diagram explaining a CSMA (carrier sense multiple access)/CA (collision avoidance) based frame transmission procedure for avoiding collision between frames in a channel.

Referring to FIG. 5, STA1 is a transmit WLAN device for transmitting data, STA2 is a receive WLAN device for receiving the data, and STA3 is a WLAN device which may be located at an area where a frame transmitted from the STA1 and/or a frame transmitted from the STA2 can be received by the WLAN device.

The STA1 may determine whether the channel is busy by carrier sensing. The STA1 may determine the channel occupation based on an energy level on the channel or correlation of signals in the channel, or may determine the channel occupation by using a network allocation vector (NAV) timer.

When determining that the channel is not used by other devices during DIFS (that is, the channel is idle), the STA1 may transmit an RTS frame to the STA2 after performing backoff. Upon receiving the RTS frame, the STA2 may transmit a CTS frame as a response of the CTS frame after SIFS.

When the STA3 receives the RTS frame, it may set the NAV timer for a transmission duration of subsequently transmitted frames (for example, a duration of SIFS+CTS frame duration+SIFS+data frame duration+SIFS+ACK frame duration) by using duration information included in the RTS frame. When the STA3 receives the CTS frame, it may set the NAV timer for a transmission duration of subsequently transmitted frames (for example, a duration of SIFS+data frame duration+SIFS+ACK frame duration) by using duration information included in the RTS frame. Upon receiving a new frame before the NAV timer expires, the STA3 may update the NAV timer by using duration information included in the new frame. The STA3 does not attempt to access the channel until the NAV timer expires.

When the STA1 receives the CTS frame from the STA2, it may transmit a data frame to the STA2 after SIFS elapses from a time when the CTS frame has been completely received. Upon successfully receiving the data frame, the STA2 may transmit an ACK frame as a response of the data frame after SIFS elapses.

When the NAV timer expires, the STA3 may determine whether the channel is busy by the carrier sensing. Upon determining that the channel is not used by the other devices during DIFS after the NAV timer has expired, the STA3 may attempt the channel access after a contention window according to random backoff elapses.

Now, an interleaving and deinterleaving method in a wireless communication network according to embodiments of the present invention is described with reference to the drawings. The wireless communication network according to embodiments of the present invention may be a WLAN. Particularly, the wireless communication network according to embodiments of the present invention may be a new version WLAN. One example of the new version WLAN is a high efficiency (HE) WLAN that is being developed by the IEEE 802.11ax task group. Hereinafter, the wireless communication network according to various embodiments of the present invention is assumed as the WLAN, particularly the HE WLAN, for convenience.

Figure 6:
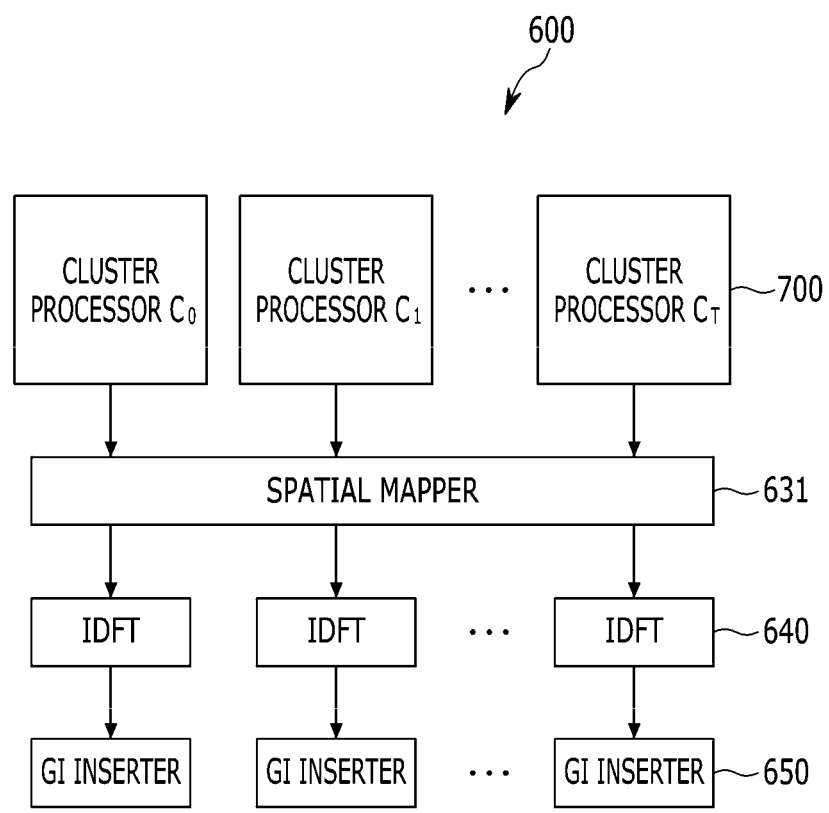
FIG. 6 is a schematic block diagram exemplifying a transmitting signal processing unit of a WLAN device according to an embodiment of the present invention.
Figure 7:
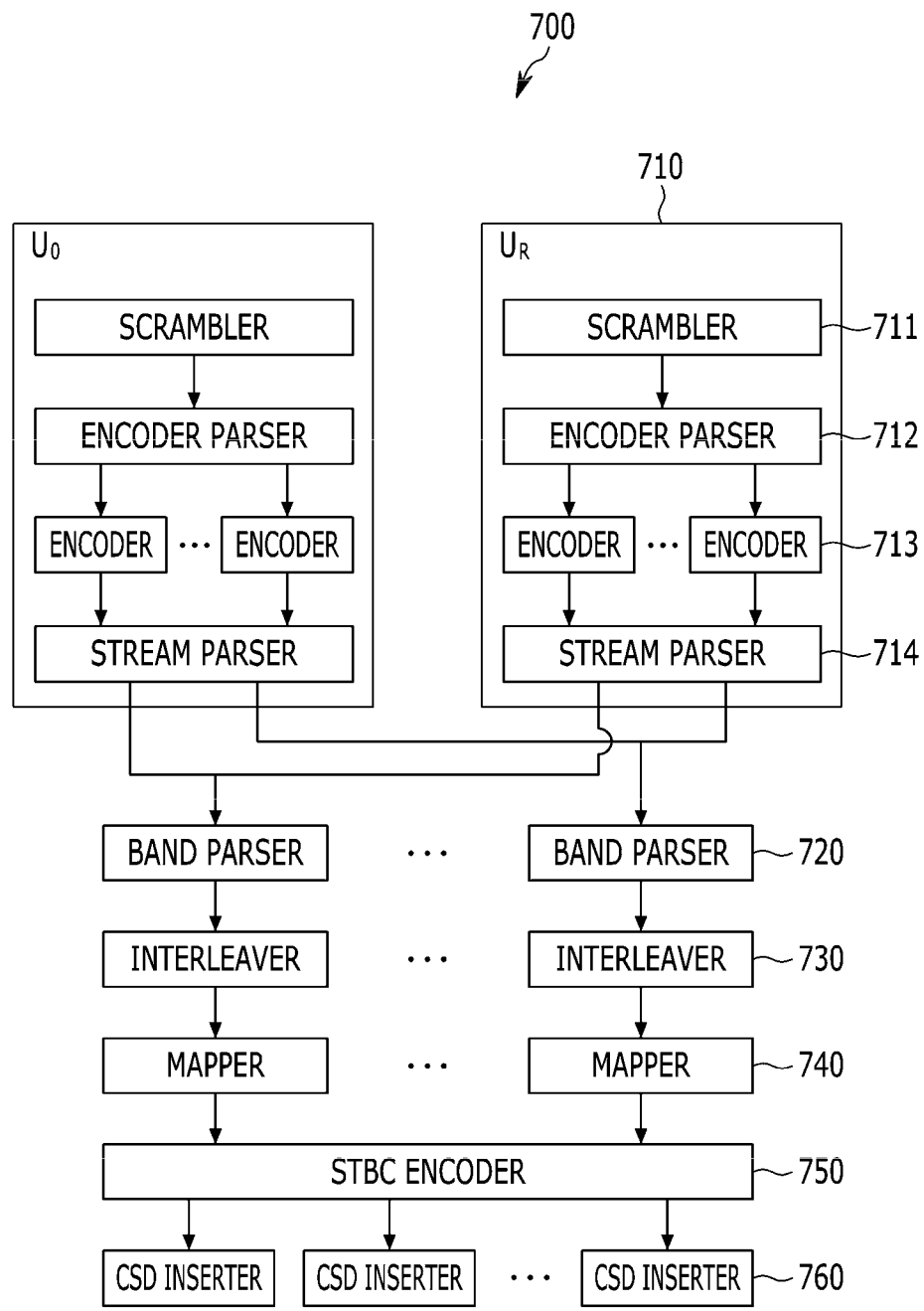
FIG. 7 is a schematic block diagram exemplifying a cluster processor shown in FIG. 6.

FIG. 6 is a schematic block diagram exemplifying a transmitting signal processing unit of a WLAN device according to an embodiment of the present invention, and FIG. 7 is a schematic block diagram exemplifying a cluster processor shown in FIG. 6. It is assumed that a WLAN device according to an embodiment of the present invention uses a downlink OFDMA at transmission and uses an MU-MIMO at the downlink OFDMA transmission.

Referring to FIG. 6, a transmitting signal processing unit 600 may perform an MU-MIMO cluster parsing for transmission where the MU-MIMO and OFDMA are combined, and may include a cluster parser (not shown). The cluster parser may divide input data of a plurality of users into a plurality of clusters $C_0$ to $C_T$ according to bandwidths. One cluster corresponds to a bunch of users sharing a bandwidth.

The transmitting signal processing unit 600 includes a plurality of cluster processors 700, a spatial mapper 631, a plurality of inverse Fourier transformers (IFTs) 640, and a plurality of guard interval (GI) inserters 650.

The spatial mapper 631 maps space-time streams output from the cluster processors 700 to a plurality of transmit chains. The IFT 640 and the GI inserter 650 are provided for each transmit chain. Each IFT 640 converts a block of the constellation points of a corresponding transmit chain output from the spatial mapper 631 to a time domain block (i.e., a symbol) by using, for example, an inverse discrete Fourier transform (IDFT). Each GI inserter 650 prepends a GI to the symbol output from a corresponding IFT 640.

Referring to FIG. 7, each cluster processor 700 includes a plurality of encoding processors 710, a plurality of band parsers 720, a plurality of interleavers 730, a plurality of mappers 740, an STBC encoder 750, and a plurality of CSD inserters 760.

The plurality of encoding processors 710 correspond to a plurality of users $U_0$ to $U_R$ for the MU-MIMO transmission, respectively. Each encoding processor 710 includes a scrambler 711, an encoder parser 712, a plurality of encoders 713, and a stream parser 714.

In each encoding processor 710, the scrambler 711 scrambles input data of a corresponding user, and the encoder parser 712 demultiplexes the scrambled bits among the plurality of encoders 713. The encoders 713 may be BCC encoders. The encoders 713 encode the bits transferred from the encoder parser 712, and the stream parser 714 divides outputs of the encoders 713 into blocks that are sent to different interleavers 730.

The plurality of band parsers 720 correspond to the plurality of interleaver 730, respectively. Each band parser 720 receives data of a plurality of users (a plurality of user data) that are output from the encoding processor 710 to be transferred to a corresponding interleaver 730, and merges the plurality of user data. As such, since the band parser 720 merges the plurality of user data, next blocks can process the data like an OFDM where data for a single user exist.

Each interleaver 730 interleaves bits of the data merged by a corresponding band parser 720.

The plurality of mappers 740 correspond to the plurality of interleavers 730, respectively. Each mapper 740 maps the sequence of bits output from a corresponding interleaver 730 to constellation points. The STBC encoder 750 spreads the constellation points from the mappers 740 into a plurality of space-time streams.

The plurality of CSD inserters 760 correspond to the plurality of space-time streams output from the STBC encoder 750, respectively. Each CSD inserter 760 may insert a cyclic shift diversity (CSD) to a corresponding space-time stream. The CSD may be specified per space-time stream.

Next, a band parser according to various embodiments of the present invention is described with reference to FIG. 8 to FIG. 11.

FIG. 8, FIG. 9, FIG. 10 and FIG. 11 exemplify a band parser in a wireless communication network according to various embodiments of the present invention.

It is exemplified in FIG. 8, FIG. 9, FIG. 10, and FIG. 11 for convenience that 80 MHz bandwidth is divided into four bands of 20 MHz bandwidth and the four bands are respectively allocated to four users. When the 80 MHz bandwidth is divided into four 20 MHz bands, the four bands are referred to as band 0, band 1, band 2, and band 3 beginning from the lowest band. Further, it is exemplified that user 0 uses a BPSK (binary phase shift keying modulation on band 0, user 1 uses a 16-QAM (quadrature amplitude modulation) modulation on band 1, user 2 uses the BPSK modulation on band 2, user 3 uses a QPSK (quadrature phase shift keying) modulation on band 3, and the same number of data tones assigned to each user.

Figure 8:
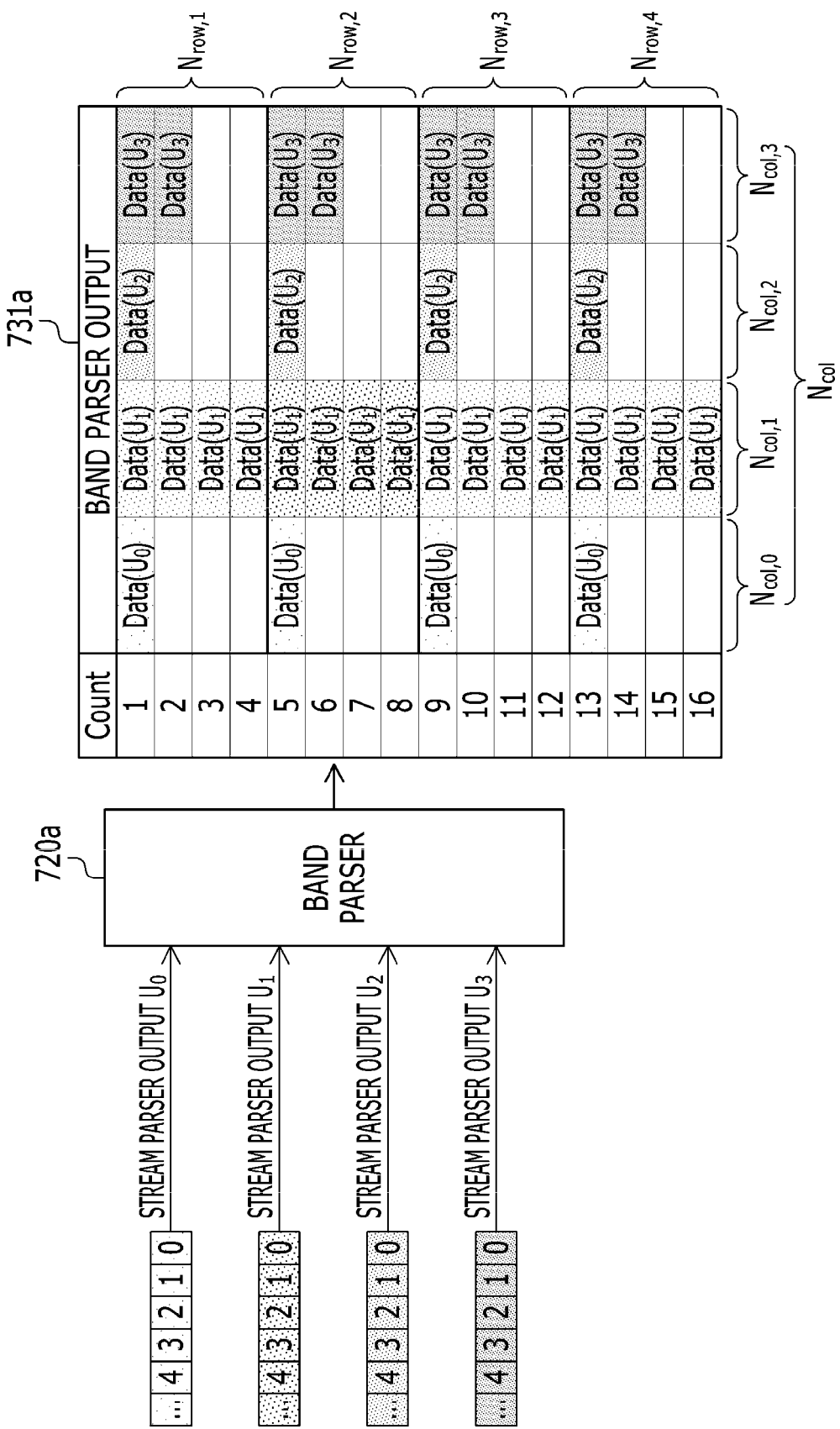
FIG. 8, FIG. 9, FIG. 10 and FIG. 11 exemplify a band parser in a wireless communication network according to various embodiments of the present invention.
Figure 9:
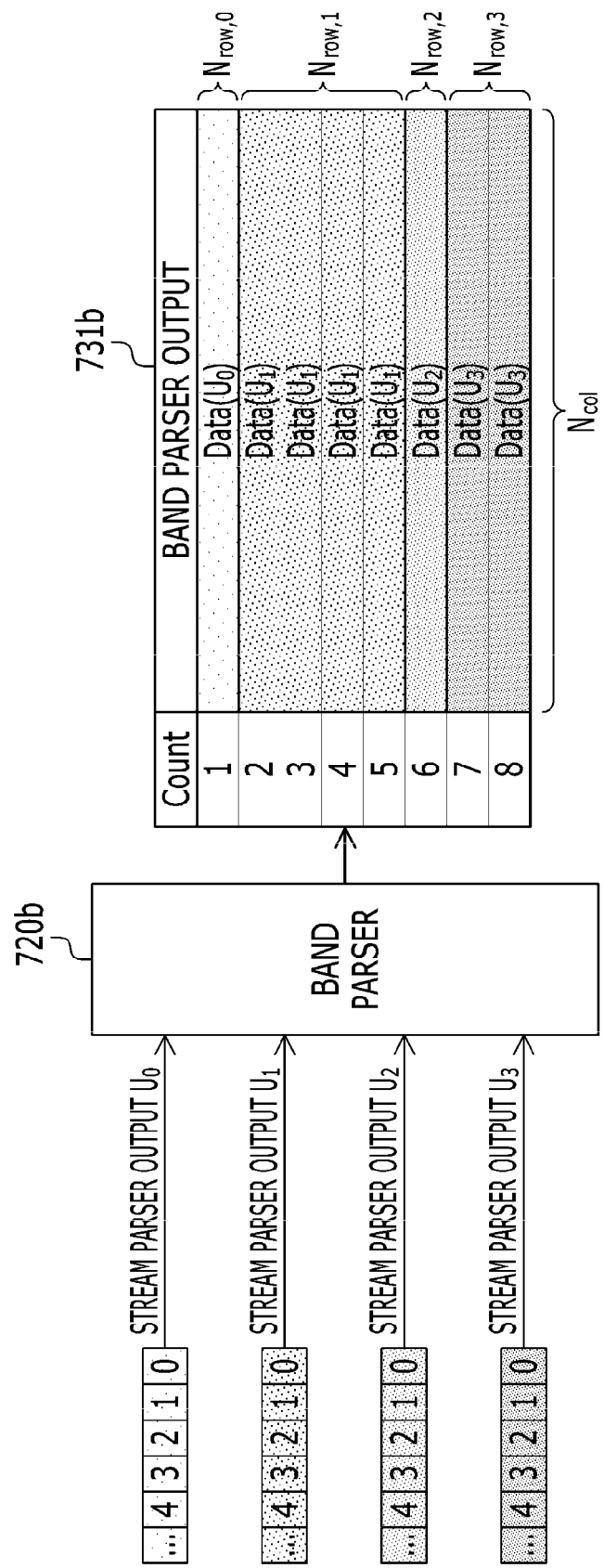

Referring to FIG. 8 and FIG. 9, a band parser 720a or 720b according to some embodiments gathers data of a single user by the band, and merges data of a plurality of users $U_0$ to $U_R$. That is, the band parser 720a or 720b gathers the data of the single user by the 20 MHz band, 40 MHz band, or 60 MHz band. According to embodiments exemplified in FIG. 8 and FIG. 9, since the user data are transmitted for each band, these embodiments can be effectively applied a case that data are transmitted in consideration of interference or channel characteristic for each band. A receiving device can extract its data by receiving a specific band.

First, referring to FIG. 8, the band parser 720a according to an embodiment receives a plurality of user data output from a plurality of stream parsers (714 of FIG. 7) corresponding to the plurality of users $U_0$ to $U_R$, and inputs the data of the users $U_0$ to $U_R$ to a memory 731a of an interleaver (730 of FIG. 7). In some embodiments, the interleaver memory 731a may be a memory 40 shown in FIG. 1 or a memory embodied in a baseband processor (10 of FIG. 1). In some embodiments, the interleaver memory 731a may logically or physically correspond to an interleaver matrix.

In the interleaver memory 731a, columns may be physically or logically divided for the plurality of users. For example, when the number of users $U_0$ to $U_R$ is R+1, the columns may be divided into (R+1) column groups $N_{col,0}$, $N_{col,1}$, . . . , $N_{col,R}$ and the column group $N_{col,m}$ may correspond to the user m ($U_m$). The column group $N_{col,m}$ may correspond to a plurality of columns of a matrix that is assigned to the user $U_m$ in the interleaver matrix.

Accordingly, the band parser 720a arranges data [Data ($U_0$)] of the user 0 ($U_0$) in the column group $N_{col,0}$, arranges data [Data($U_1$)] of the user 1 ($U_1$) in the column group $N_{col,1}$, arranges data [Data($U_m$)] of the user m ($U_m$) in the column group $N_{col,m}$, and arranges data [Data($U_R$)] of the user R ($U_R$) in the column group $N_{col,R}$.

It is assumed that the number $N_{BPSCS}$ of coded bits per subcarrier for the user m is $N_{BPSCS,m}$ and the greatest number $N_{BPSCS}$ of coded bits per subcarrier from among the plurality of users is $N_{BPSCS,M}$. In interleaver memory 731a, each row may be extended in proportion to the greatest number $N_{BPSCS,M}$ of coded bits per subcarrier. In the interleaver memory 731a, the number of receivable bits for one row and one column group $N_{col,m}$ is defined as $NN_{col,m}*N_{BPSCS,M}$. Here, $NN_{col,m}$ denotes the number of columns included in one column group $N_{col,m}$. In some embodiments, each row may be extended to $N_{BPSCS,M}$ rows. Each row may correspond to a row group including $N_{BPSCS,M}$ rows (four rows in an example shown in FIG. 8). For example, one row group may include $N_{BPSCS,M}$ rows. Hereinafter, row(s) extended by the greatest number $N_{BPSCS}$ of coded bits per subcarrier is referred to as a row group.

Accordingly, the band parser 720a receives the data [Data ($U_m$)] of the user m ($U_m$) $NN_{col,m}*N_{BPSCS,m}$ times for the column group $N_{col,m}$ (i.e., receives $NN_{col,m}*N_{BPSCS,m}$ bits), and does not receive the data [Data($U_m$)] of the user m ($U_m$) remaining $NN_{col,m}*(N_{BPSCS,M}-N_{BPSCS,m})$ times. That is, the band parser 720a may fill $NN_{col,m}*(N_{BPSCS,M}-N_{BPSCS,m})$ elements in the interleaver memory 731a with nulls, for example zero.

In the example shown in FIG. 8, the band parser 720a fills ¼ area of the interleaver memory 731a corresponding to the row group $N_{row,1}$ and the column group $N_{col,0}$ with the data [Data($U_0$)] of the user 0, fills an entire area of the interleaver memory 731a corresponding to the row group $N_{row,1}$ and column group $N_{col,1}$ with the data[Data($U_1$)] of the user 1, fills ¼ area of the interleaver memory 731a corresponding to the row group $N_{row,2}$ and the column group $N_{col,2}$ with the data [Data($U_2$)] of the user 2, and fills ½ area of the interleaver memory 731a corresponding to the row group $N_{row,3}$ and the column group $N_{col,3}$ with the data [Data($U_3$)] of the user 3. Further, the band parser 720a arranges the user data for a next row group in the same way and repeats this operation until filling the interleaver memory 731a with data corresponding to one symbol.

If no data are input for a certain user, the column group assigned to the certain user may be filled with zero.

According to the embodiment exemplified in FIG. 8, since one column of the interleaver 730 is filled with data of the same user, the interleaver 730 can output data for each user. Therefore, the data can be sequentially mapped by tone mapping. In this case, when modulation schemes of the users are different, a signal processor where columns corresponding to some users are filled with zero may be performed.

Next, referring to FIG. 9, the band parser 720b according to another embodiment receives a plurality of user data output from a plurality of stream parsers (714 of FIG. 7) corresponding to the plurality of users $U_0$ to $U_R$, and inputs the data of the users $U_0$ to $U_R$ to a memory 731b of an interleaver 730. In the interleaver memory 731b, rows may be physically or logically divided for the plurality of users. For example, when the number of users $U_0$ to $U_R$ is R+1, the rows may be divided into (R+1) row groups $N_{row,0}$, $N_{row,1}$, . . . , $N_{row,R}$ and the row group $N_{row,m}$ may correspond to the user m ($U_m$).

Each row included in the row group $N_{row,m}$ may be determined in proportion to the number $N_{BPSCS}$ of coded bits per subcarrier for the user m ($U_m$). For example, each row of the row group $N_{row,m}$ for the user whose number $N_{BPSCS}$ of coded bits per subcarrier is one may be determined as one row, and each row of the row group $N_{row,m}$ for the other user may be extended to $N_{BPSCS}$ rows. In an example shown in FIG. 9, the user 0 ($U_0$) using the BPSK modulation is assigned the row group $N_{row,0}$ including one row, the user 1 ($U_1$) using the 16-QAM modulation is assigned the row group $N_{row,1}$ including four rows, the user 2 ($U_2$) using the BPSK modulation is assigned the row group $N_{row,2}$ including one row, and the user 3 ($U_3$) using the QPSK modulation is assigned the row group $N_{row,3}$ including two rows.

Accordingly, the band parser 720b arranges data [Data ($U_0$)] of the user 0 ($U_0$) for one symbol in an area of the interleaver memory 731b corresponding to the row group $N_{row,0}$, arranges data [Data($U_1$)] of the user 1 ($U_1$) for one symbol in an area of the interleaver memory 731b corresponding to the row group $N_{row,1}$, arranges data [Data($U_m$)] of the user m ($U_m$) for one symbol in an area of the interleaver memory 731b corresponding to the row group $N_{row,m}$, and arranges data [Data($U_R$)] of the user R ($U_R$) for one symbol in an area of the interleaver memory 731b corresponding to the row group $N_{row,R}$. In some embodiments, the band parser 720b may sequentially receive data symbol by symbol beginning from the user using the lowest band.

As described above, according to the embodiment exemplified in FIG. 9, one row of the interleaver 730 can be filled with data of the same user. In this case, since additional signal process is not required even if modulation schemes of the users are different, the data can be transferred to next blocks without the delay time. Further, an outputting order of the interleaver may be adjusted or additional process may be performed at tone mapping, in order to prevent data of a certain user from being mapped to a band assigned to the other user by the tone mapping.

The band parsers 720a and 720b according to embodiments exemplified in FIG. 8 and FIG. 9 may be applied to a case that the same number of data tones per 20 MHz bandwidth is used. A band parser which can be applied to a case that the different number of data tones per 20 MHz bandwidth is used is described with reference to FIG. 10 and FIG. 11.

Figure 10:
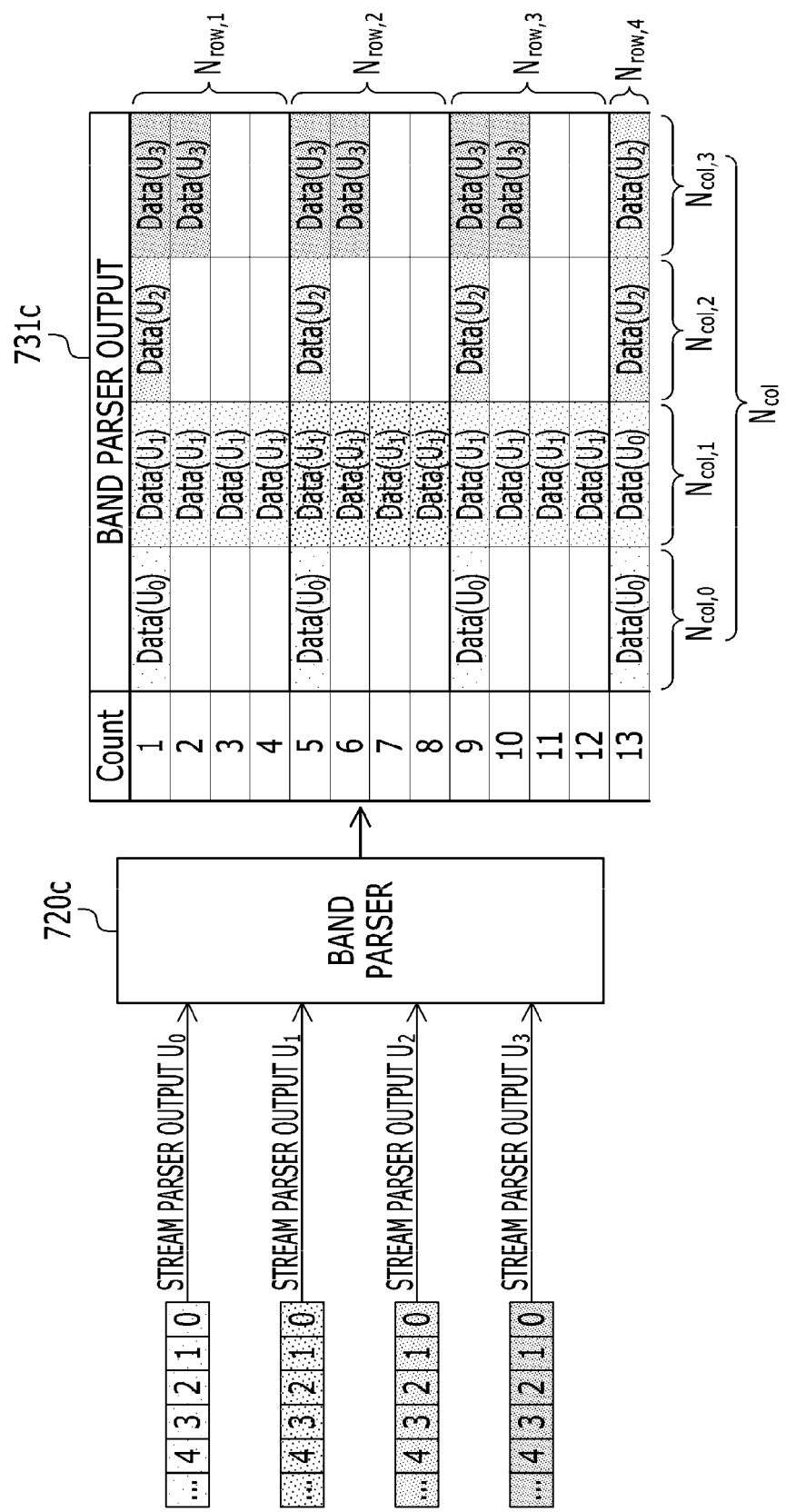
Figure 11:
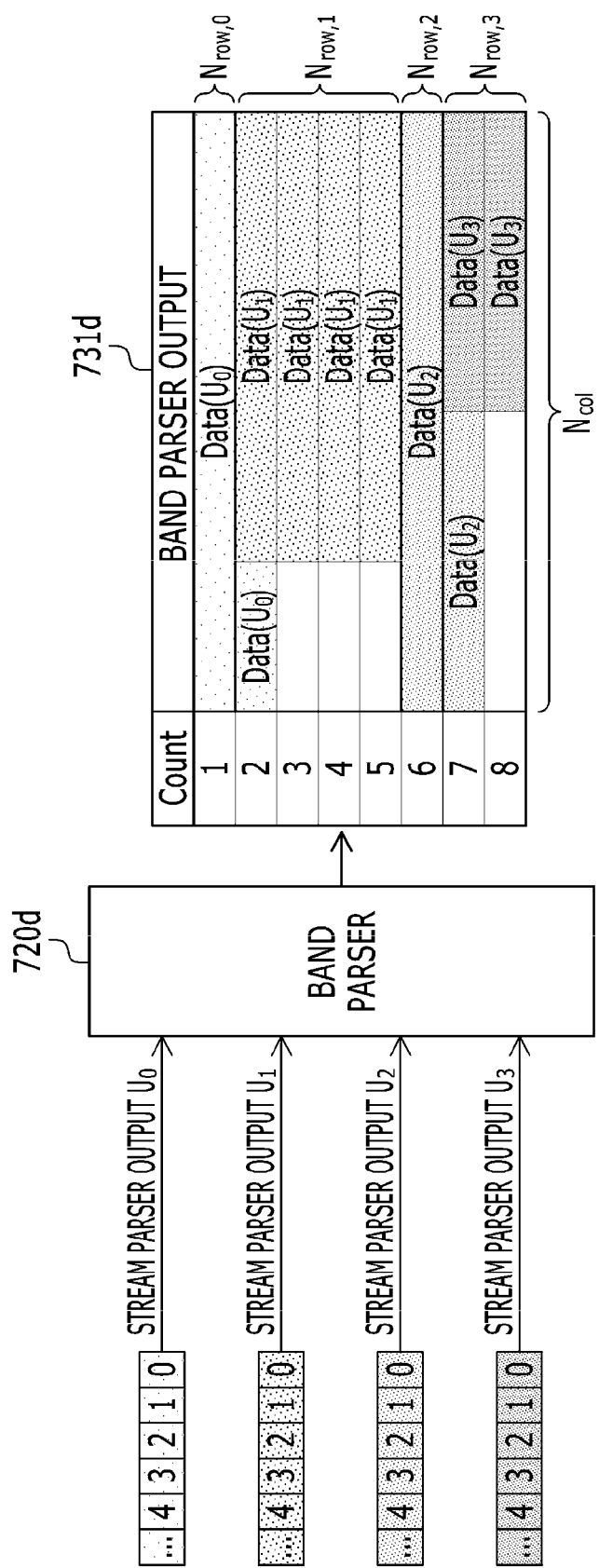

Referring to FIG. 10 and FIG. 11, when data for a plurality of users $U_0$ to $U_R$ are arranged in an interleaver memory 731c or 731d, the band parsers 720c and 720d according to some embodiments permit part or whole of data for a single user to be scattered. In this case, a receiving device can extract its data after receiving and deinterleaving entire bands. However, a conventional interleaver matrix or a conventional deinterleaver matrix may be used at the time of interleaving or deinterleaving, and the number of data tones allocated for each user may be freely varied within a range permitted by a band assigned to a corresponding user.

First, referring to FIG. 10, the band parser 720c divides a plurality of columns into (R+1) column groups $N_{col,0}$, $N_{col,1}$, . . . , $N_{col,R}$ and corresponds the column group $N_{col,m}$ to the user m ($U_m$) in the similar to the band parser 720a shown in FIG. 8. Accordingly, the band parser 720c arranges data [Data($U_0$)] of the user 0 ($U_0$) in an area of an interleaver memory 731c corresponding to the column group $N_{col,0}$, arranges data [Data($U_1$)] of the user 1 ($U_1$) in an area of the interleaver memory 731c corresponding to the column group $N_{col,1}$, arranges data [Data($U_m$)] of the user m ($U_m$) in an area of the interleaver memory 731c corresponding to the column group $N_{col,m}$, and arranges data [Data($U_R$)] of the user R ($U_R$) in an area of the interleaver memory 731c corresponding to the column group $N_{col,R}$.

In some embodiments, when the number of columns in the interleaver 730 cannot be divided by the number R of users, the band parser 720c may allocate data of different users to the same column group.

In some embodiments, the last row (i.e., the last row group) of the column group assigned one user may be arranged data of the other user.

An example shown in FIG. 10 represents that the total number $N_{col}$ of columns cannot be divided by the number R of users and the number of columns in the column group $N_{col,0}$ corresponding to the user 0 ($U_0$) and the number of columns in the column group $N_{col,2}$ corresponding to the user 2 ($U_2$) are less than the number of columns in the other column group. For example, when the total number $N_{col}$ of columns is 26 and the number R of users is 4, 26 cannot be divided by 4. Accordingly, six columns may be allocated to each of the column groups $N_{col,0}$ and $N_{col,2}$ corresponding to the users 0 and 2 ($U_0$ and $U_2$), and seven columns may be allocated to each of the column groups $N_{col,1}$ and $N_{col,3}$ corresponding to the users 1 and 3 ($U_1$ and $U_3$). Therefore, for at least one last row group, the band parser 720c may, if necessary, arrange some of the data [Data($U_0$)] of the user 0 ($U_0$) in the area of the interleaver memory 731c corresponding to the column group $N_{col,1}$ of the user 1 ($U_1$) and arrange some of the data [Data($U_2$)] of the user 2 ($U_2$) in the area of the interleaver memory 731c corresponding to the column group $N_{col,3}$ of the user 3 ($U_3$).

In some embodiments, when the total number of data bits for all users is less than the number of data tones provided by the overall bandwidth, the band parser 720c may fill an empty area of the interleaver memory 731c with a null.

Next, referring to FIG. 11, the band parser 720d divides a plurality of rows into (R+1) row groups $N_{col,0}$, $N_{col,1}$, ..., $N_{col,R}$ and corresponds the row group $N_{row,m}$ to the user m ($U_m$) in the similar to the band parser 720b shown in FIG. 9. Accordingly, the band parser 720d arranges data [Data($U_0$)] of the user 0 ($U_0$) in an area of an interleaver memory 731d corresponding to the row group $N_{row,0}$, arranges data [Data($U_1$)] of the user 1 ($U_1$) in an area of the interleaver memory 731d corresponding to the row group $N_{row,1}$, arranges data [Data($U_m$)] of the user m ($U_m$) in an area of the interleaver memory 731c corresponding to the row group $N_{row,m}$, and arranges data [Data($U_R$)] of the user R ($U_R$) in an area of the interleaver memory 731d corresponding to the row group $N_{row,R}$.

The band parser 720d may arrange data of different users in the first (i.e., an initial) row and the last row of the row group $N_{row,m}$ corresponding to each user. That is, the last row of one row group $N_{row,m}$ may be overlapped with the first row of the row group $N_{row,m+1}$ adjacent to the row group $N_{row,m}$.

As exemplified in FIG. 11, in the case that some bits of the data [Data($U_0$)] of the user 0 ($U_0$) are remained when the band parser 720d arranges the data [Data($U_0$)] for one symbol in the area of the interleaver memory 731d corresponding to the row group $N_{row,0}$, the band parser 720d may arrange the remaining bits in an area (Count 2 of FIG. 11) of the interleaver memory 731d corresponding to the first row of the row group $N_{row,1}$ for the user 1 ($U_1$). The first row of the row group $N_{row,1}$ may be treated as the last row of the row group $N_{row,0}$.

Subsequently, the band parser 720d arranges the data [Data($U_1$)] of the user 1 ($U_1$) for one symbol in the area of the interleaver memory 731d corresponding to the row group $N_{row,1}$. Further, in the case that some bits of the data [Data($U_2$)] of the user 2 ($U_2$) are remained when the band parser 720d arranges the data [Data($U_2$)] for one symbol in the area of the interleaver memory 731d corresponding to the row group $N_{row,2}$, the band parser 720d may arrange the remaining bits in an area (Count 7 of FIG. 11) of the interleaver memory 731d corresponding to the first row of the row group $N_{row,3}$ for the user 3 ($U_3$). The first row of the row group $N_{row,3}$ may be treated as the last row of the row group $N_{row,2}$. Subsequently, the band parser 720d arranges the data [Data($U_3$)] of the user 3 ($U_3$) for one symbol in the area of the interleaver memory 731d corresponding to the row group $N_{row,3}$.

In some embodiments, since the second to last rows (the second to fourth rows in FIG. 11) of the column group to which the data [Data($U_0$)] of the user 0 ($U_0$) is assigned in the row group $N_{row,1}$ do not have the data [Data($U_0$)] of the user 0 ($U_0$), the band parser 720d may perform the signal process described with reference to FIG. 8. For example, the band parser 720d may fill with nulls the columns at which the data [Data($U_0$)] of the user 0 ($U_0$) are located in the second to fourth rows (Counts 3, 4, and 5 of FIG. 11). Further, since the second to last rows (Count 8 of FIG. 11) of the column group to which the data [Data($U_3$)] of the user 3 ($U_3$) is assigned in the row group $N_{row,3}$ do not have the data [Data($U_2$)] of the user 2 ($U_2$), the band parser 720d may fill with nulls the columns at which the data [Data($U_2$)] of the user 2 ($U_2$) are located in the second row (Count 8 of FIG. 11).

In some embodiments, when the total number of data bits for all users is less than the number of data tones provided by the overall bandwidth, the band parser 720d may fill an area between data of one user and data of the other user with nulls. Accordingly, the signal process to be performed when the data of the different users are allocated to the same row can be omitted.

As described above, since the data of the different users can be arranged in one column group or one row group in FIG. 10 and FIG. 11, the band parsers 720c and 720d exemplified in FIG. 10 and FIG. 11 may be applied to a case that the number of data tones per 20 MHz bandwidth is different.

Next, the number of data tones in a wireless communication network according to an embodiment of the present invention.

An OFDM-based IEEE 802.11ac WLAN supports a 20 MHz transmission mode using 20 MHz bandwidth, a 40 MHz transmission mode using 40 MHz bandwidth, an 80 MHz transmission mode using 80 MHz bandwidth, and a 160 MHz transmission mode using 160 MHz bandwidth on the basis of 20 MHz bandwidth. A wireless communication network according to an embodiment of the present invention may support an OFDMA 20 MHz mode, an OFDMA 40 MHz mode, an OFDMA 60 MHz mode, an OFDMA 80 MHz mode, and/or an OFDMA 160 MHz mode on the basis of 20 MHz bandwidth.

In the OFDMA 20 MHz mode, a band of 20 MHz bandwidth may be assigned to one user. In the OFDMA 40 MHz mode, bands of 20 MHz bandwidth may be assigned to two users, respectively, or a band of 40 MHz bandwidth may be assigned to one user. The method of the OFDMA 60 MHz mode, bands of 20 MHz bandwidth may be assigned to three users, respectively. Alternatively, a band of 40 MHz bandwidth may be assigned to one user and a band of 20 MHz bandwidth may be assigned to the other user, or a band of 60 MHz bandwidth may be allocated to one user. In the OFDMA 80 MHz mode, bands of 20 MHz bandwidth may be assigned to four users, respectively, or a band of 40 MHz bandwidth may be assigned to one user and two bands of 20 MHz bandwidth may be assigned to two other users, respectively. Alternatively, a band of 60 MHz bandwidth may be assigned to one user and a band of 20 MHz bandwidth may be assigned to the other user, or a band of 80 MHz bandwidth may be assigned to one user. The OFDMA 160 MHz mode may be extended from the OFDMA 80 MHz mode by using a segment parser.

In some embodiments, if a certain band is not suitable for all users due to the interference or the channel characteristic, a transmitting device may transmit a frame with emptying the certain band.

While it has been exemplified in an embodiment of the present invention that 20 MHz bandwidth is a minimum bandwidth unit, a bandwidth being narrower or wider than 20 MHz bandwidth may be used as the minimum bandwidth unit. For example, 5 MHz bandwidth or 10 MHz bandwidth may be used as the minimum bandwidth unit.

Next, a tone allocation in the IEEE 802.11ac WLAN is described with reference to FIG. 12, FIG. 13, and FIG. 14.

FIG. 12 shows a tone allocation of a 20 MHz transmission mode in the IEEE 802.11ac WLAN, FIG. 13 shows a tone allocation of a 40 MHz transmission mode in the IEEE 802.11ac WLAN, and FIG. 14 shows a tone allocation of an 80 MHz transmission mode in the IEEE 802.11ac WLAN.

Referring to FIG. 12, a 20 MHz transmission mode uses 64 subcarriers, i.e., 64 tones including one tone used as a DC (direct current) subcarrier, four tones used as pilots, and seven tones used as guards. Accordingly, 52 tones among the 64 tones are used as data tones. As exemplified in FIG. 12, when a subcarrier index (SC idx) of the DC is 0, tones whose subcarrier indices are −21, −7, 7, and 21 may be used as the pilots, and some tones (i.e., tones whose subcarrier indices are −32 to −29 and 29 to 31) of both ends with the DC as the center may be used as the guards.

Referring to FIG. 13, a 40 MHz transmission mode uses 128 tones including three center tones used as DC subcarriers, six tones used as pilots, and eleven tones used as guards. Accordingly, 108 tones among the 128 tones are used as data tones. As exemplified in FIG. 13, when subcarrier indices of the DCs is −1, 0, and 1, tones whose subcarrier indices are 53, −25, −11, 11, 25, and 53 may be used as the pilots, and some tones (i.e., tones whose subcarrier indices are −64 to −59 and 59 to 63) of both ends with the DC as the center may be used as the guards.

Referring to FIG. 14, an 80 MHz transmission mode uses 256 tones including three center tones used as DC subcarriers, eight tones used as pilots, and eleven tones used as guards. Accordingly, 234 tones among the 256 tones are used as data tones. As exemplified in FIG. 14, when subcarrier indices of the DCs is −1, 0, and 1, tones whose subcarrier indices are −103, −75, −39, −11, 11, 39, 75, and 103 may be used as the pilots, and some tones (i.e., tones whose subcarrier indices are −128 to −123 and 123 to 127) of both ends with the DC as the center may be used as the guards.

Next, a tone allocation in a wireless communication network according to an embodiment of the present invention is described with reference to FIG. 15, FIG. 16, and FIG. 17. An example using a 20 MHz bandwidth unit is described below for convenience.

Figure 16A:
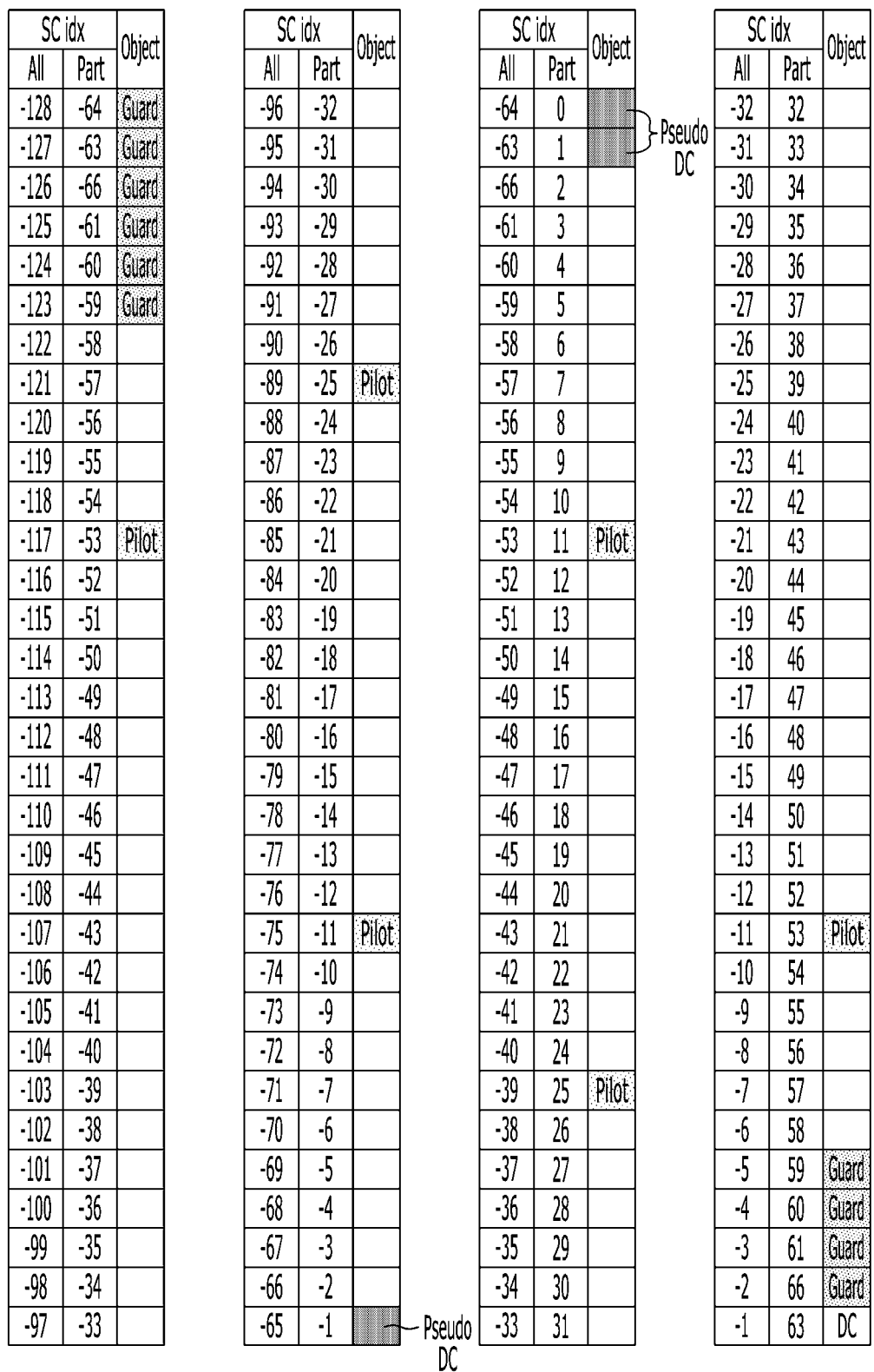

FIG. 15 exemplifies a tone allocation of an OFDMA 60 MHz mode in a wireless communication network according to an embodiment of the present invention, FIG. 16A and FIG. 16B exemplify a tone allocation of an OFDMA 80 MHz mode in a wireless communication network according to an embodiment of the present invention, and FIG. 17A and FIG. 17B exemplify a tone allocation of an OFDMA 80 MHz mode in a wireless communication network according to another embodiment of the present invention.

As described above, the band parser 720a or 720b exemplified in FIG. 8 or FIG. 9 may be applied to a case that the number of data tones per 20 MHz bandwidth is the same. Accordingly, in some embodiments, the band parser 720a or 720b exemplified in FIG. 8 or FIG. 9 may use data tones used in the IEEE 802.11ac WLAN.

In some embodiments, the band parser 720a or 720b may use the tone allocation exemplified in FIG. 12, in the OFDMA 20 MHz mode. Accordingly, 52 tones among 64 tones are used as the data tones.

In the 40 MHz mode, the band parser 720a or 720b may use a tone allocation where the tone allocation of the OFDMA 20 MHz mode is repeated twice. In this case, if the 20 MHz mode using four guards and three guards at both ends as shown in FIG. 12 is repeated twice, interference may occur at a legacy device using the adjacent band. Further, since unnecessary guards exist at a center of 40 MHz bandwidth, frequency resources can be wasted. Accordingly, the 40 MHz mode in another embodiment uses the tone allocation exemplified in FIG. 13 and uses 54 data tones per 20 MHz bandwidth.

Referring to FIG. 15, the OFDMA 60 MHz mode uses 192 tones including three center tones used as DC subcarriers, eight tones used as pilots, and twelve tones uses as guards. When subcarrier indices of the DCs is −1, 0, and 1, some tones (for example, tones whose subcarrier indices are −96 to −91 and 90 to 95) of both ends with the DC as the center may be used as the guards. Further, tones whose subcarrier indices are for example −75, −53, −25, −11, 11, 25, 53, and 75 may be used as the pilots.

In the case that the OFDMA 60 MHz mode is divided into three 20 MHz bands, the three bands are referred to as band 0, band 1, and band 2 beginning from the lowest band. Six guards and two pilots are allocated to the band 0 such that 56 tones can be used as data tones in the band 0. Further, six guards and two pilots are allocated to the band 2 such that 56 tones can be used as data tones in the band 2. Four pilots and three DCs are allocated to the band 1 such that 57 tones can be used as data tones in the band 1. In order to allow the three bands to use the same number of data tones, a pseudo DC may be additionally allocated to the band 1. For example, a tone whose subcarrier index is 2 may be allocated as the pseudo DC. Accordingly, in the band 0, tones whose partial subcarrier indices (Part_SC_idx) are −32 to −27 may be used as the guards, and tones whose partial subcarrier indices are −11 and 11 may be used as the pilots. In the band 1, tones whose partial subcarrier indices are −1, 0 and 1 may be used as the DCs, a tone whose partial subcarrier index is 2 may be used as the pseudo DC, and tones whose partial subcarrier indices are −25, −11, 11, and 25 may be used as the pilots. In the band 2, tones whose partial subcarrier indices are −11 and 11 may be used as the pilots, and tones whose partial subcarrier indices are 26 to 31 may be used as the guards. Then, all of the bands can use 56 data tones.

The number of guards is 11 and the number of pilots is 6 in the 40 MHz transmission mode of the IEEE 802.11ac WLAN, and the number of guards is 11 and the number of pilots is 8 in the 80 MHz transmission mode of the IEEE 802.11ac WLAN. Further, the number of DCs is 3 in the 40 MHz transmission mode and the 80 MHz transmission mode uses. As such, the tone allocation exemplified in FIG. 15 adds the pseudo DC to the band 1 and adds the additional guard to the band 3 with maintaining the positions of the pilots in the IEEE 802.11ac WLAN as far as possible. Therefore, the tone allocation exemplified in FIG. 15 can be similar to the tone allocation of the IEEE 802.11ac WLAN but can increase the number of data tones.

Assuming that the OFDMA 80 MHz mode allocates tones like the tone allocation of the IEEE 802.11ac WLAN exemplified in FIG. 14, three tones are used as DC subcarriers, eight tones are used as pilots and eleven tones are used as guards from among 256 tones. In the case that the OFDMA 80 MHz mode is divided into four 20 MHz bands, the four bands are referred to as band 0, band 1, band 2, and band 3 beginning from the lowest band. Then, 64 tones are allocated to each band. Six guards and two pilots are allocated to the band 0 such that 56 tones can be used as data tones in the band 0. One DC and two pilots are allocated to the band 1 such that 61 tones can be used as data tones in the band 1. Two DCs and two pilots are allocated to the band 2 such that 60 tones can be used as data tones in the band 2. Five guards and two pilots are allocated to the band 3 such that 57 tones can be used as data tones in the band 3. In order to allow all of the bands to use the same number of data tones, the maximum number of data tones that can be allocated to each band is 56.

Further, in a case that a receiving device is allocated 40 or less MHz bandwidth from among 80 MHz bandwidth, unnecessary signal process can be performed if the receiving device receives and processes all of the 80 MHz bandwidth. Accordingly, the OFDMA 80 MHz mode may use a tone allocation where the tone allocation of the OFDMA 40 MHz mode is repeated twice in order to allow the receiving device to receive and process only the 40 MHz bandwidth.

Referring to FIG. 16A and FIG. 16B, in one embodiment, the tone allocation of the 80 MHz transmission mode exemplified in FIG. 14 is changed such that 40 MHz bandwidth of the bands 0 and 1 and 40 MHz bandwidth of the band 2 and 3 are designed similar to the tone allocation of the 40 MHz transmission mode exemplified in FIG. 13. Accordingly, each band is allocated three pilots. For example, tones whose subcarrier indices are −117, −89, and −75 may be allocated the pilots in the band 0, tones whose subcarrier indices are −53, −39, and −11 may be allocated the pilots in the band 1, tones whose subcarrier indices are 11, 39, and 53 may be allocated the pilots in the band 2, and tones whose subcarrier indices are 75, 89, and 117 may be allocated the pilots in the band 3. Further, guards are added to an end of the band 1 and an end of the band 2 to allow the receiving device to receive and process 40 MHz bandwidth. When a DC allocated to a tone whose subcarrier index is −1 in the band 1 is used as the guard, four guards may be additionally allocated to the band 1. Further, when DCs allocated to tones whose subcarrier indices are 0 and 1 in the band 2 are used as the guards, four guards may be additionally allocated to the band 2. For example, the guards may be additionally allocated to tones whose subcarrier indices are −5 to −2 in the band 1, and the guards may be additionally allocated to tones whose subcarrier indices are 2 to 5 in the band 2. Furthermore, three pseudo DCs capable of playing a role as DCs may be allocated to a center of 40 MHz bandwidth in the bands 0 and 1, and three pseudo DCs capable of playing a role as DCs may be allocated to a center of 40 MHz bandwidth in the bands 2 and 3. For example, the pseudo DCs may be allocated to tones whose subcarrier indices are −65 to −63 in the bands 0 and 1, and the pseudo DCs may be allocated to tones whose subcarrier indices are 63 to 65 in the bands 2 and 3.

Accordingly, in the 40 MHz bandwidth of the bands 0 and 1, the tones whose partial subcarrier indices are −64 to −59 and 59 to 62 may be used as the guards, the tone whose partial subcarrier index is 63 may be used as the DC, the tones whose partial subcarrier indices are −53, −25, −11, 11, 25, and 53 may be used as the pilots, and the tones whose subcarrier indices are −1, 0, and 1 may be used as the pseudo DCs. In the 40 MHz bandwidth of the bands 2 and 3, the tones whose partial subcarrier index is −64 and −63 may be used as the DCs, the tones whose partial subcarrier indices are −62 to −59 and 59 to 63 may be used as the guards, the tones whose partial subcarrier indices are −53, −25, −11, 11, 25, and 53 may be used as the pilots, and the tones whose subcarrier indices are −1, 0, and 1 may be used as the pseudo DCs. Then, each band can use 54 data tones from among the 64 tones.

Referring to FIG. 17A and FIG. 17B, in another embodiment, two pilots are allocated to each band. For example, tones whose subcarrier indices are −103 and −75 may be allocated pilots in the band 0, tones whose subcarrier indices are −39 and −11 may be allocated pilots in the band 1, tones whose subcarrier indices are 11 and 39 may be allocated pilots in the band 2, and tones whose subcarrier indices are 75 and 103 may be allocated pilots in the band 3. Accordingly, in the band 0, the tones whose partial subcarrier indices are −32 to −27 may be used as the guards, and the tones whose partial subcarrier indices are −7 and 21 may be used as the pilots. In the band 1, the tones whose partial subcarrier indices are −7 and 21 may be used as the pilots, the tones whose partial subcarrier indices are 26 to 30 may be used as the guards, and the tone whose partial subcarrier index is 31 may be used as the DC. In the band 2, the tones whose partial subcarrier indices are −32 and −31 may be used as the DCs, the tones whose partial subcarrier indices are −30 to −27 may be used as the guards, and the tones whose partial subcarrier indices are −21 and 7 may be used as the pilots. In the band 3, the tones whose partial subcarrier indices are −21 and 7 may be used as the pilots, and the tones whose partial subcarrier indices are 26 to 31 may be used as the guards. Then, can use 56 data tones from among the 64 tones As described above, the previous WLAN, for example the IEEE 802.11ac WLAN uses 52 data tones in the 20 MHz bandwidth, but the different number of data tones per 20 MHz bandwidth can be used in a wireless communication network according to an embodiment of the present invention. For example, the OFDMA 40 MHz mode may use 54 data tones per 20 MHz bandwidth, the OFDMA 60 MHz mode may use 56 data tones per 20 MHz bandwidth, and the OFDMA 80 MHz mode may use 54 or 56 data tones per 20 MHz bandwidth.

Hereinafter, an interleaver matrix of an interleaver 730 supporting such data tones is described.

Table 1 and Table 2 show examples of an interleaver matrix in a wireless communication network according to an embodiment of the present invention. Table 1 shows examples of an interleaver matrix that can be used by a band parser 720a exemplified in FIG. 8, and Table 2 shows examples of an interleaver matrix that can be used by a band parser 720b exemplified in FIG. 9.

TABLE 1

| Overall BW (MHz) | BW Usage (MHz) | IEEE 802.11ac (row × col) | Embodiment of the present invention(row × col) | |
|---|---|---|---|---|
| | | | 54 type | 56 type |
| 20 | 20 | 4 × 13 | | 4 × 13 |
| 40 | 20 + 20 | — | 9 × 6 + 9 × 6 | — |
| | 40 | 6 × 18 | 6 × 18 | — |
| 60 | 20 + 20 + 20 | — | — | 8 × 7 + 8 × 7 + 8 × 7 |
| | 40 + 20 | — | — | 8 × 14 + 8 × 7 |
| | 60 | — | — | 8 × 21 |

TABLE 1-continued

| Overall BW (MHz) | IEEE BW Usage 802.11ac (MHz) | IEEE 802.11ac (row × col) | Embodiment of the present invention(row × col) 54 type | Embodiment of the present invention(row × col) 56 type |
|---|---|---|---|---|
| 80 | 20 + 20 + 20 + 20 | — | 9 × 6 + 9 × 6 + 9 × 6 + 9 × 6 | 8 × 7 + 8 × 7 + 8 × 7 + 8 × 7 |
|  | 40 + 20 + 20 | — | 9 × 12 + 9 × 6 + 9 × 6 | 8 × 14 + 8 × 7 + 8 × 7 |
|  | 40 + 40 | — | 9 × 12 + 9 × 12 | 8 × 14 + 8 × 14 |
|  | 60 + 20 | — | 9 × 18 + 9 × 6 | 8 × 21 + 8 × 7 |
|  | 80 | 9 × 26 | 9 × 26 | 9 × 26 |

TABLE 2

| Overall BW (MHz) | IEEE BW Usage 802.11ac (MHz) | IEEE 802.11ac (row × col) | Embodiment of the present invention (row × col) 54 type | Embodiment of the present invention (row × col) 56 type |
|---|---|---|---|---|
| 20 | 20 | 4 × 13 |  | 4 × 13 |
| 40 | 20 + 20 | — | 2 × 27 + 2 × 27 | — |
|  | 40 | 6 × 18 | 6 × 18 | — |
| 60 | 20 + 20 + 20 | — | — | 2 × 28 + 2 × 28 + 2 × 28 |
|  | 40 + 20 | — | — | 4 × 28 + 2 × 28 |
|  | 60 | — | — | 6 × 28 |
| 80 | 20 + 20 + 20 + 20 | — | 2 × 27 + 2 × 27 + 2 × 27 | 2 × 28 + 2 × 28 + 2 × 28 + 2 × 28 |
|  | 40 + 20 + 20 | — | 4 × 27 + 2 × 27 + 2 × 27 | 4 × 28 + 2 × 28 + 2 × 28 |
|  | 40 + 40 | — | 4 × 27 + 4 × 27 | 4 × 28 + 4 × 28 |
|  | 60 + 20 | — | 6 × 27 + 2 × 27 | 6 × 28 + 2 × 28 |
|  | 80 | 9 × 26 | 9 × 26 | 9 × 26 |

While it has been assumed in Table 1 and Table 2 that the number $N_{BPSCS}$ of coded bits per subcarrier for all users is 1, an interleaver matrix may be extended depending on the number $N_{BPSCS}$ of coded bits per subcarrier.

Further, in Table 1 and Table 2, an order of bandwidth may be changed. For example, in Table 1 and Table 2, "40+20" represents a case that an 8×14 matrix is allocated to the user 0 and an 8×7 matrix is allocated to the user 1 or a 4×28 matrix is allocated to the user 0 and a 2×28 matrix is allocated to the user 1 when a band of 40 MHz bandwidth is assigned to the user 0 and a band of 20 MHz bandwidth is assigned to the user 1. Alternatively, the band of 20 MHz bandwidth may be assigned to the user 0 and the band of 40 MHz bandwidth may be assigned to the user 1. In this case, the 8×7 matrix may be allocated to the user 0 and the 8×14 matrix may be allocated to the user 1, or the 2×28 matrix may be allocated to the user 0 and the 4×28 matrix may be allocated to the user 1.

Further, the interleaver matrices shown in Table 1 and Table 2 are merely example. The interleaver matrices may be variously changed depending on the size of bandwidth and/or the number of data tones used in the bandwidth.

Next, example interleaver matrices in a wireless communication network according to an embodiment of the present invention are described with reference to FIG. 18 to FIG. 64. In FIG. 18 to FIG. 64, arranging user data in accordance with an interleaver matrix means writing the user data in an interleaver memory in accordance with the interleaver matrix. Accordingly, each element of the interleaver matrix may correspond to each address of the interleaver memory.

Figure 18:
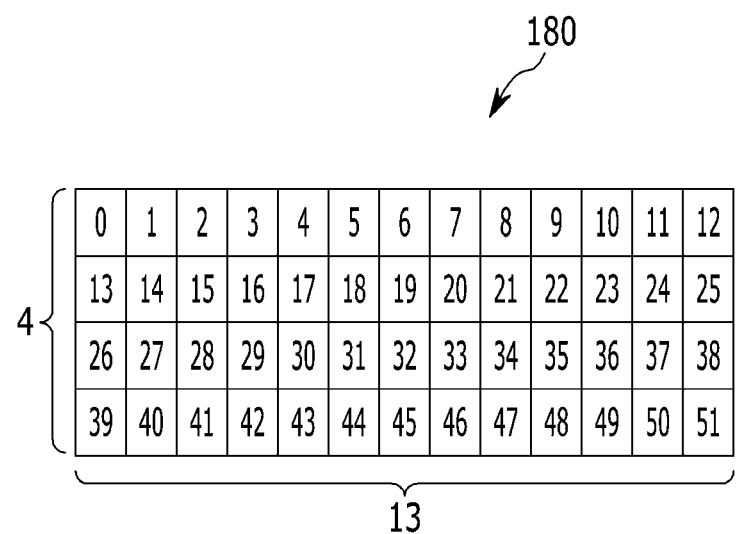
FIG. 18 shows an example of an interleaver matrix being applicable to an OFDMA 20 MHz mode in a wireless communication network according to an embodiment of the present invention.
Figure 19:
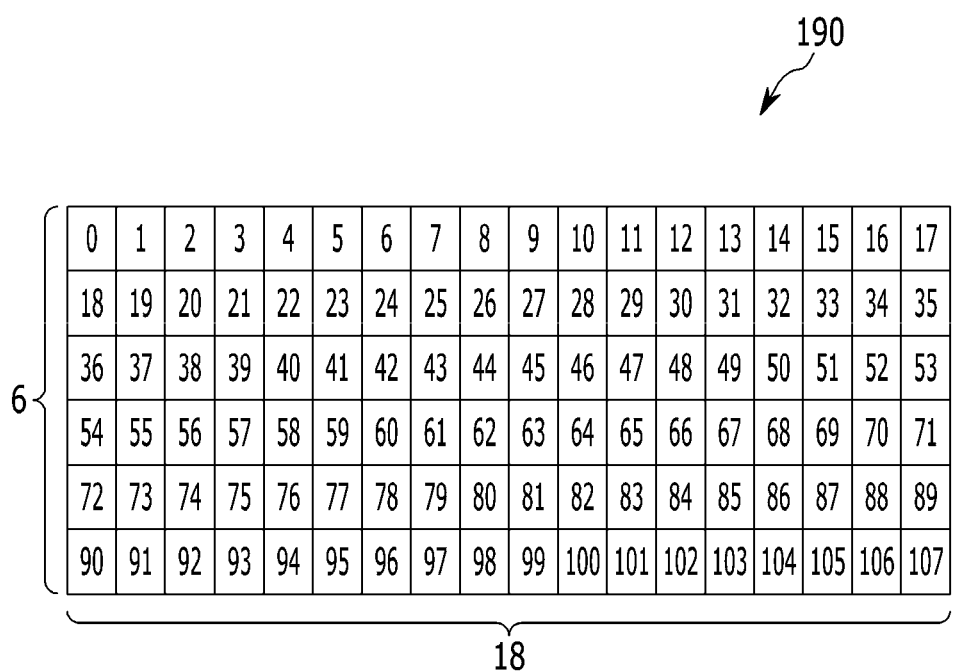
FIG. 19 shows an example of an interleaver matrix being applicable to 40 MHz bandwidth of an OFDMA 40 MHz mode in a wireless communication network according to an embodiment of the present invention.

FIG. 18 shows an example of an interleaver matrix being applicable to an OFDMA 20 MHz mode in a wireless communication network according to an embodiment of the present invention, FIG. 19 shows an example of an interleaver matrix being applicable to 40 MHz bandwidth of an OFDMA 40 MHz mode in a wireless communication network according to an embodiment of the present invention, and FIG. 20 shows an example of an interleaver matrix being applicable to 80 MHz bandwidth of an OFDMA 80 MHz mode in a wireless communication network according to an embodiment of the present invention.

Referring to FIG. 18, a band parser 720*a*, 720*b*, 720*c*, or 720*d* may use an interleaver matrix 180 when transmitting data of one user on a band of 20 MHz bandwidth in an OFDMA 20 MHz mode. The interleaver matrix 180 is a 4×13 matrix and is the same as an interleaver matrix of a 20 MHz transmission mode used in the previous WLAN.

Referring to FIG. 19, a band parser 720*a*, 720*b*, 720*c*, or 720*d* may use an interleaver matrix 190 when transmitting data of one user on a band of 40 MHz bandwidth in an OFDMA 40 MHz mode. The interleaver matrix 190 is a 6×18 matrix and is the same as an interleaver matrix of a 40 MHz transmission mode used in the previous WLAN.

Referring to FIG. 20, a band parser 720*a*, 720*b*, 720*c*, or 720*d* may use an interleaver matrix 200 when transmitting data of one user on a band of 80 MHz bandwidth in an OFDMA 80 MHz mode. The interleaver matrix 200 is a 9×26 matrix and is the same as an interleaver matrix of an 80 MHz transmission mode used in the previous WLAN.

As shown in FIG. 18 to FIG. 20, the band parser 720*a*, 720*b*, 720*c*, or 720*d* may arrange the data of one user on the interleaver matrix the same way as the previous WLAN.

Figure 21:
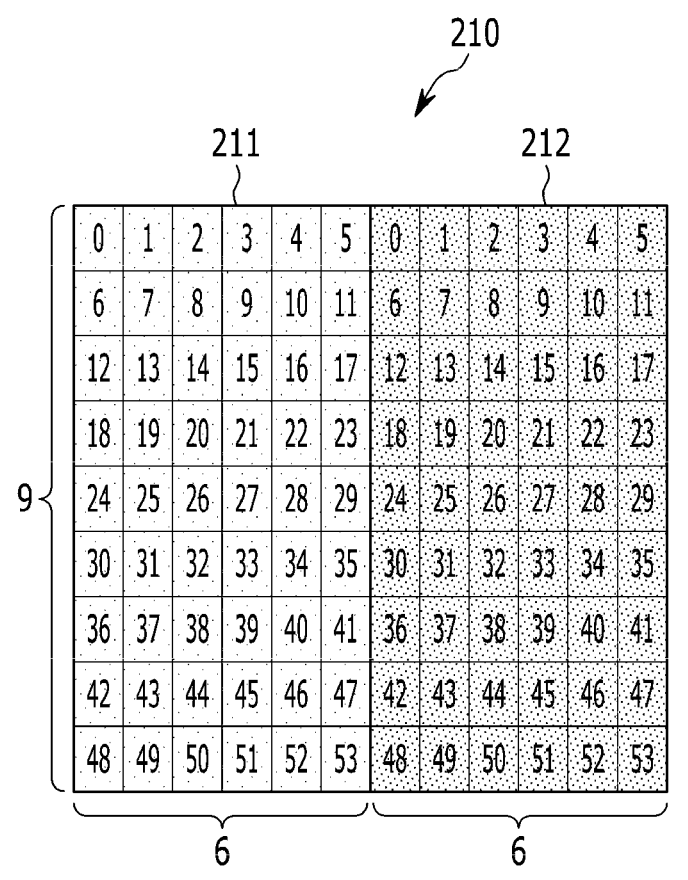
Figure 22:
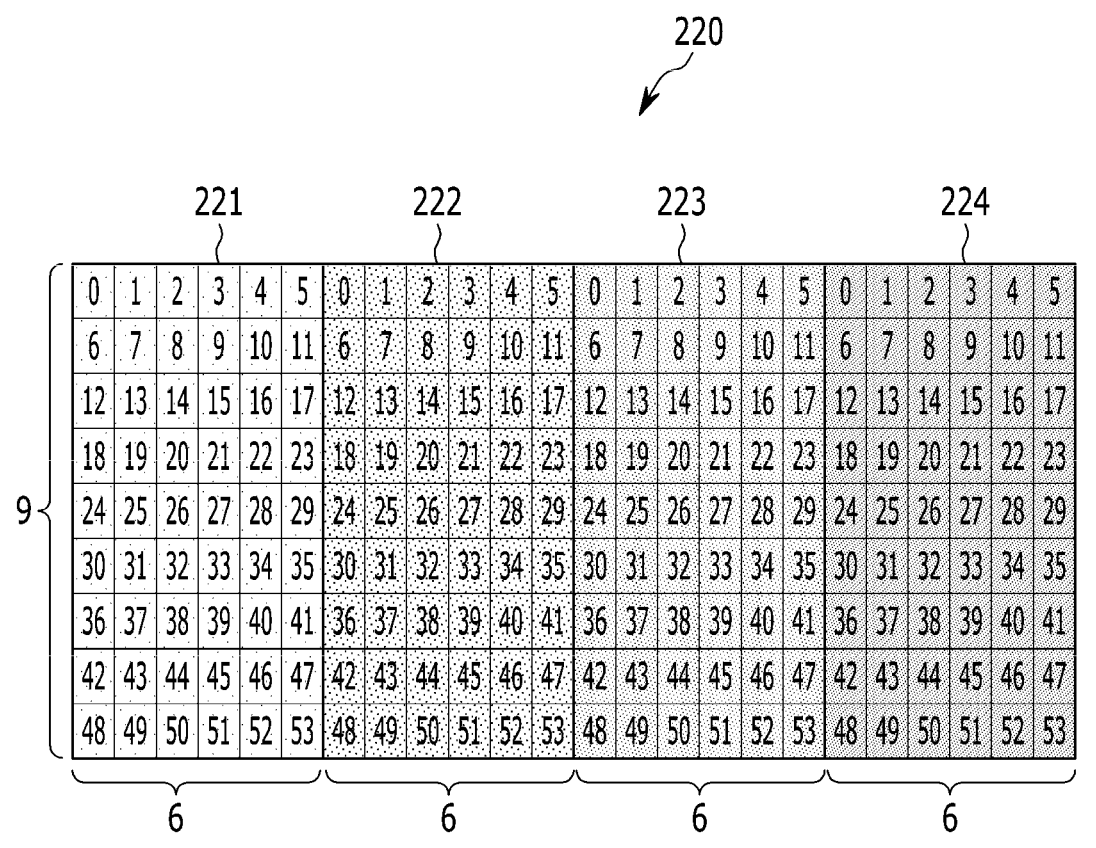
Figure 23:
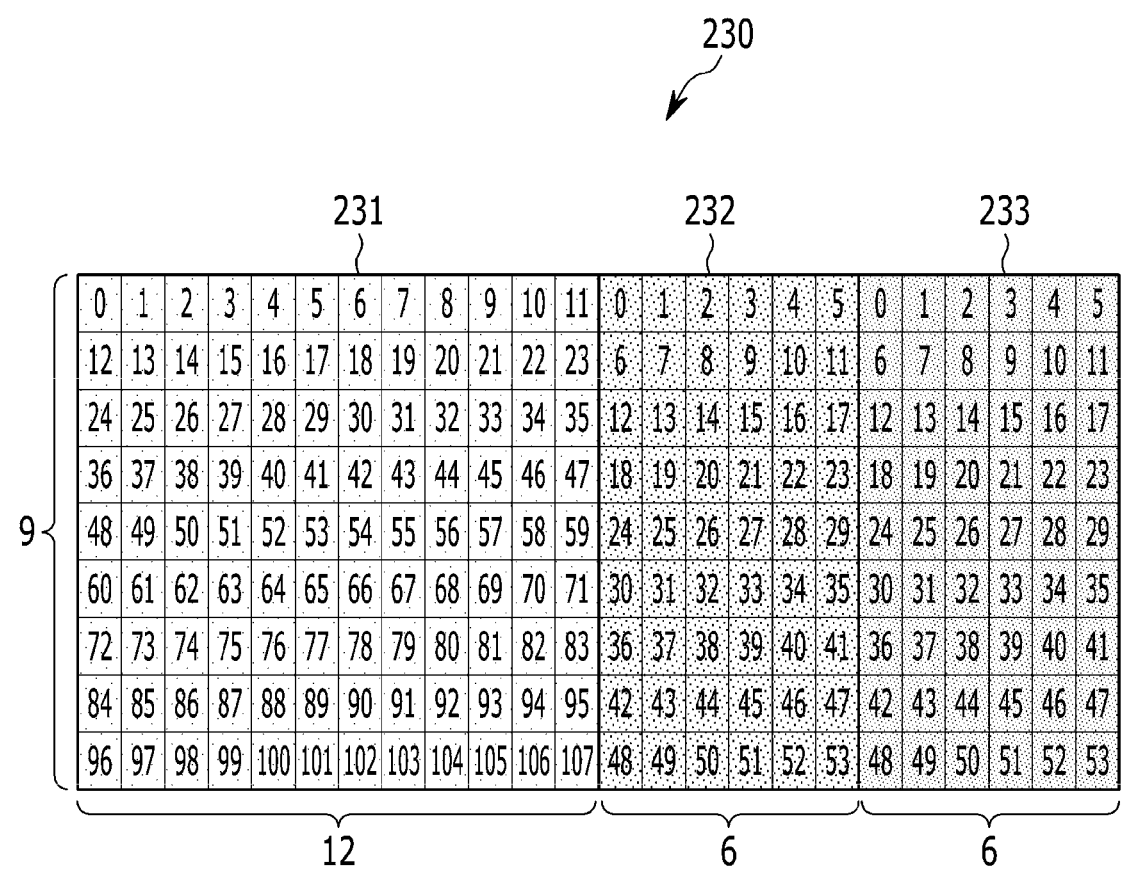
Figure 24:
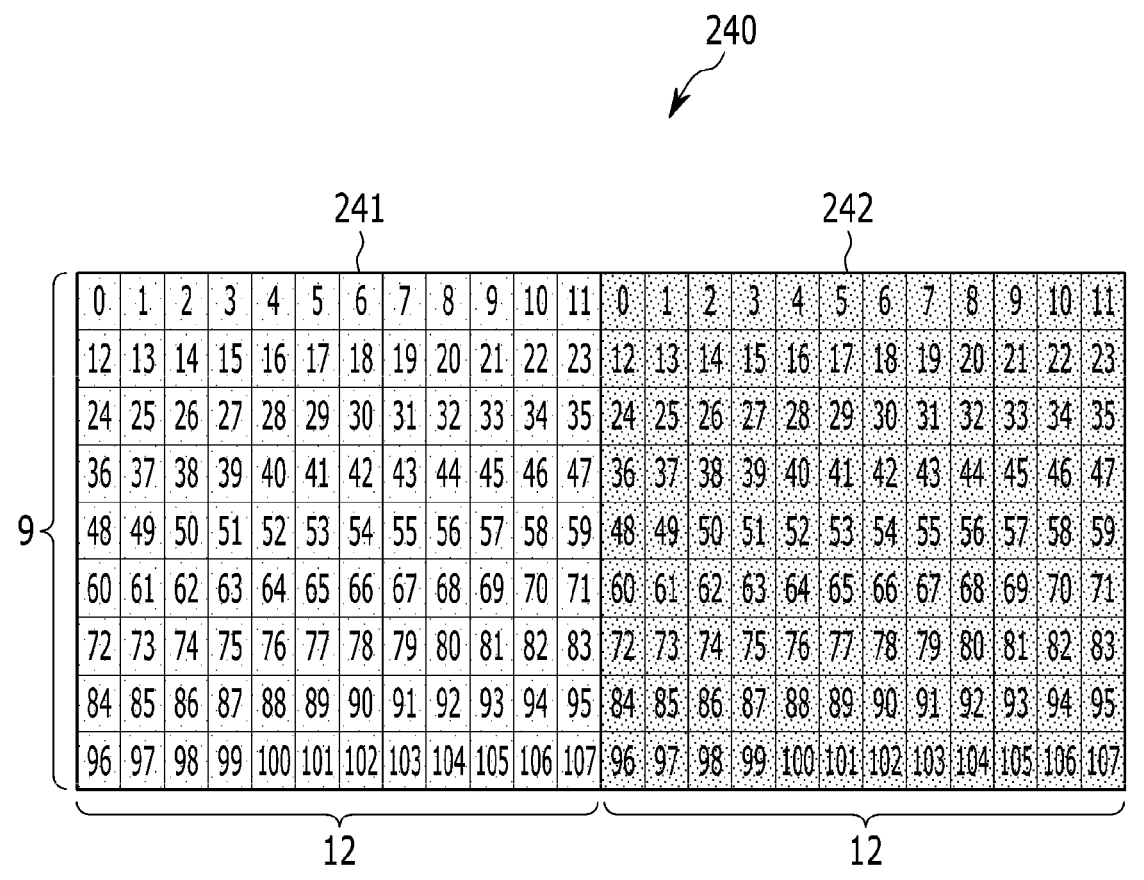

FIG. 21 shows an example of an interleaver matrix being applicable to two bands of 20 MHz bandwidth in an OFDMA 40 MHz mode of a wireless communication network according to an embodiment of the present invention; FIG. 22 shows an example of an interleaver matrix being applicable to four bands of 20 MHz bandwidth in an OFDMA 80 MHz mode of a wireless communication network according to an embodiment of the present invention; FIG. 23 shows an example of an interleaver matrix being applicable to a band of 40 MHz bandwidth and two bands of 20 MHz bandwidth in an OFDMA 80 MHz mode of a wireless communication network according to an embodiment of the present invention; FIG. 24 shows an example of an interleaver matrix being applicable to two bands of 40 MHz bandwidth in an OFDMA 80 MHz mode of a wireless communication network according to an embodiment of the present invention; and FIG. 25 shows an example of an interleaver matrix being applicable to a band of 60 MHz bandwidth and a band of 20 MHz bandwidth in an OFDMA 80 MHz mode of a wireless communication network according to an embodiment of the present invention.

FIG. 21 to FIG. 25 exemplify a case that a band parser 720*a* shown in FIG. 8 uses a 54 type interleaver matrix, i.e., an interleaver matrix when the number of data tones per 20 MHz bandwidth is 54.

Referring to FIG. 21, the band parser 720*a* may use an interleaver matrix 210 when transmitting data of user 0 on band 0 of 20 MHz bandwidth and data of user 1 on band 1 of 20 MHz bandwidth in the OFDMA 40 MHz mode. The interleaver matrix 210 is a 9×12 matrix where two 9×6 matrices are arranged in a row direction. As described with reference to FIG. 8, the band parser 720*a* arranges the data of the user 0 on an interleaver memory in accordance with the first 9×6 matrix 211 that is an area allocated to the user 0 in the 9×12 matrix, and arranges the data of the user 1 on the interleaver memory in accordance with the second 9×6 matrix 212 that is an area allocated to the user 1 in the 9×12 matrix. Accordingly, the data of the same user can be arranged in the same column.

Referring to FIG. 22, the band parser 720*a* may use an interleaver matrix 220 when transmitting data of user 0 on band 0 of 20 MHz bandwidth, data of user 1 on band 1 of 20 MHz bandwidth, data of user 2 on band 2 of 20 MHz bandwidth, and data of user 3 on band 3 of 20 MHz bandwidth in the OFDMA 80 MHz mode. The interleaver matrix 220 is a 9×24 matrix where four 9×6 matrices are arranged in a row direction. As described with reference to FIG. 8, the band parser 720*a* arranges the data of the user 0 on an interleaver memory in accordance with the first 9×6 matrix 221 that is an area allocated to the user 0 in the 9×24 matrix, arranges the data of the user 1 on the interleaver memory in accordance with the second 9×6 matrix 222 that is an area allocated to the user 1 in the 9×24 matrix, arranges the data of the user 2 on an interleaver memory in accordance with the third 9×6 matrix 223 that is an area allocated to the user 2 in the 9×24 matrix, and arranges the data of the user 3 on the interleaver memory in accordance with the fourth 9×6 matrix 224 that is an area allocated to the user 3 in the 9×24 matrix. Accordingly, the data of the same user can be arranged in the same column.

Referring to FIG. 23, the band parser 720*a* may use an interleaver matrix 230 when transmitting data of user 0 on band 0 of 40 MHz bandwidth, data of user 1 on band 1 of 20 MHz bandwidth, and data of user 2 on band 2 of 20 MHz bandwidth in the OFDMA 80 MHz mode. The interleaver matrix 230 is a 9×24 matrix where one 9×12 matrix and two one 9×6 matrices are arranged in a row direction. As described with reference to FIG. 8, the band parser 720*a* arranges the data of the user 0 on an interleaver memory in accordance with the 9×12 matrix 231 that is an area allocated to the user 0 in the 9×24 matrix, arranges the data of the user 1 on the interleaver memory in accordance with the first 9×6 matrix 232 that is an area allocated to the user 1 in the 9×24 matrix, and arranges the data of the user 2 on the interleaver memory in accordance with the second 9×6 matrix 233 that is an area allocated to the user 2 in the 9×24 matrix. Accordingly, the data of the same user can be arranged in the same column.

Referring to FIG. 24, the band parser 720*a* may use an interleaver matrix 240 when transmitting data of user 0 on band 0 of 40 MHz bandwidth and data of user 1 on band 1 of 40 MHz bandwidth in the OFDMA 80 MHz mode. The interleaver matrix 240 is a 9×24 matrix where two 9×12 matrices are arranged in a row direction. As described with reference to FIG. 8, the band parser 720*a* arranges the data of the user 0 on an interleaver memory in accordance with the first 9×12 matrix 241 that is an area allocated to the user 0 in the 9×24 matrix, and arranges the data of the user 1 on the interleaver memory in accordance with the second 9×12 matrix 242 that is an area allocated to the user 1 in the 9×24 matrix. Accordingly, the data of the same user can be arranged in the same column.

Referring to FIG. 25, the band parser 720*a* may use an interleaver matrix 240 when transmitting data of user 0 on band 0 of 60 MHz bandwidth and data of user 1 on band 1 of 20 MHz bandwidth in the OFDMA 80 MHz mode. The interleaver matrix 250 is a 9×24 matrix where a 9×18 matrix and a 9×6 matrix are arranged in a row direction. As described with reference to FIG. 8, the band parser 720*a* arranges the data of the user 0 on an interleaver memory in accordance with the 9×18 matrix 251 that is an area allocated to the user 0 in the 9×24 matrix, and arranges the data of the user 1 on the interleaver memory in accordance with the 9×6 matrix 252 that is an area allocated to the user 1 in the 9×24 matrix. Accordingly, the data of the same user can be arranged in the same column.

Figure 26:
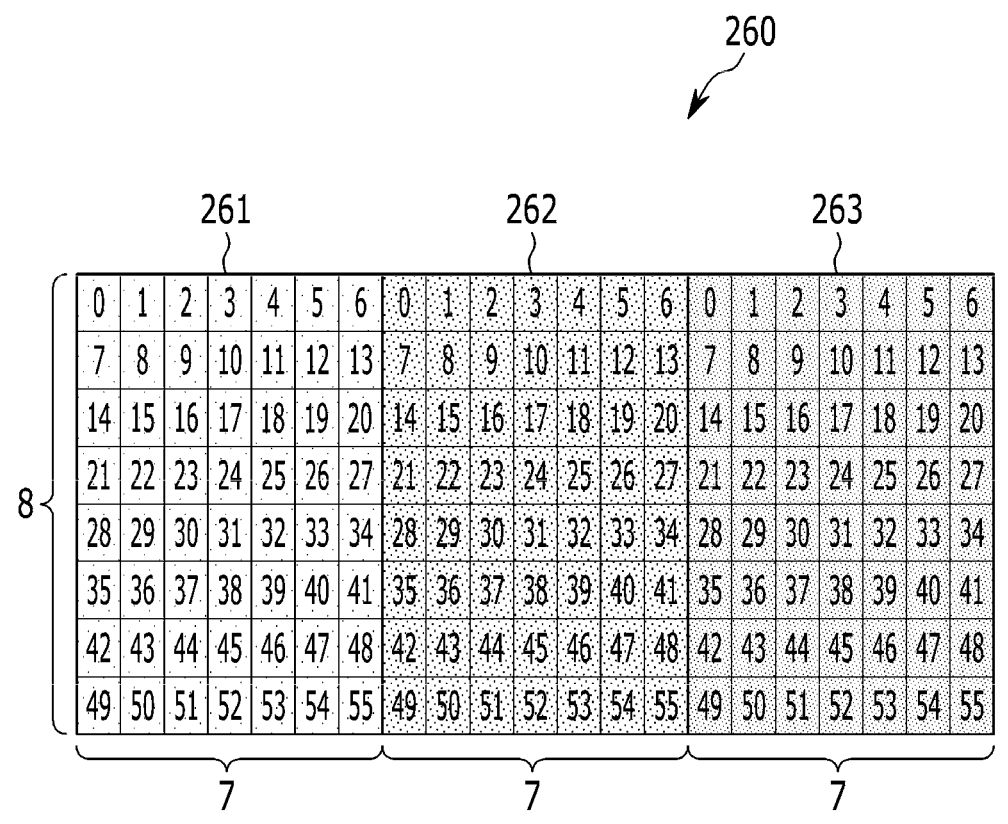
Figure 28:
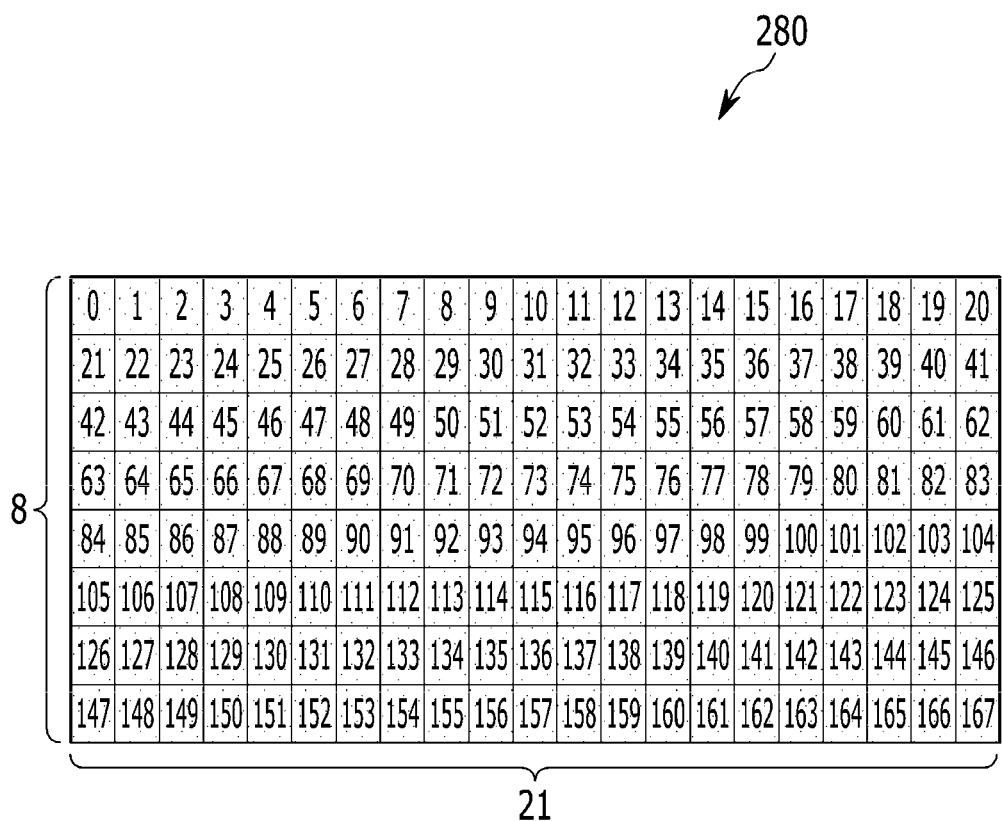
FIG. 28 shows an example of an interleaver matrix being applicable to a band of 60 MHz bandwidth in an OFDMA 60 MHz mode of a wireless communication network according to an embodiment of the present invention.
Figure 29:
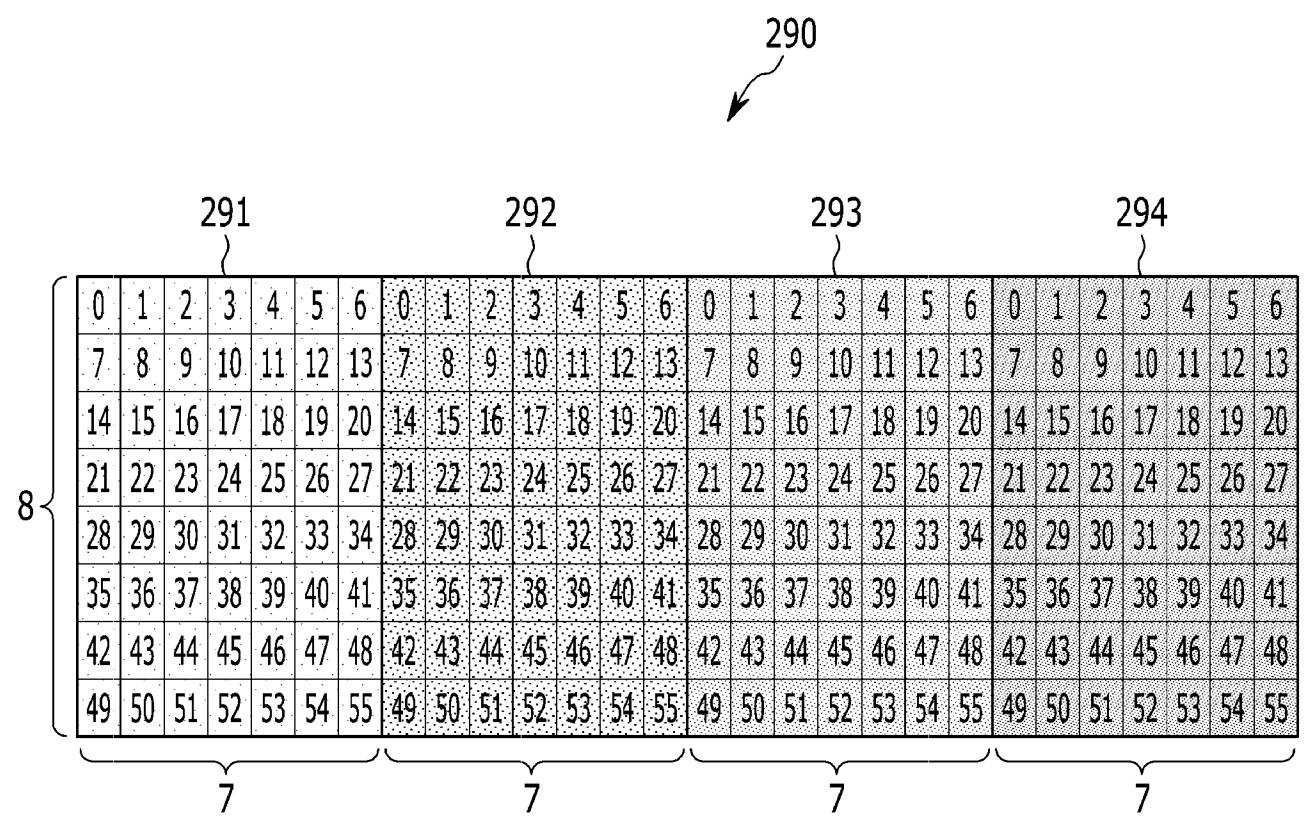
Figure 30:
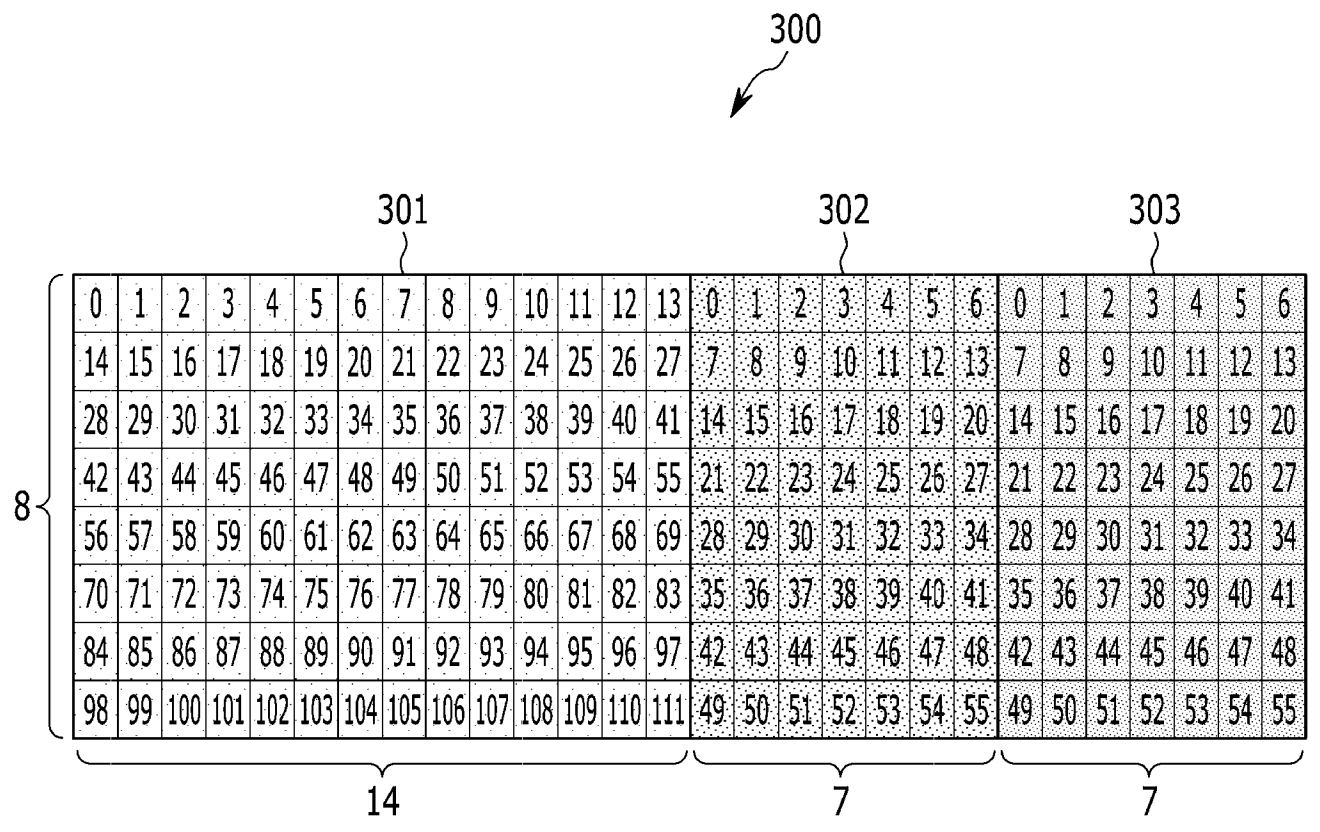
Figure 31:
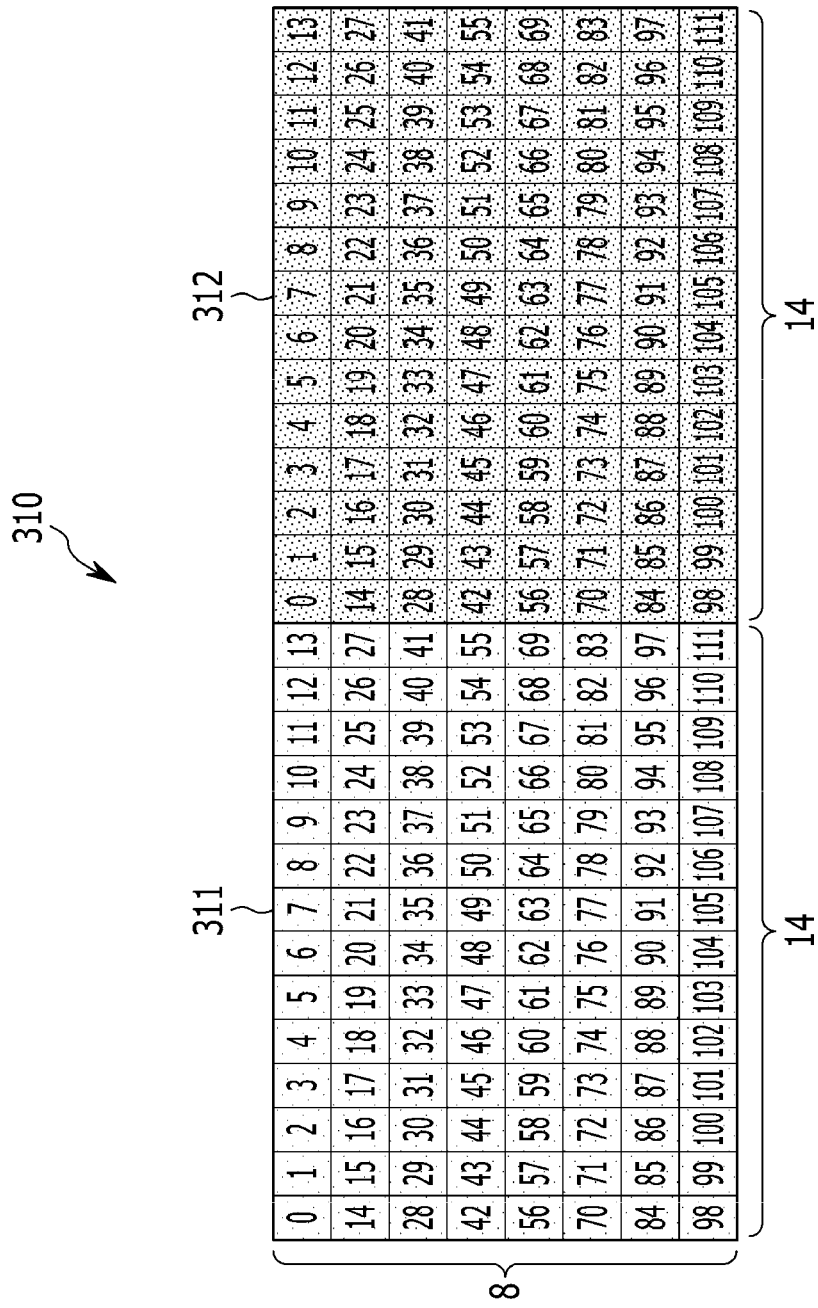
FIG. 31 shows another example of an interleaver matrix being applicable to two bands of 40 MHz bandwidth in an OFDMA 80 MHz mode of a wireless communication network according to an embodiment of the present invention.
Figure 32:
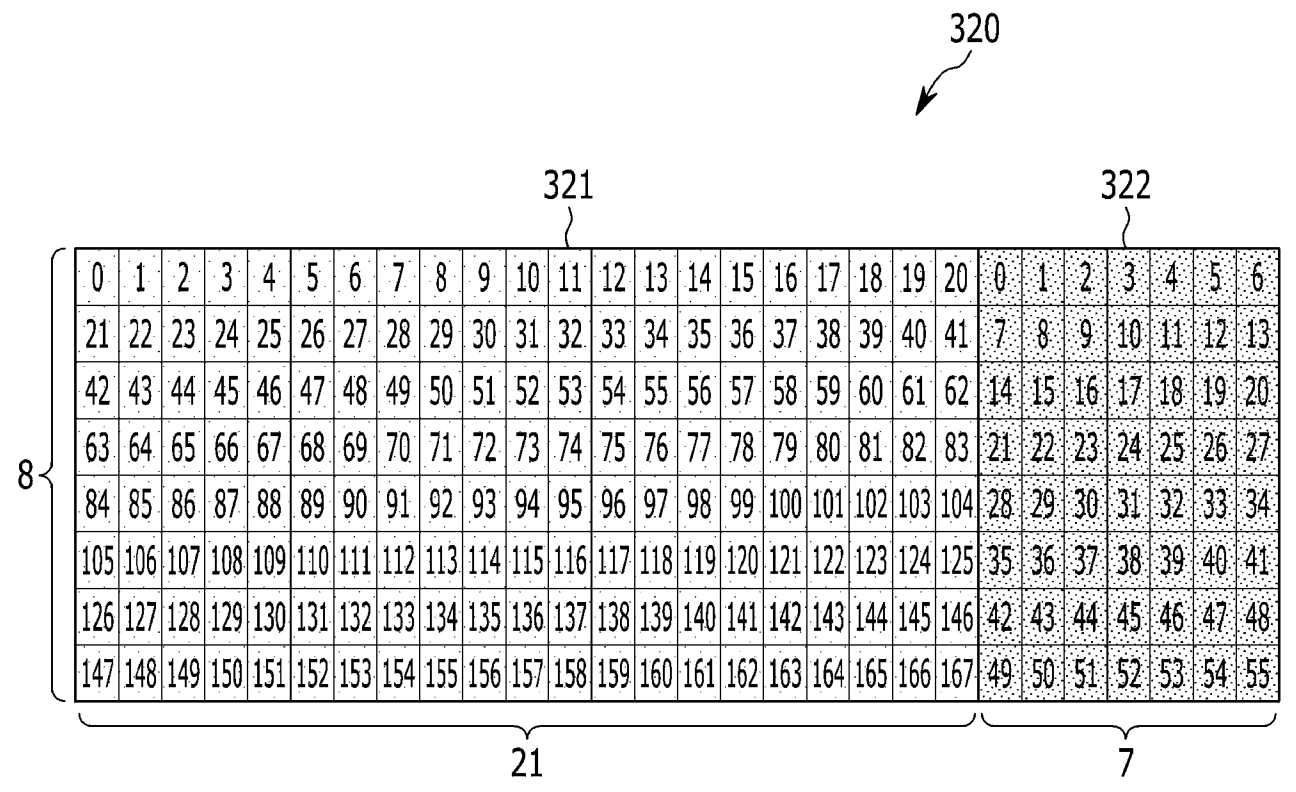

FIG. 26 shows an example of an interleaver matrix being applicable to three bands of 20 MHz bandwidth in an OFDMA 60 MHz mode of a wireless communication network according to an embodiment of the present invention; FIG. 27 shows an example of an interleaver matrix being applicable to a band of 40 MHz bandwidth and a band of 20 MHz bandwidth in an OFDMA 60 MHz mode of a wireless communication network according to an embodiment of the present invention; FIG. 28 shows an example of an interleaver matrix being applicable to a band of 60 MHz bandwidth in an OFDMA 60 MHz mode of a wireless communication network according to an embodiment of the present invention; FIG. 29 shows another example of an interleaver matrix being applicable to four bands of 20 MHz bandwidth in an OFDMA 80 MHz mode of a wireless communication network according to an embodiment of the present invention; FIG. 30 shows another example of an interleaver matrix being applicable to a band of 40 MHz bandwidth and two bands of 20 MHz bandwidth in an OFDMA 80 MHz mode of a wireless communication network according to an embodiment of the present invention; FIG. 31 shows another example of an interleaver matrix being applicable to two bands of 40 MHz bandwidth in an OFDMA 80 MHz mode of a wireless communication network according to an embodiment of the present invention; and FIG. 32 shows another example of an interleaver matrix being applicable to a band of 60 MHz bandwidth and a band of 20 MHz bandwidth in an OFDMA 80 MHz mode of a wireless communication network according to an embodiment of the present invention.

FIG. 26 to FIG. 32 exemplify a case that a band parser 720*a* shown in FIG. 8 uses a 56 type interleaver matrix, i.e., an interleaver matrix when the number of data tones per 20 MHz bandwidth is 56.

Referring to FIG. 26, the band parser 720*a* may use an interleaver matrix 260 when transmitting data of user 0 on band 0 of 20 MHz bandwidth, data of user 1 on band 1 of 20 MHz bandwidth, and data of user 2 on band 2 of 20 MHz bandwidth in the OFDMA 60 MHz mode. The interleaver matrix 220 is an 8×21 matrix where three 8×7 matrices are arranged in a row direction. In the interleaver matrix 260, the first 8×7 matrix 261 corresponds to the user 0, the second 8×7 matrix 262 corresponds to the user 1, and the third 8×7 matrix 263 corresponds to the user 2.

Referring to FIG. 27, the band parser 720*a* may use an interleaver matrix 270 when transmitting data of user 0 on band 0 of 40 MHz bandwidth and data of user 1 on band 1 of 20 MHz bandwidth in the OFDMA 60 MHz mode. The interleaver matrix 270 is an 8×21 matrix where an 8×14 matrix and an 8×7 matrix are arranged in a row direction. In the interleaver matrix 270, the 8×14 matrix 271 corresponds to the user 0 and the 8×7 matrix 272 corresponds to the user 1.

Referring to FIG. 28, the band parser 720*a* may use an interleaver matrix 280 when transmitting data of user 0 on band 0 of 60 MHz bandwidth in the OFDMA 60 MHz mode. The interleaver matrix 280 is an 8×21 matrix and the 8×21 matrix corresponds to the user 0.

Referring to FIG. 29, the band parser 720*a* may use an interleaver matrix 290 when transmitting data of user 0 on band 0 of 20 MHz bandwidth, data of user 1 on band 1 of 20 MHz bandwidth, data of user 2 on band 2 of 20 MHz bandwidth, and data of user 3 on band 3 of 20 MHz bandwidth in the OFDMA 80 MHz mode. The interleaver matrix 290 is an 8×28 matrix where four 8×7 matrices are arranged in a row direction. In the interleaver matrix 290, the first 8×7 matrix 291 corresponds to the user 0, the second 8×7 matrix 292 corresponds to the user 1, the third 8×7 matrix 293 corresponds to the user 2, and the fourth 8×7 matrix 294 corresponds to the user 3.

Referring to FIG. 30, the band parser 720*a* may use an interleaver matrix 300 when transmitting data of user 0 on band 0 of 40 MHz bandwidth, data of user 1 on band 1 of 20 MHz bandwidth, and data of user 2 on band 2 of 20 MHz bandwidth in the OFDMA 40 MHz mode. The interleaver matrix 300 is an 8×28 matrix where one 8×14 matrix and two 8×7 matrices are arranged in a row direction. In the interleaver matrix 290, the 8×14 matrix 301 corresponds to the user 0, the first 8×7 matrix 302 corresponds to the user 1, and the second 8×7 matrix 303 corresponds to the user 2.

Referring to FIG. 31, the band parser 720a may use an interleaver matrix 240 when transmitting data of user 0 on band 0 of 40 MHz bandwidth and data of user 1 on band 1 of 40 MHz bandwidth in the OFDMA 80 MHz mode. The interleaver matrix 310 is an 8×28 matrix where two 8×14 matrices are arranged in a row direction. In the interleaver matrix 310, the first 8×14 matrix 311 corresponds to the user 0 and the second 8×14 matrix 312 corresponds to the user 1.

Referring to FIG. 32, the band parser 720a may use an interleaver matrix 320 when transmitting data of user 0 on band 0 of 60 MHz bandwidth and data of user 1 on band 1 of 20 MHz bandwidth in the OFDMA 80 MHz mode. The interleaver matrix 320 is an 8×28 matrix an 8×21 matrix and an 8×7 matrix are arranged in a row direction. In the interleaver matrix 320, the 8×21 matrix 321 corresponds to the user 0 and the 8×7 matrix 322 corresponds to the user 1.

As described above, the band parser 720a shown in FIG. 26 to FIG. 32 may arrange the data of each user on the interleaver memory in accordance with a corresponding matrix. Accordingly, the data of the same user can be arranged in the same column.

It has been assumed in FIG. 21 to FIG. 32 that the number $N_{BPSCS}$ of coded bits per subcarrier for all users is one. When the number $N_{BPSCS}$ of coded bits per subcarrier is not one, the interleaver matrix may be extended. In some embodiments, when the number $N_{BPSCS}$ of coded bits per subcarrier for at least one user is greater than one from among the plurality of users, one row may be extended to $N_{BPSCS,M}$ rows in the interleaver matrix. Here, $N_{BPSCS,M}$ is the greatest number of coded bits per subcarrier among the plurality of users. In some embodiments, when the number $N_{BPSCS}$ of coded bits per subcarrier for user m is $N_{BPSCS,m}$, nulls may be arranged in $(N_{BPSCS,M}-N_{BPSCS,m})$ rows among the $N_{BPSCS,M}$ extended rows in a matrix allocated to the user m. For example, assuming that the number $N_{BPSCS,0}$ of coded bits per subcarrier for user 0 is one and the number $N_{BPSCS,1}$ of coded bits per subcarrier for user 1 is two in FIG. 21, each row may be extended to two rows in the interleaver matrix 210. The nulls may be arranged in one row of the extended two rows at the matrix allocated to the user 0.

Figure 33:
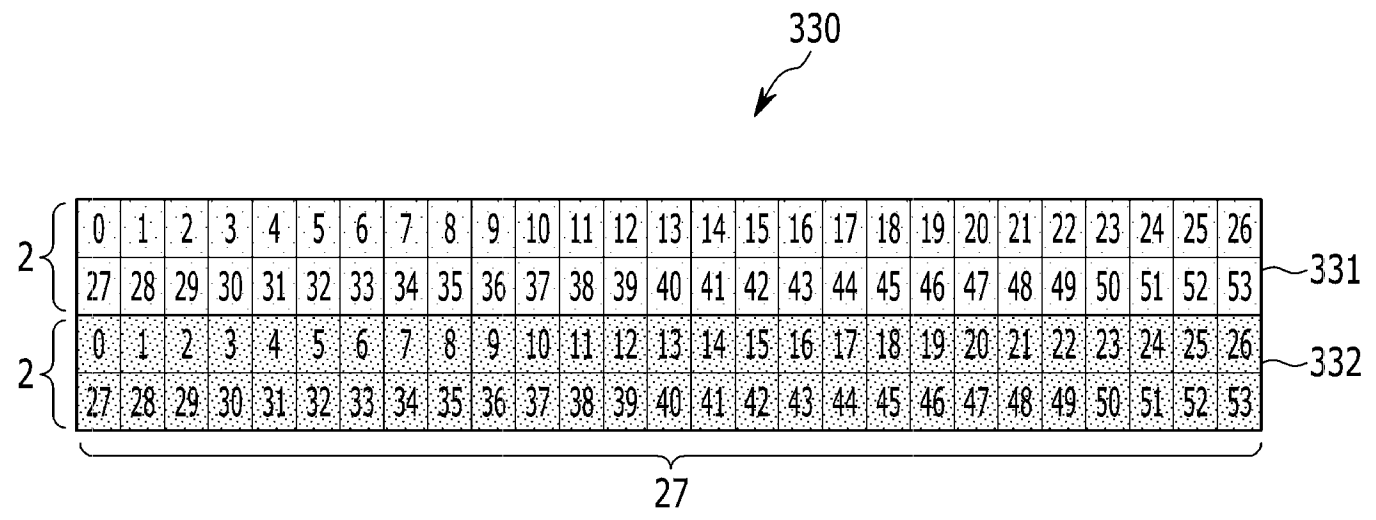
Figure 34:
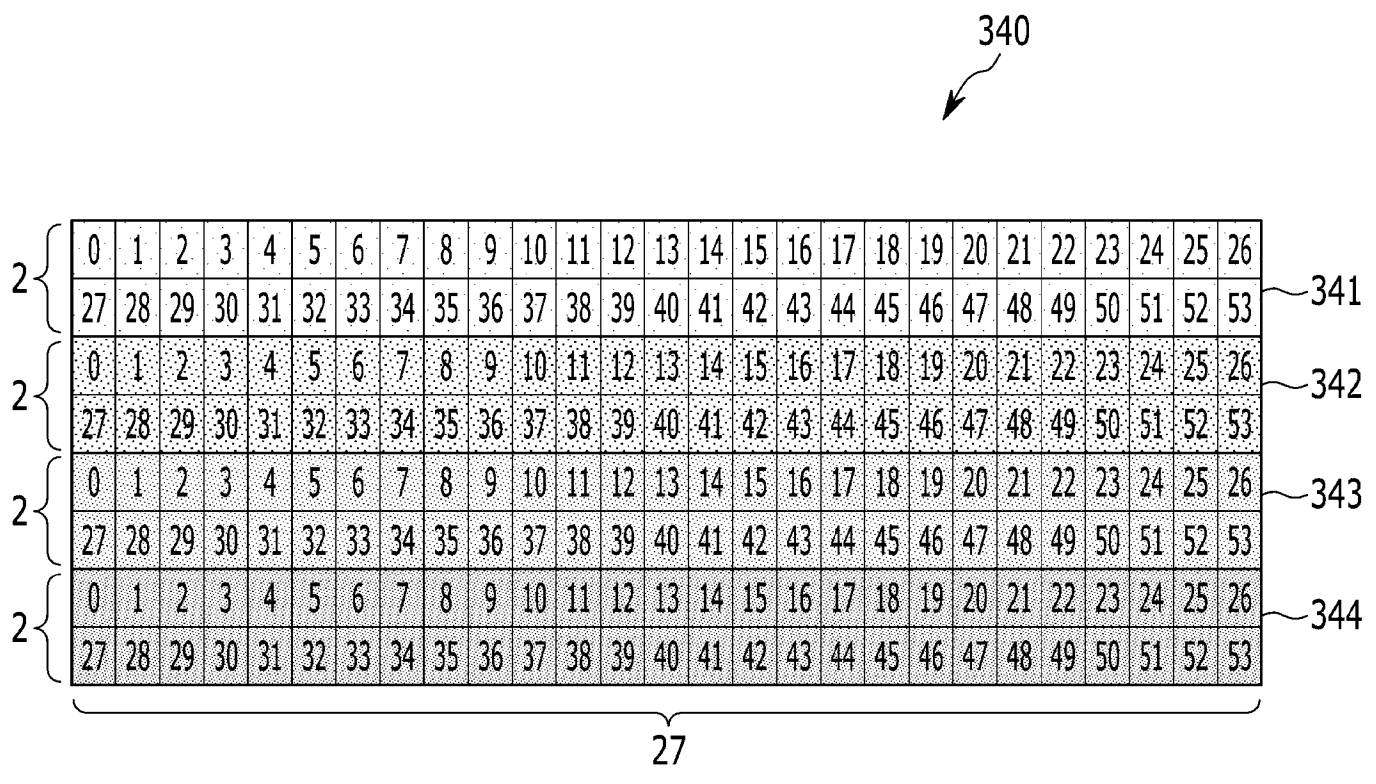
Figure 35:
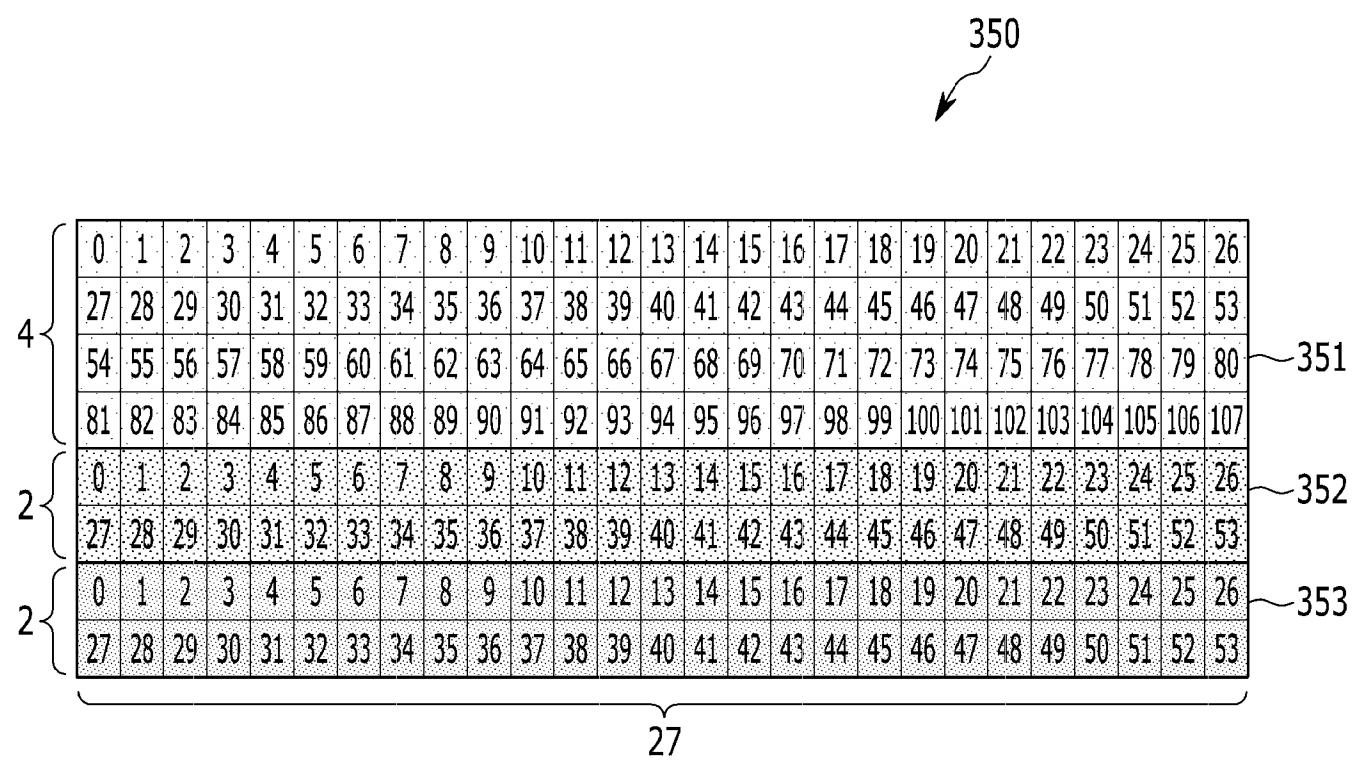
Figure 36:
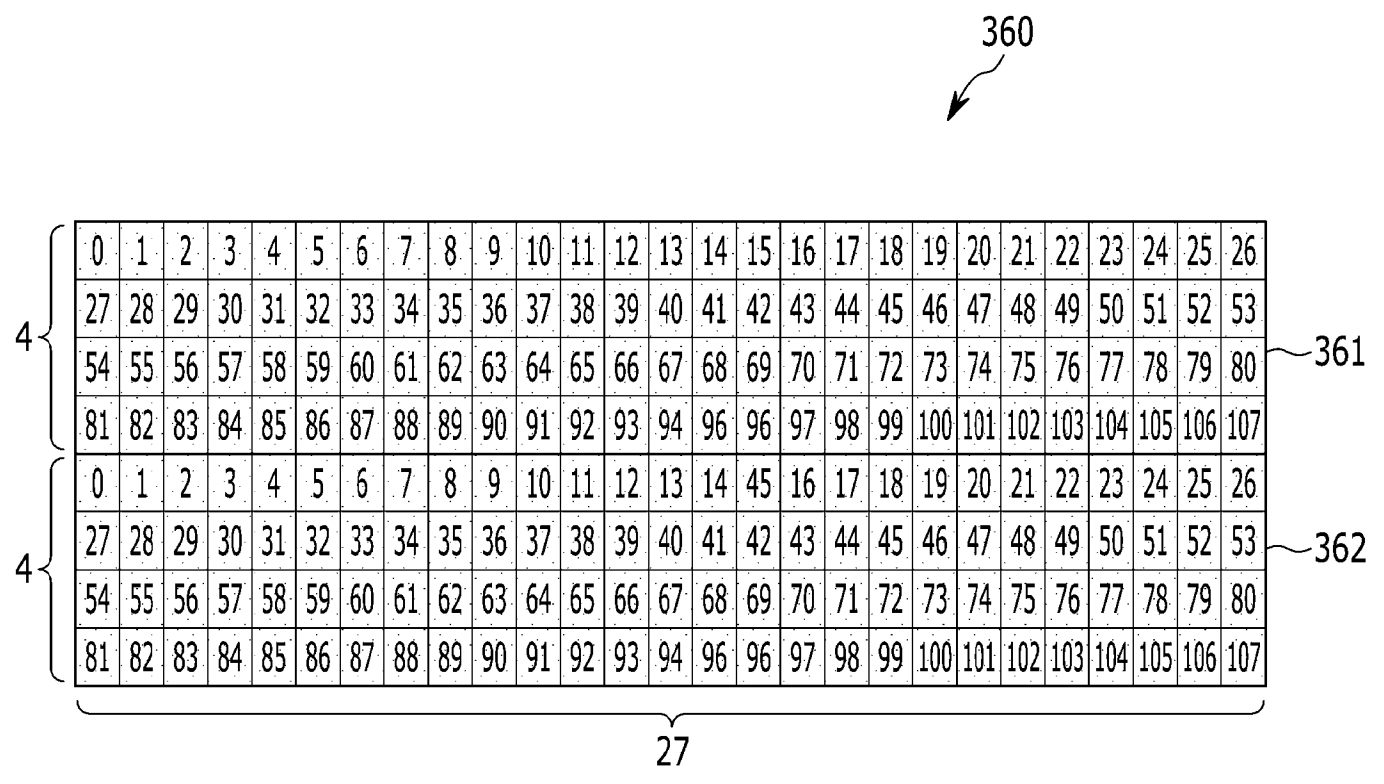

FIG. 33 shows another example of an interleaver matrix being applicable to two bands of 20 MHz bandwidth in an OFDMA 40 MHz mode of a wireless communication network according to an embodiment of the present invention; FIG. 34 shows another example of an interleaver matrix being applicable to four bands of 20 MHz bandwidth in an OFDMA 80 MHz mode of a wireless communication network according to an embodiment of the present invention; FIG. 35 shows another example of an interleaver matrix being applicable to a band of 40 MHz bandwidth and two bands of 20 MHz bandwidth in an OFDMA 80 MHz mode of a wireless communication network according to an embodiment of the present invention; FIG. 36 shows another example of an interleaver matrix being applicable to two bands of 40 MHz bandwidth in an OFDMA 80 MHz mode of a wireless communication network according to an embodiment of the present invention; and FIG. 37 shows another example of an interleaver matrix being applicable to a band of 60 MHz bandwidth and a band of 20 MHz bandwidth in an OFDMA 80 MHz mode of a wireless communication network according to an embodiment of the present invention.

FIG. 33 to FIG. 37 exemplify a case that a band parser 720b shown in FIG. 9 uses a 54 type interleaver matrix, i.e., an interleaver matrix when the number of data tones per 20 MHz bandwidth is 54.

Referring to FIG. 33, the band parser 720b may use an interleaver matrix 330 when transmitting data of user 0 on band 0 of 20 MHz bandwidth and data of user 1 on band 1 of 20 MHz bandwidth in the OFDMA 40 MHz mode. The interleaver matrix 330 is a 4×27 matrix where two 2×27 matrices are arranged in a column direction. As described with reference to FIG. 9, the band parser 720b arranges the data of the user 0 on an interleaver memory in accordance with the first 2×27 matrix 331 that is an area allocated to the user 0 in the 4×27 matrix, and arranges the data of the user 1 on the interleaver memory in accordance with the second 2×27 matrix 332 that is an area allocated to the user 1 in the 4×27 matrix. Accordingly, the data of the same user can be arranged in the same row.

Referring to FIG. 34, the band parser 720b may use an interleaver matrix 340 when transmitting data of user 0 on band 0 of 20 MHz bandwidth, data of user 1 on band 1 of 20 MHz bandwidth, data of user 2 on band 2 of 20 MHz bandwidth, and data of user 3 on band 3 of 20 MHz bandwidth in the OFDMA 80 MHz mode. The interleaver matrix 340 is an 8×27 matrix where four 2×27 matrices are arranged in a column direction. As described with reference to FIG. 9, the band parser 720b arranges the data of the user 0 on an interleaver memory in accordance with the first 2×27 matrix 341 that is an area allocated to the user 0 in the 8×27 matrix, arranges the data of the user 1 on the interleaver memory in accordance with the second 2×27 matrix 342 that is an area allocated to the user 1 in the 8×27 matrix, arranges the data of the user 2 on an interleaver memory in accordance with the third 2×27 matrix 343 that is an area allocated to the user 2 in the 8×27 matrix, and arranges the data of the user 3 on the interleaver memory in accordance with the fourth 2×27 matrix 344 that is an area allocated to the user 3 in the 8×27 matrix. Accordingly, the data of the same user can be arranged in the same row.

Referring to FIG. 35, the band parser 720b may use an interleaver matrix 350 when transmitting data of user 0 on band 0 of 40 MHz bandwidth, data of user 1 on band 1 of 20 MHz bandwidth, and data of user 2 on band 2 of 20 MHz bandwidth in the OFDMA 40 MHz mode. The interleaver matrix 350 is an 8×27 matrix where one 4×27 matrix and two one 2×27 matrices are arranged in a column direction. As described with reference to FIG. 9, the band parser 720b arranges the data of the user 0 on an interleaver memory in accordance with the 4×27 matrix 351 that is an area allocated to the user 0 in the 8×27 matrix, arranges the data of the user 1 on the interleaver memory in accordance with the first 2×27 matrix 352 that is an area allocated to the user 1 in the 9×24 matrix, and arranges the data of the user 2 on the interleaver memory in accordance with the second 2×27 matrix 353 that is an area allocated to the user 2 in the 9×24 matrix. Accordingly, the data of the same user can be arranged in the same row.

Referring to FIG. 36, the band parser 720b may use an interleaver matrix 360 when transmitting data of user 0 on band 0 of 40 MHz bandwidth and data of user 1 on band 1 of 40 MHz bandwidth in the OFDMA 80 MHz mode. The interleaver matrix 360 is an 8×27 matrix where two 4×27 matrices are arranged in a column direction. As described with reference to FIG. 9, the band parser 720b arranges the data of the user 0 on an interleaver memory in accordance with the first 4×27 matrix 361 that is an area allocated to the user 0 in the 8×27 matrix, and arranges the data of the user 1 on the interleaver memory in accordance with the second 4×27 matrix 362 that is an area allocated to the user 1 in the 8×27 matrix. Accordingly, the data of the same user can be arranged in the same row.

Referring to FIG. 37, the band parser 720b may use an interleaver matrix 370 when transmitting data of user 0 on band 0 of 60 MHz bandwidth and data of user 1 on band 1 of 20 MHz bandwidth in the OFDMA 80 MHz mode. The interleaver matrix 370 is an 8×27 matrix where a 6×27 matrix and a 2×27 matrix are arranged in a column direction. As described with reference to FIG. 9, the band parser 720b arranges the data of the user 0 on an interleaver memory in accordance with the 6×27 matrix 371 that is an area allocated to the user 0 in the 8×27 matrix, and arranges the data of the user 1 on the interleaver memory in accordance with the 2×27 matrix 372 that is an area allocated to the user 1 in the 8×27 matrix. Accordingly, the data of the same user can be arranged in the same row.

Figure 38:
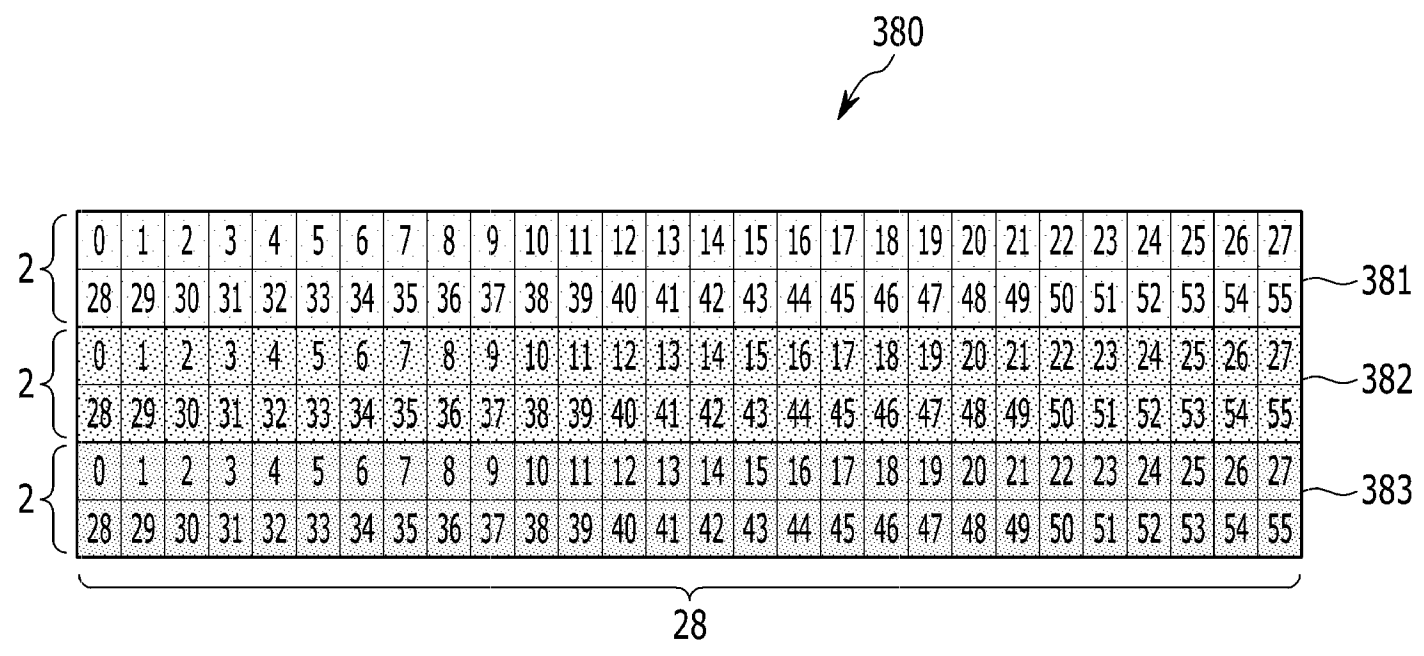
Figure 39:
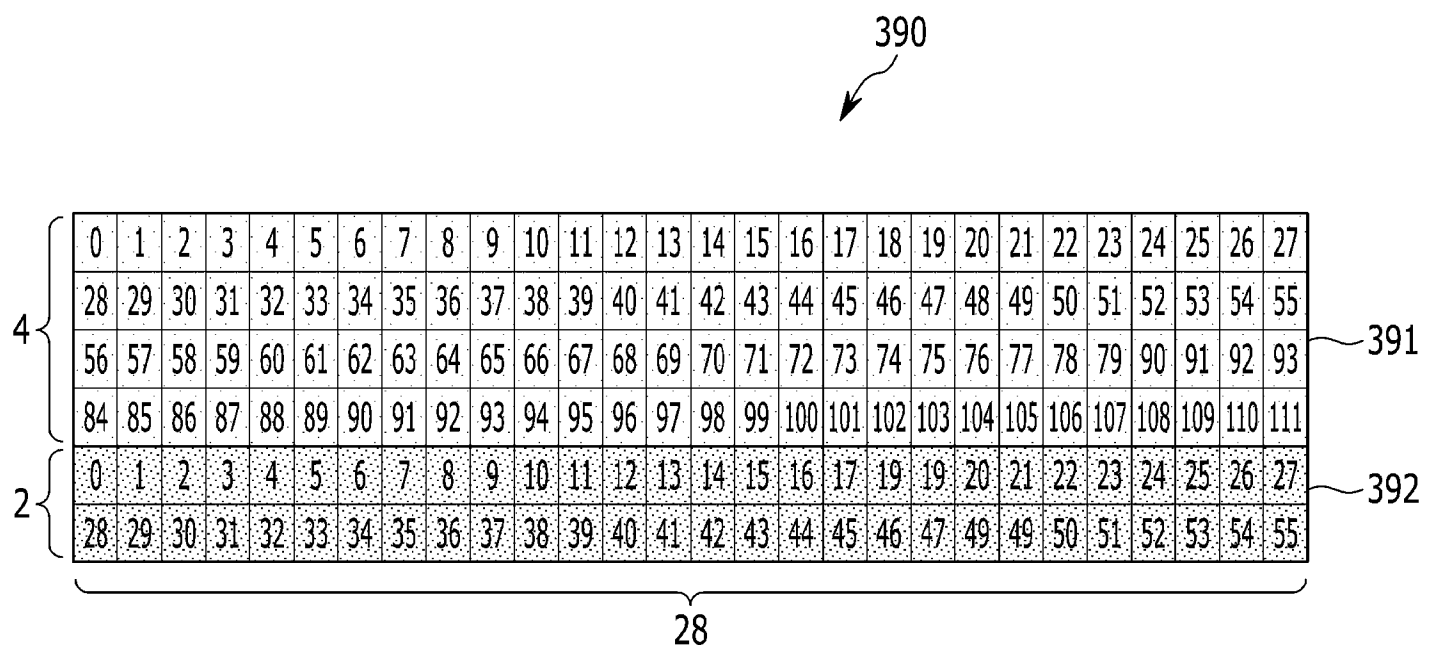
Figure 40:
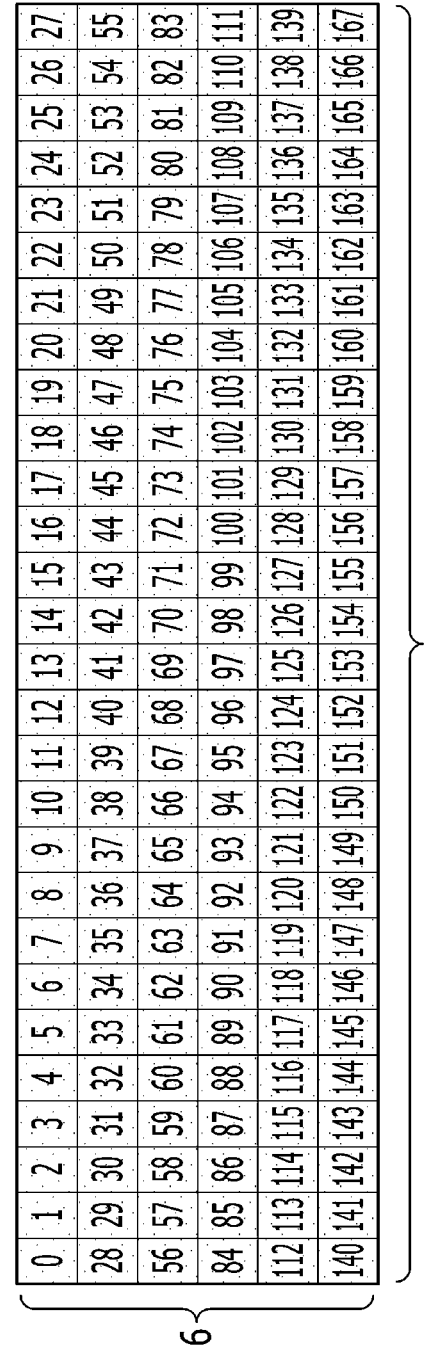
FIG. 40 shows another example of an interleaver matrix being applicable to a band of 60 MHz bandwidth in an OFDMA 60 MHz mode of a wireless communication network according to an embodiment of the present invention.
Figure 41:
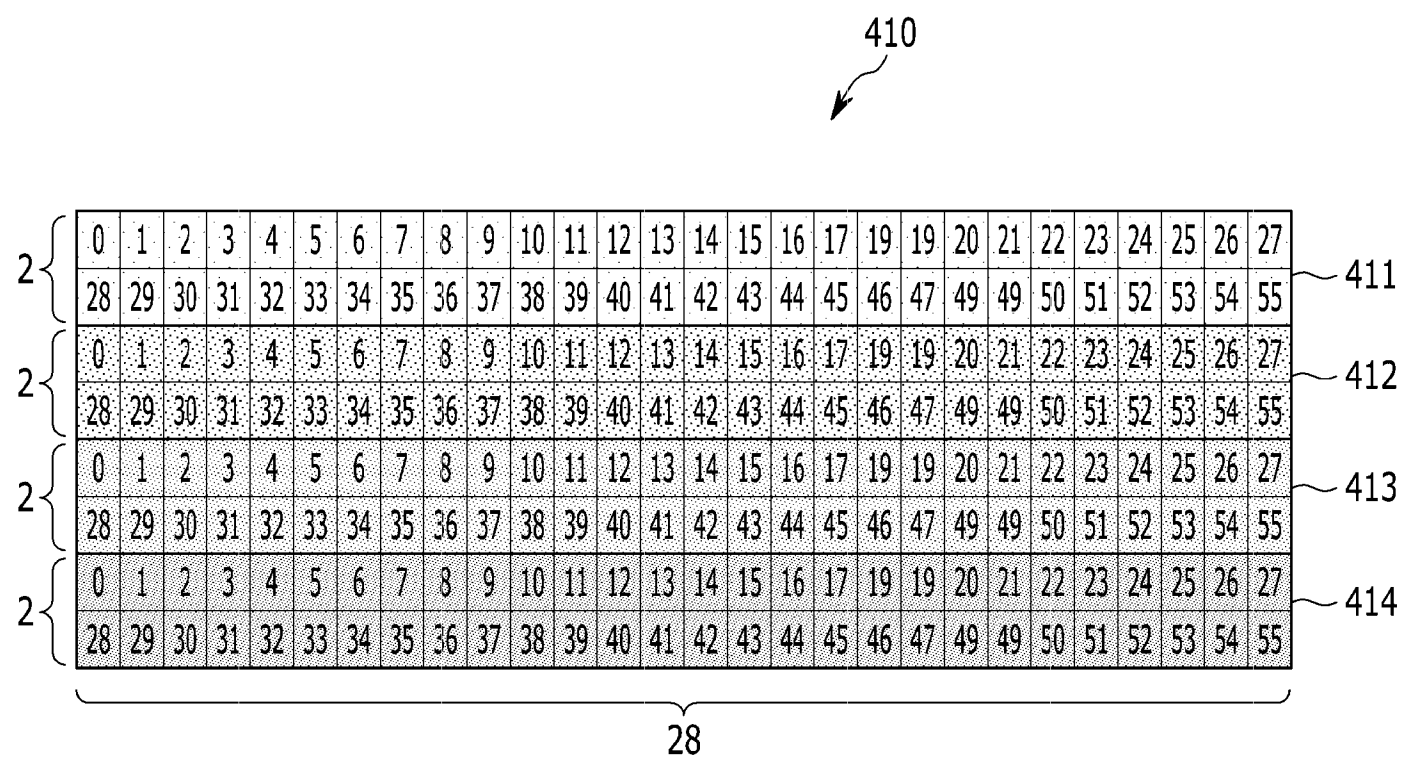
Figure 43:
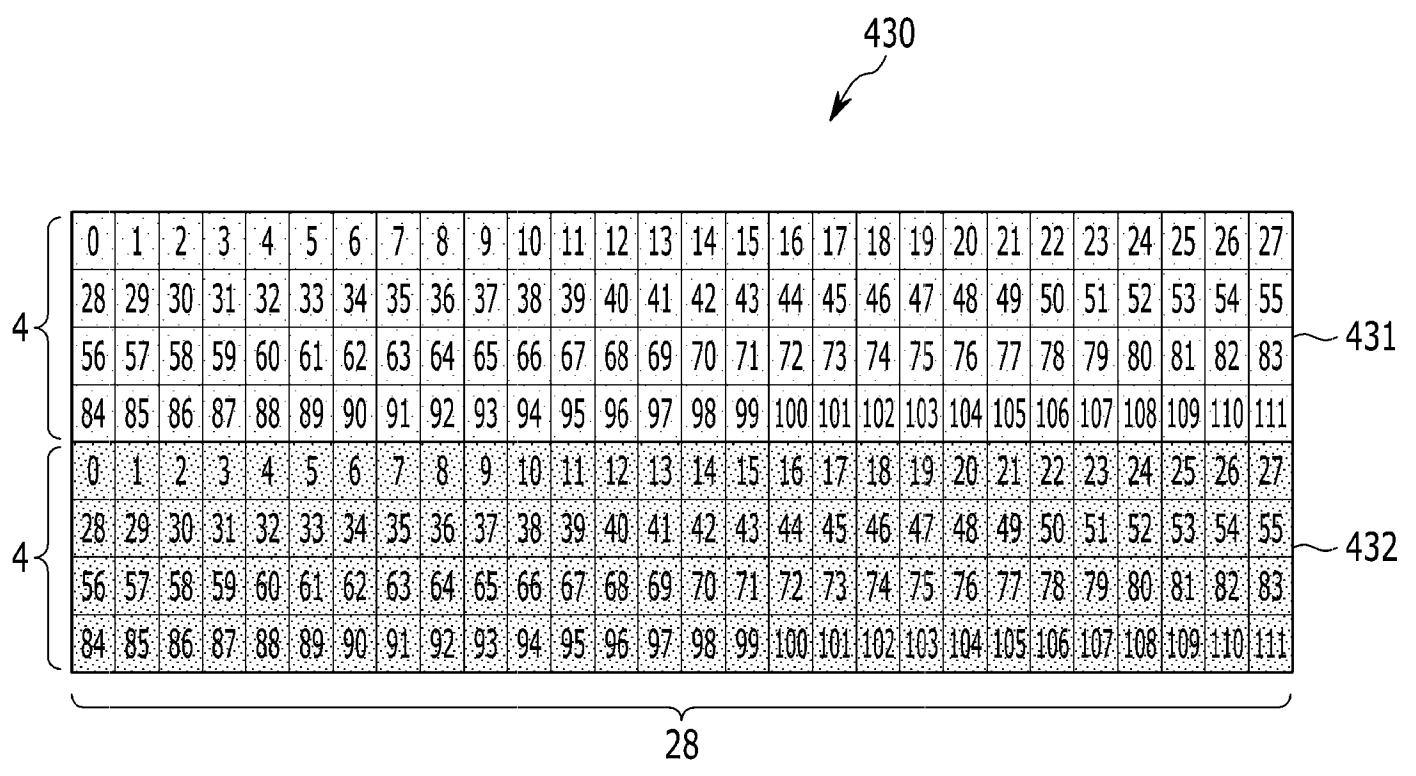
Figure 44:
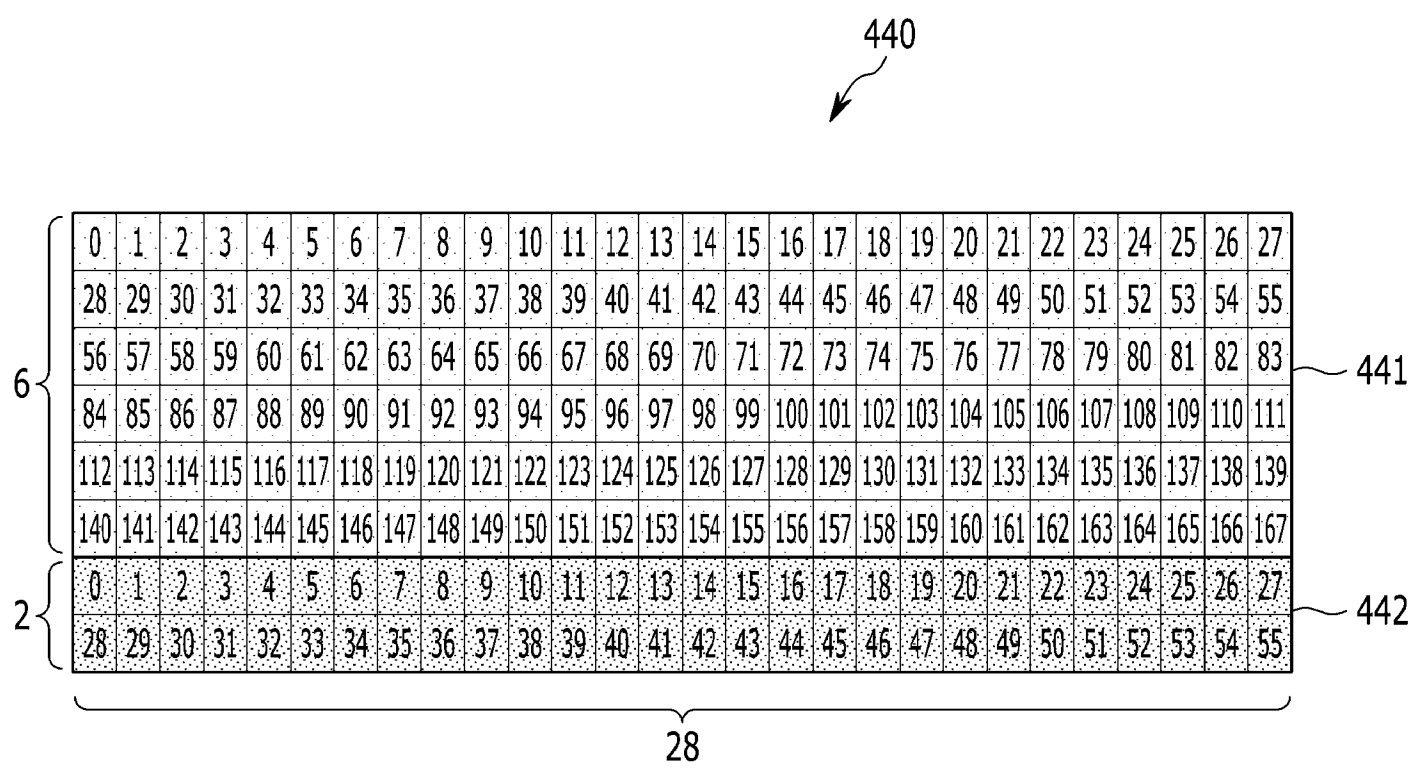

FIG. 38 shows another example of an interleaver matrix being applicable to three bands of 20 MHz bandwidth in an OFDMA 60 MHz mode of a wireless communication network according to an embodiment of the present invention; FIG. 39 shows another example of an interleaver matrix being applicable to a band of 40 MHz bandwidth and a band of 20 MHz bandwidth in an OFDMA 60 MHz mode of a wireless communication network according to an embodiment of the present invention; FIG. 40 shows another example of an interleaver matrix being applicable to a band of 60 MHz bandwidth in an OFDMA 60 MHz mode of a wireless communication network according to an embodiment of the present invention; FIG. 41 shows another example of an interleaver matrix being applicable to four bands of 20 MHz bandwidth in an OFDMA 80 MHz mode of a wireless communication network according to an embodiment of the present invention; FIG. 42 shows another example of an interleaver matrix being applicable to a band of 40 MHz bandwidth and two bands of 20 MHz bandwidth in an OFDMA 80 MHz mode of a wireless communication network according to an embodiment of the present invention; FIG. 43 shows another example of an interleaver matrix being applicable to two bands of 40 MHz bandwidth in an OFDMA 80 MHz mode of a wireless communication network according to an embodiment of the present invention; and FIG. 44 shows another example of an interleaver matrix being applicable to a band of 60 MHz bandwidth and a band of 20 MHz bandwidth in an OFDMA 80 MHz mode of a wireless communication network according to an embodiment of the present invention.

FIG. 38 to FIG. 44 exemplify a case that a band parser 720b shown in FIG. 9 uses a 56 type interleaver matrix, i.e., an interleaver matrix when the number of data tones per 20 MHz bandwidth is 56.

Referring to FIG. 38, the band parser 720b may use an interleaver matrix 380 when transmitting data of user 0 on band 0 of 20 MHz bandwidth, data of user 1 on band 1 of 20 MHz bandwidth, and data of user 2 on band 2 of 20 MHz bandwidth in the OFDMA 60 MHz mode. The interleaver matrix 380 is an 6×28 matrix where three 2×28 matrices are arranged in a column direction. In the interleaver matrix 380, the first 2×28 matrix 381 corresponds to the user 0, the second 2×28 matrix 382 corresponds to the user 1, and the third 2×28 matrix 383 corresponds to the user 2.

Referring to FIG. 39, the band parser 720b may use an interleaver matrix 390 when transmitting data of user 0 on band 0 of 40 MHz bandwidth and data of user 1 on band 1 of 20 MHz bandwidth in the OFDMA 60 MHz mode. The interleaver matrix 390 is a 6×28 matrix where a 4×28 matrix and a 2×28 matrix are arranged in a column direction. In the interleaver matrix 390, the 4×28 matrix 391 corresponds to the user 0 and the 2×28 matrix 392 corresponds to the user 1.

Referring to FIG. 40, the band parser 720b may use an interleaver matrix 400 when transmitting data of user 0 on band 0 of 60 MHz bandwidth in the OFDMA 60 MHz mode. The interleaver matrix 400 is a 6×28 matrix and the 6×28 matrix corresponds to the user 0.

Referring to FIG. 41, the band parser 720b may use an interleaver matrix 410 when transmitting data of user 0 on band 0 of 20 MHz bandwidth, data of user 1 on band 1 of 20 MHz bandwidth, data of user 2 on band 2 of 20 MHz bandwidth, and data of user 3 on band 3 of 20 MHz bandwidth in the OFDMA 80 MHz mode. The interleaver matrix 410 is an 8×28 matrix where four 2×28 matrices are arranged in a column direction. In the interleaver matrix 410, the first 2×28 matrix 411 corresponds to the user 0, the second 2×28 matrix 412 corresponds to the user 1, the third 2×28 matrix 413 corresponds to the user 2, and the fourth 2×28 matrix 414 corresponds to the user 3.

Referring to FIG. 42, the band parser 720b may use an interleaver matrix 420 when transmitting data of user 0 on band 0 of 40 MHz bandwidth, data of user 1 on band 1 of 20 MHz bandwidth, and data of user 2 on band 2 of 20 MHz bandwidth in the OFDMA 40 MHz mode. The interleaver matrix 420 is an 8×28 matrix where one 4×28 matrix and two 2×28 matrices are arranged in a column direction. In the interleaver matrix 420, the 4×28 matrix 421 corresponds to the user 0, the first 2×28 matrix 422 corresponds to the user 1, and the second 2×28 matrix 423 corresponds to the user 2.

Referring to FIG. 43, the band parser 720b may use an interleaver matrix 430 when transmitting data of user 0 on band 0 of 40 MHz bandwidth and data of user 1 on band 1 of 40 MHz bandwidth in the OFDMA 80 MHz mode. The interleaver matrix 430 is an 8×28 matrix where two 4×28 matrices are arranged in a column direction. In the interleaver matrix 430, the first 4×28 matrix 431 corresponds to the user 0 and the second 4×28 matrix 432 corresponds to the user 1.

Referring to FIG. 44, the band parser 720b may use an interleaver matrix 440 when transmitting data of user 0 on band 0 of 60 MHz bandwidth and data of user 1 on band 1 of 20 MHz bandwidth in the OFDMA 80 MHz mode. The interleaver matrix 440 is an 8×28 matrix a 6×28 matrix and a 2×28 matrix are arranged in a column direction. In the interleaver matrix 440, the 6×28 matrix 441 corresponds to the user 0 and the 2×28 matrix 442 corresponds to the user 1.

As described above, the band parser 720b shown in FIG. 38 to FIG. 44 may arrange the data of each user on the interleaver memory in accordance with a corresponding matrix. Accordingly, the data of the same user can be arranged in the same row.

It has been assumed in FIG. 33 to FIG. 44 that the number of $N_{BPSCS}$ coded bits per subcarrier for all users is one. When the number of $N_{BPSCS}$ coded bits per subcarrier is not one, the interleaver matrix may be extended. In some embodiments, in a matrix corresponding to user m whose number $N_{BPSCS,m}$ of coded bits per subcarrier is greater than one, one row may be extended to $N_{BPSCS,m}$ rows. For example, assuming that the number $N_{BPSCS,0}$ of coded bits per subcarrier for user 0 is one and the number $N_{BPSCS,1}$ of coded bits per subcarrier for user 1 is two in FIG. 33, each row of the first 2×27 matrix 331 may be not extended and each row of the second 2×27 matrix 332 may be extended to two rows in the interleaver matrix 330.

As described with reference to FIG. 10 and FIG. 11, when a band parser 720c or 720d is used, a receiving device receives and processes overall bandwidth. Therefore, an interleaver matrix may be used without restriction on the number of data tones per 20 MHz bandwidth. Hereinafter, embodiments using the band parser 720c or 720d are described.

Figure 45:
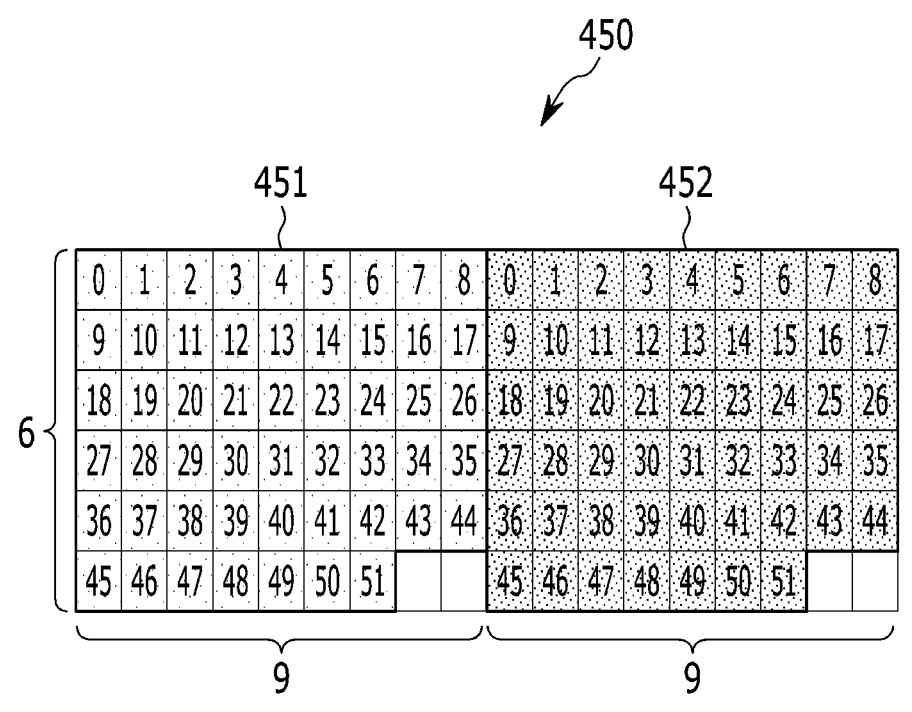
Figure 46:
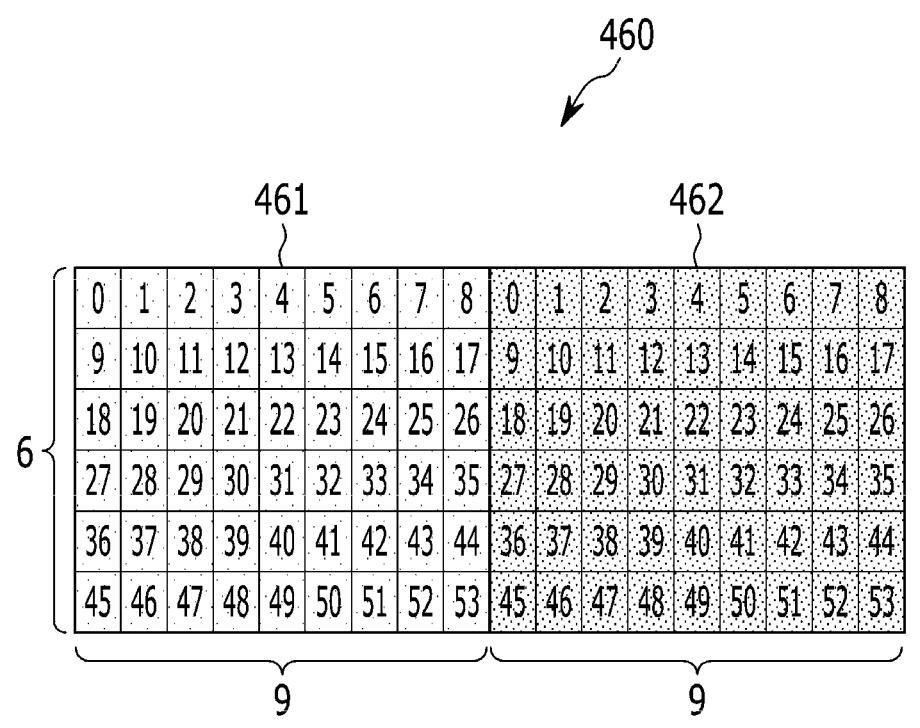
Figure 47:
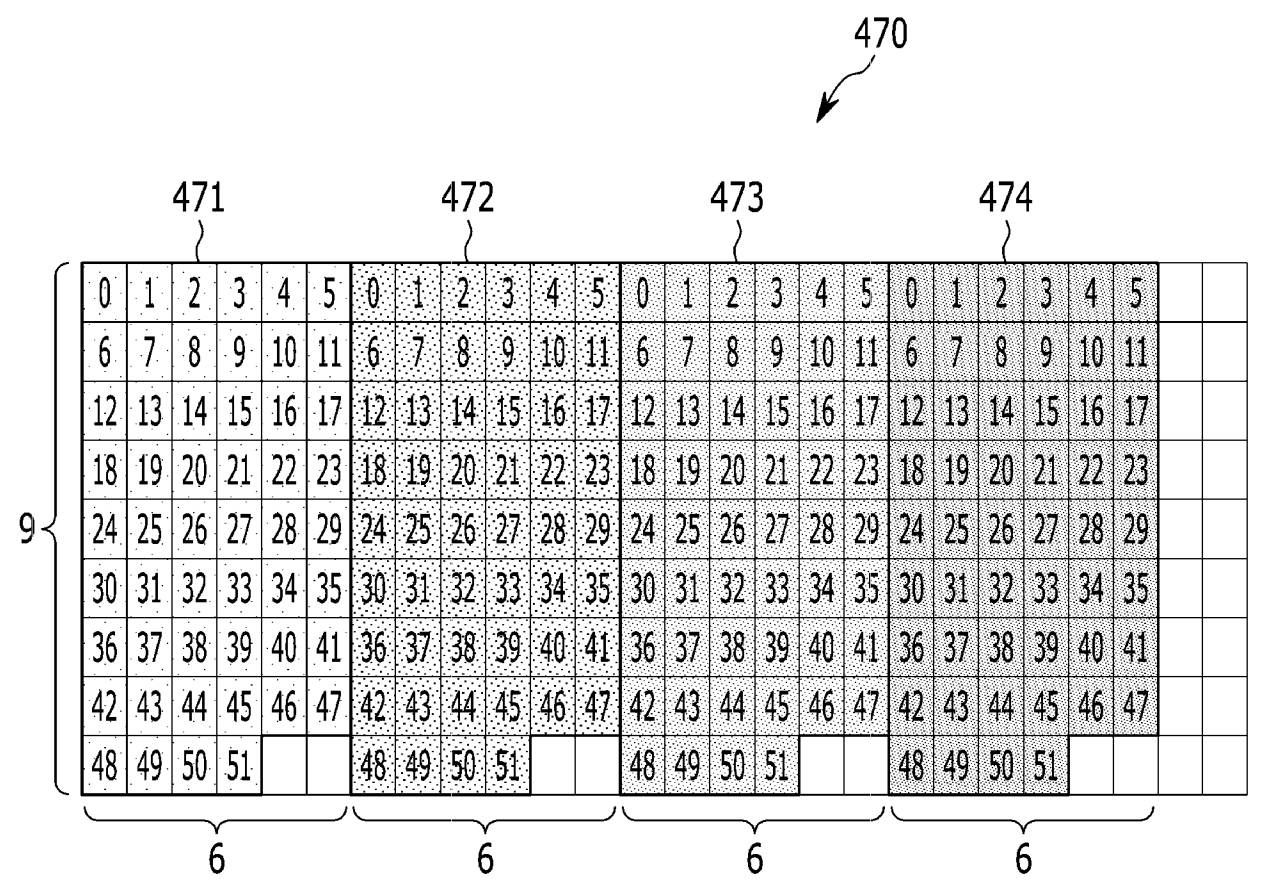
Figure 48:
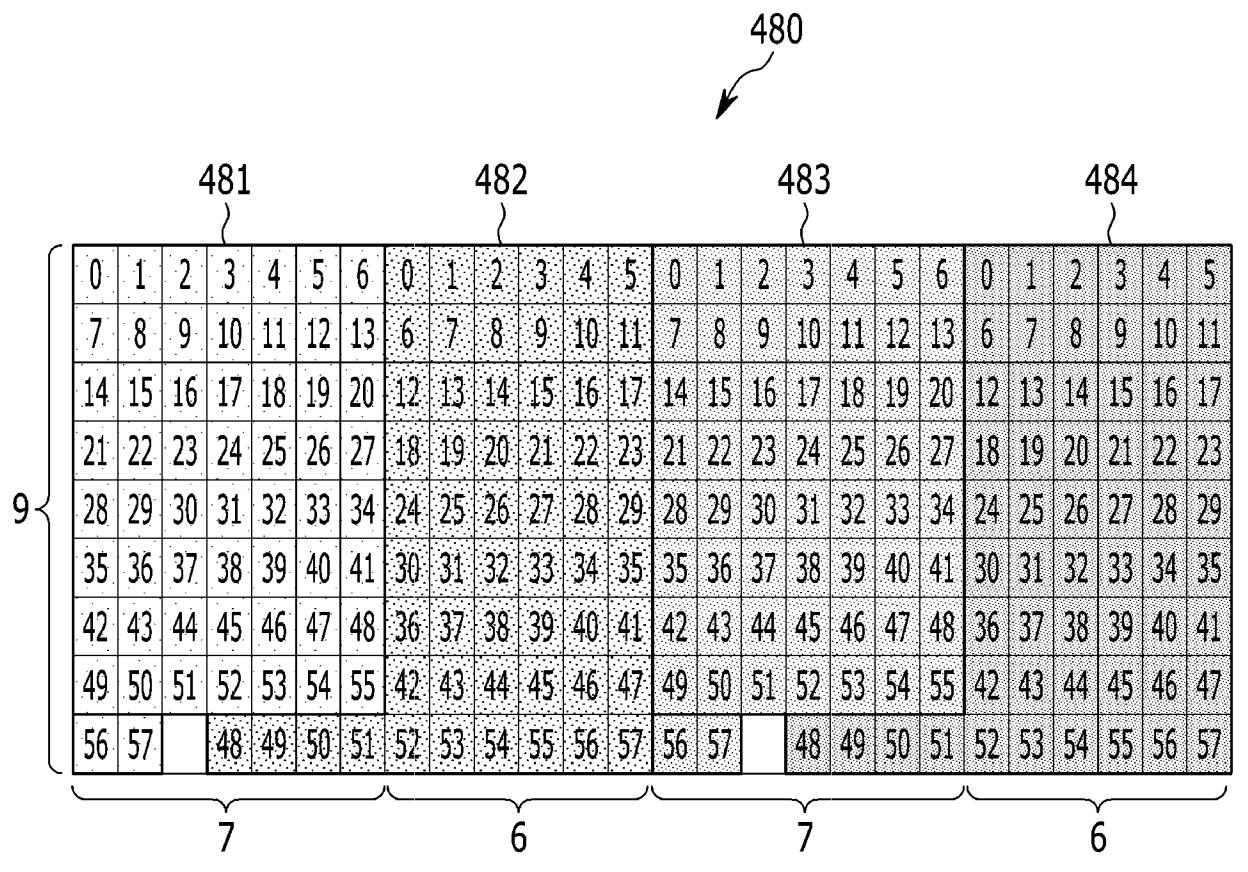
Figure 49:
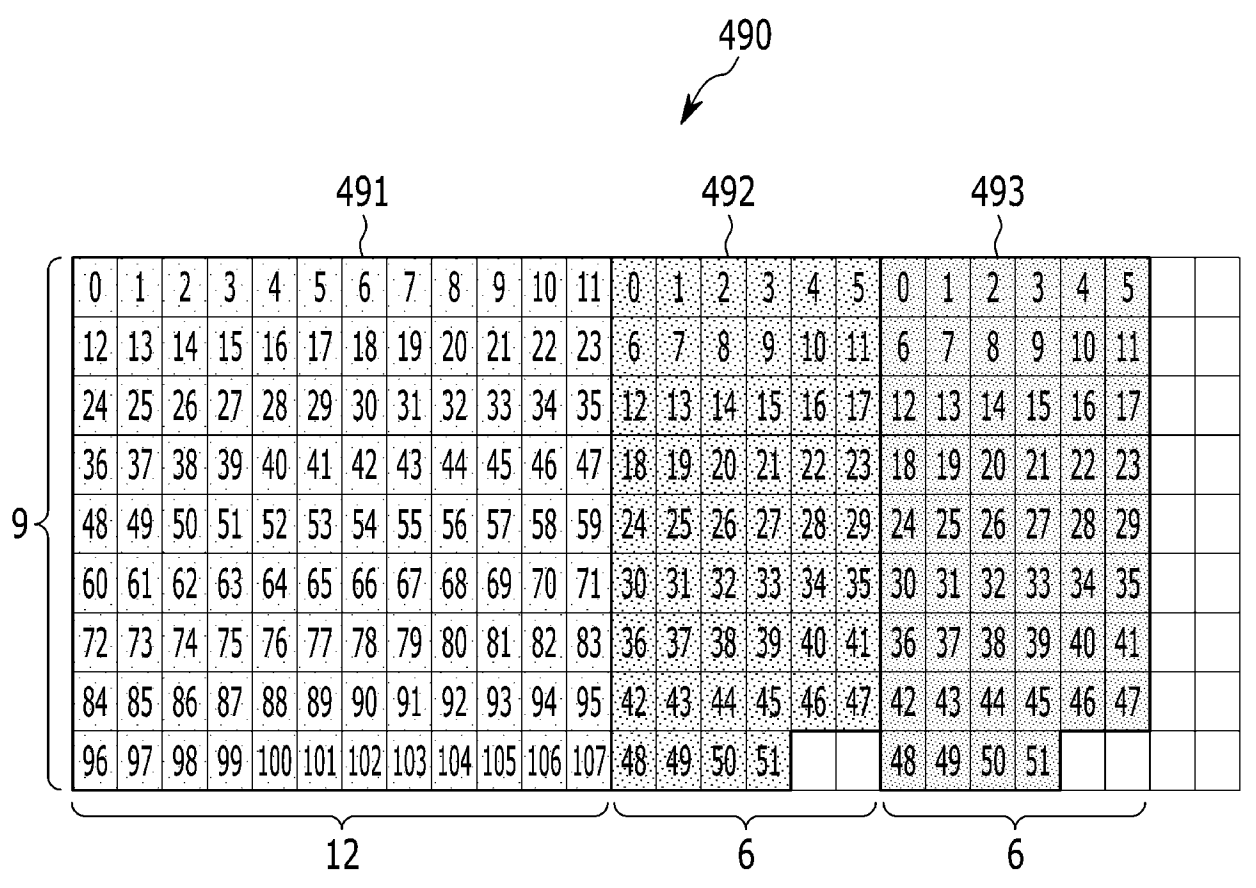
Figure 50:
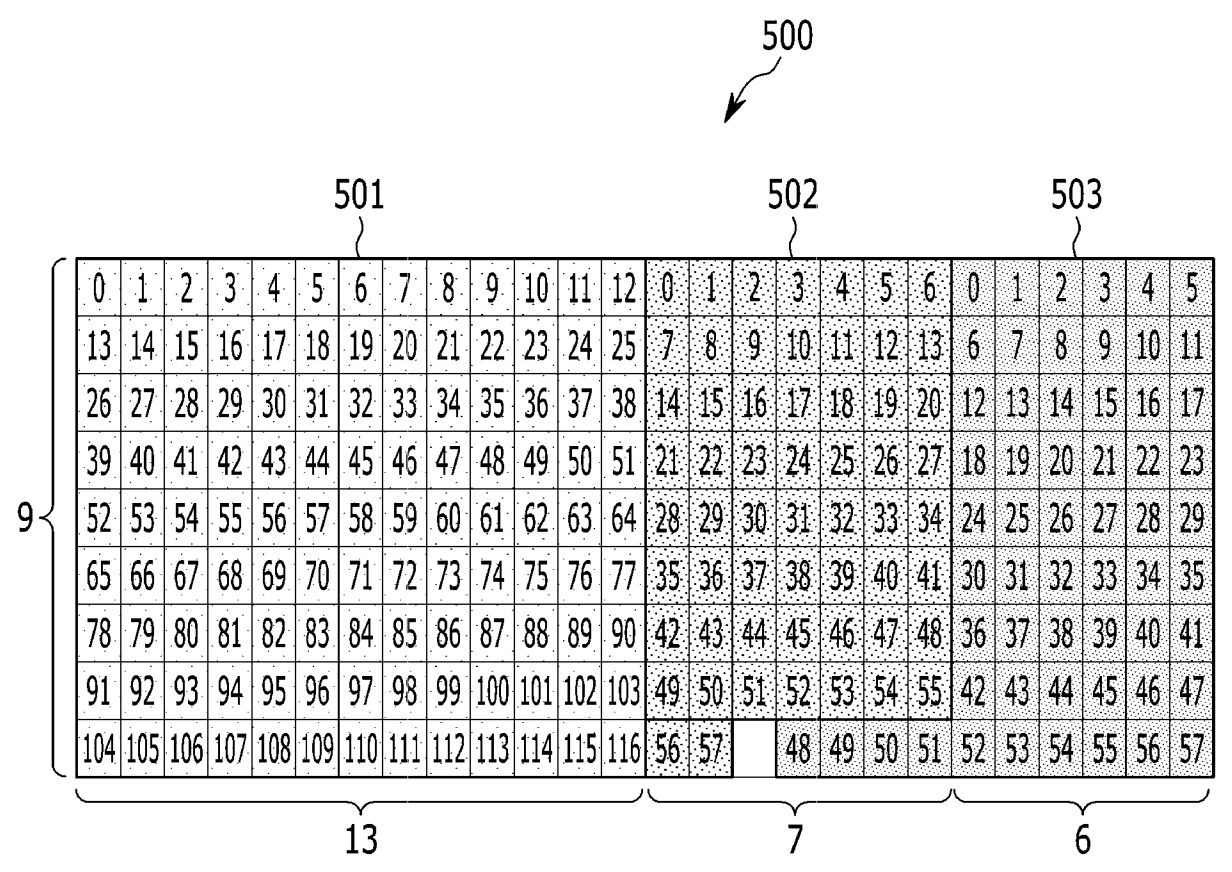
Figure 51:
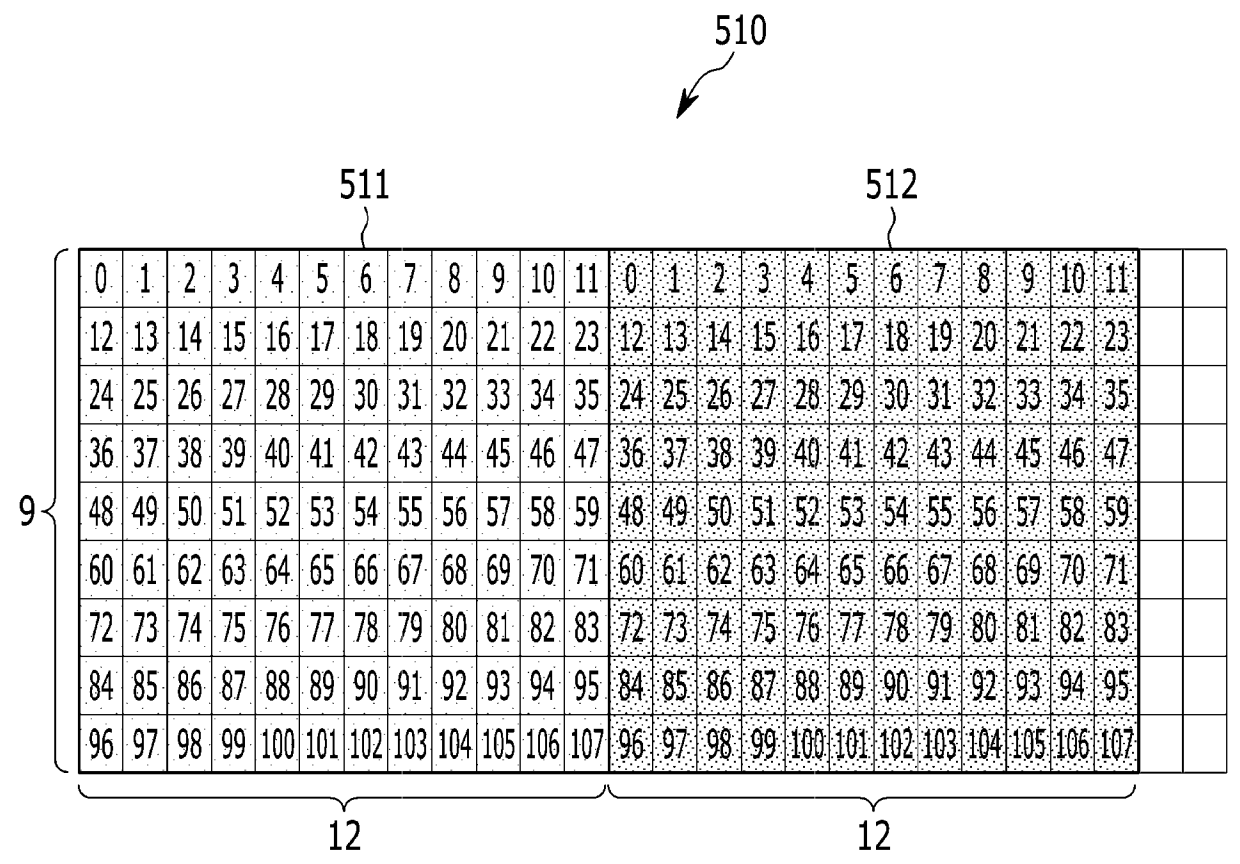
Figure 52:
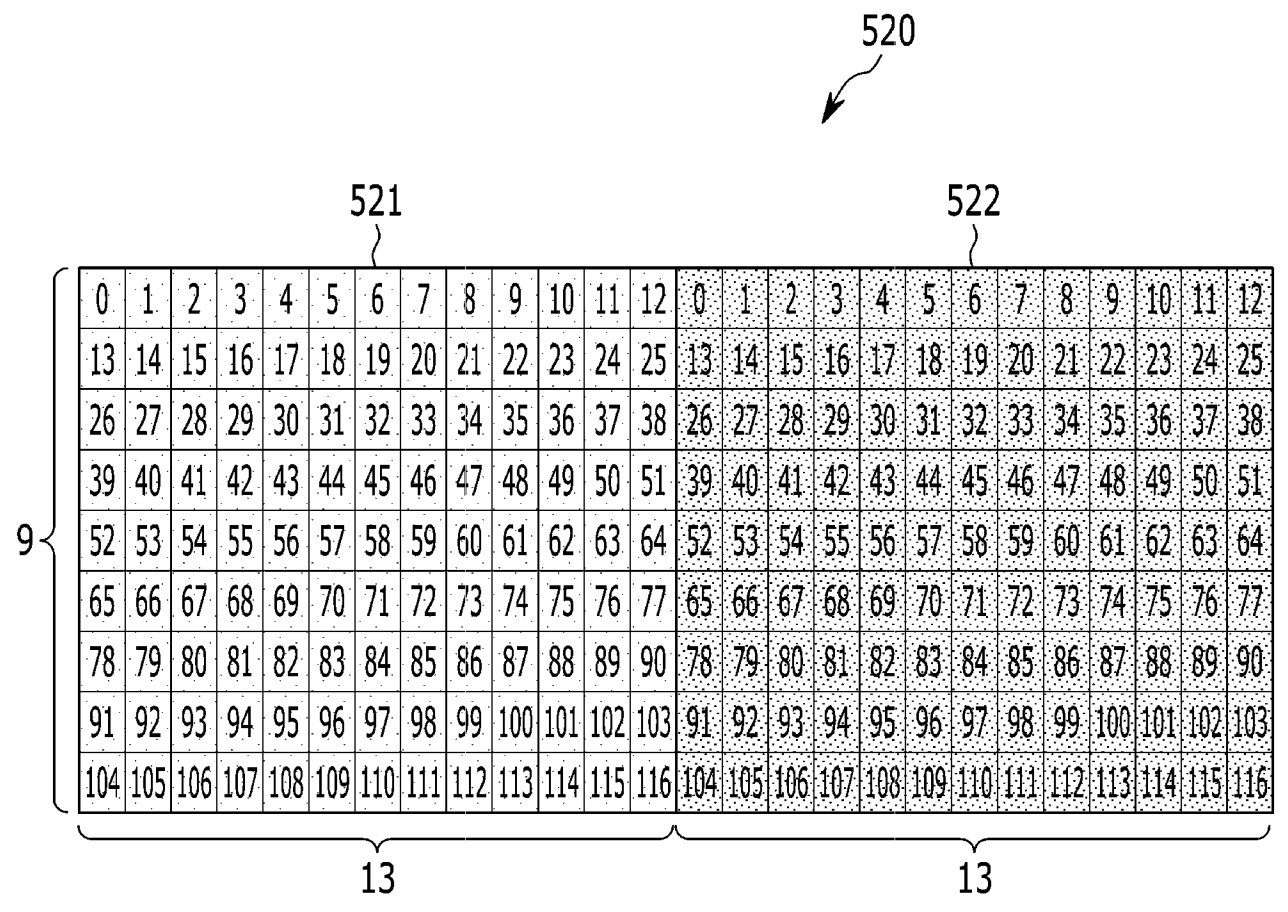
Figure 53:
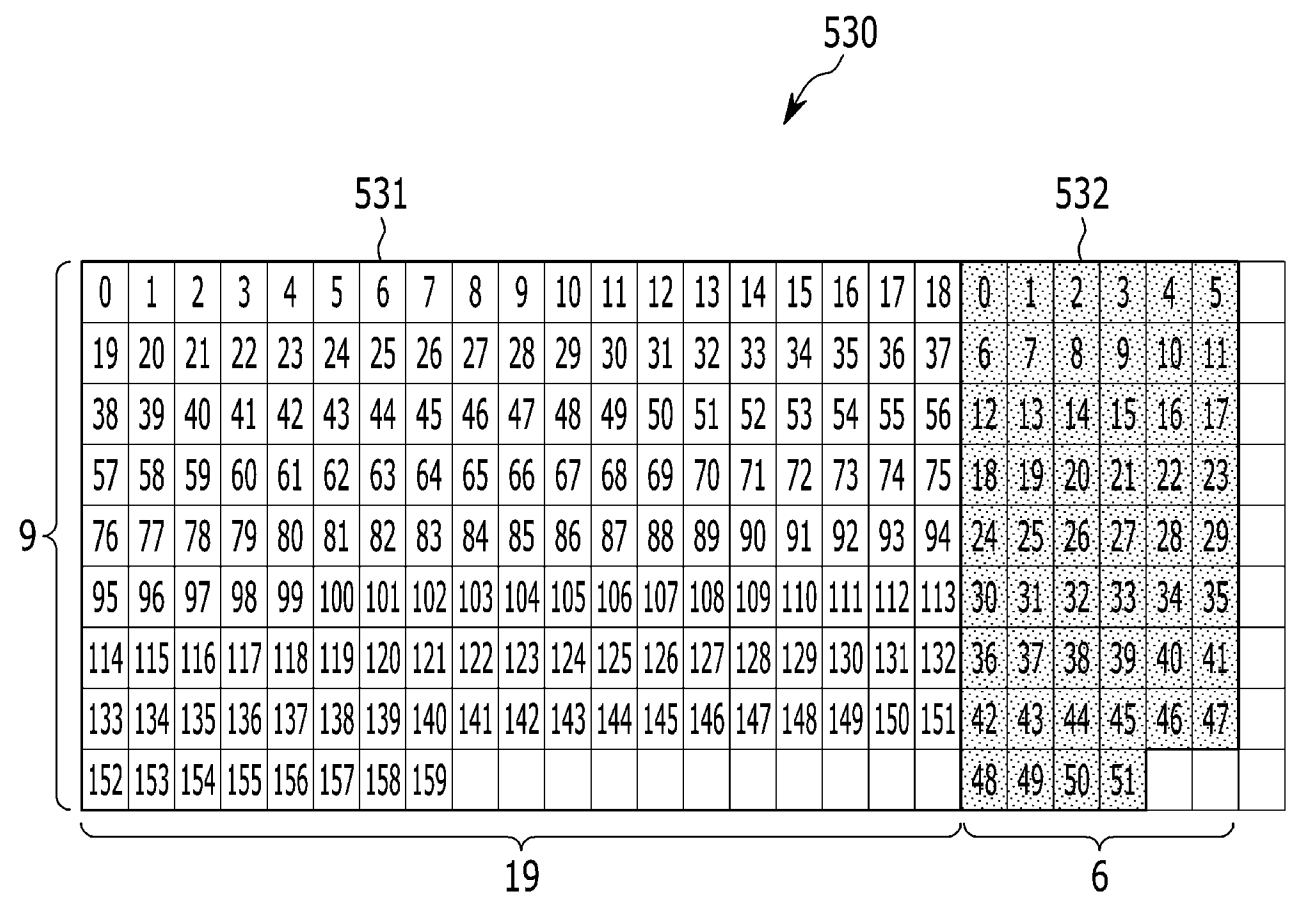
Figure 54:
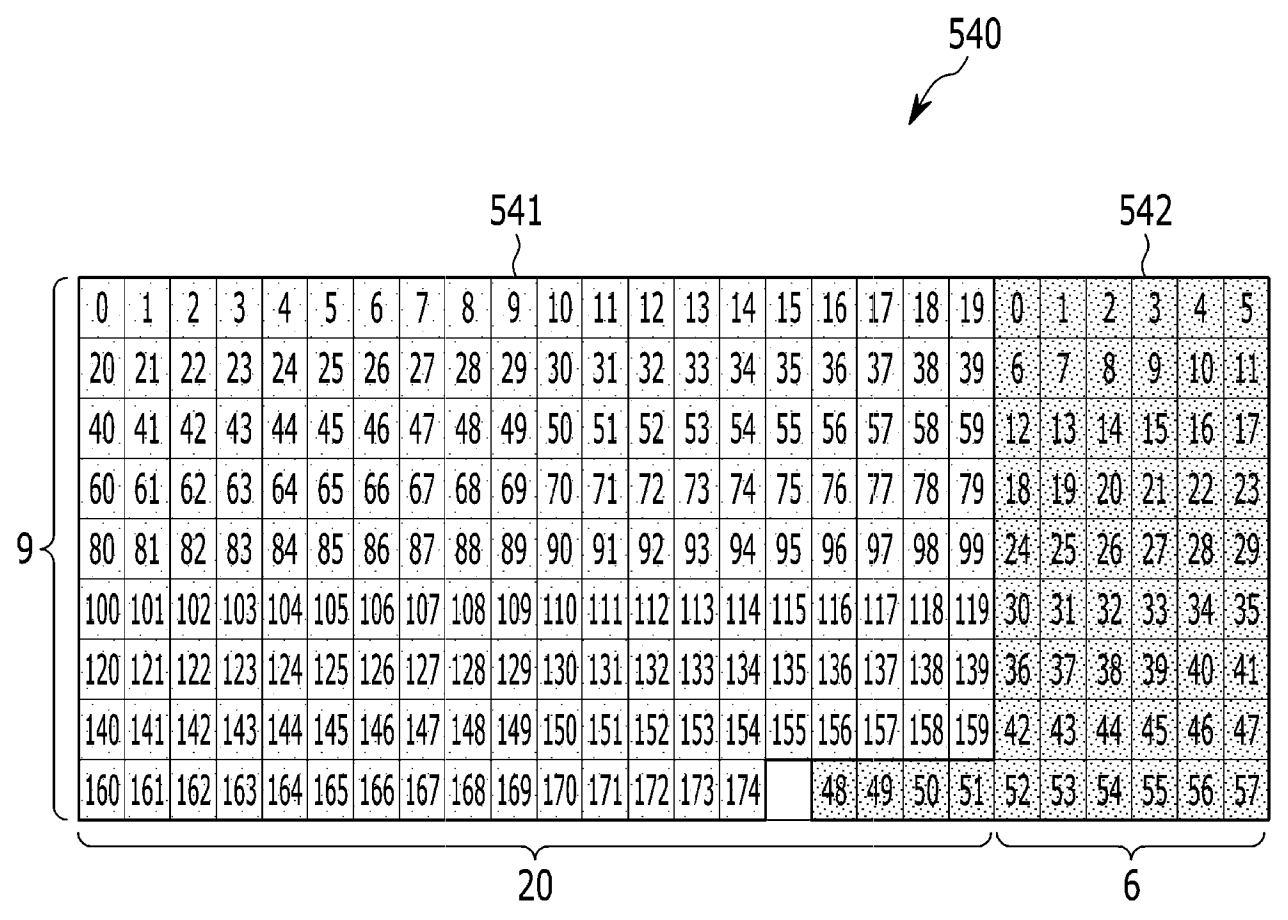

FIG. 45 and FIG. 46 show examples of an interleaver matrix being applicable to two bands of 20 MHz bandwidth in an OFDMA 40 MHz mode of a wireless communication network according to an embodiment of the present invention; FIG. 47 and FIG. 48 show examples of an interleaver matrix being applicable to four bands of 20 MHz bandwidth in an OFDMA 80 MHz mode of a wireless communication network according to an embodiment of the present invention; FIG. 49 and FIG. 50 show examples of an interleaver matrix being applicable to a band of 40 MHz bandwidth and two bands of 20 MHz bandwidth in an OFDMA 80 MHz mode of a wireless communication network according to an embodiment of the present invention; FIG. 51 and FIG. 52 show examples of an interleaver matrix being applicable to two bands of 40 MHz bandwidth in an OFDMA 80 MHz mode of a wireless communication network according to an embodiment of the present invention; and FIG. 53 and FIG. 54 show examples of an interleaver matrix being applicable to a band of 60 MHz bandwidth and a band of 20 MHz bandwidth in an OFDMA 80 MHz mode of a wireless communication network according to an embodiment of the present invention.

FIG. 45 to FIG. 54 exemplify a case that a band parser 720c shown in FIG. 10 uses an interleaver matrix of the previous WLAN.

Referring to FIG. 45, the band parser 720c may use an interleaver matrix 450 when transmitting data of user 0 on band 0 of 20 MHz bandwidth and data of user 1 on band 1 of 20 MHz bandwidth in the OFDMA 40 MHz mode. Each of the bands 0 and 1 of 20 MHz bandwidth can use 52 data tones like the previous WLAN, and the interleaver matrix 450 corresponds to a 6×18 matrix that is used in a 40 MHz transmission mode of the previous WLAN. The band parser 720c arranges the data of the user 0 on an interleaver memory in accordance with the first 6×9 matrix 451 that is an area allocated to the user 0 in the 6×18 matrix, and arranges the data of the user 1 on the interleaver memory in accordance with the second 6×9 matrix 452 that is an area allocated to the user 1 in the 6×18 matrix. Since the 52 data tones per 20 MHz bandwidth are used, remaining elements of each 6×9 matrix 451 or 452 are filled with nulls. Therefore, the interleaver matrix 450 includes four nulls.

In another embodiment, the number of nulls in the 6×18 interleaver matrix may be minimized in FIG. 45 such that each 20 MHz bandwidth can use 54 data tones. In this case, as shown in FIG. 46, a 6×9 matrix 461 is allocated to the user 0 and the 6×9 matrix 462 is allocated to the user 1 in a 6×18 interleaver matrix 460. Since the 54 data tones per 20 MHz bandwidth are used, the interleaver matrix 460 includes no null.

Referring to FIG. 47, the band parser 720c may use an interleaver matrix 470 when transmitting data of user 0 on band 0 of 20 MHz bandwidth, data of user 1 on band 1 of 20 MHz bandwidth, data of user 2 on band 2 of 20 MHz bandwidth, and data of user 3 on band 3 of 20 MHz bandwidth in the OFDMA 80 MHz mode. Each of the bands 0, 1, 2, and 3 of 20 MHz bandwidth can use 52 data tones like the previous WLAN, and the interleaver matrix 470 corresponds to a 9×26 matrix that is used in an 80 MHz transmission mode of the previous WLAN. Because each band uses the 52 data tones, a 9×6 matrix 471, 472, 473, or 474 is allocated to each user and a remaining 9×2 matrix is filled with nulls. Accordingly, the band parser 720c arranges the data of each user on an interleaver memory in accordance with a corresponding 9×6 matrix 471, 472, 473, or 474. Since remaining elements of each 9×6 matrix are also filled with nulls, the interleaver matrix 470 includes 26 nulls.

In another embodiment, the number of nulls in the 9×26 interleaver matrix may be minimized in FIG. 47 such that each 20 MHz bandwidth can use 58 data tones. In this case, as shown in FIG. 48, a 9×7 matrix 481 is allocated to the user 0, a 9×6 matrix 482 is allocated to the user 1, a 9×7 matrix 483 is allocated to the user 2, and a 9×6 matrix 484 is allocated to the user 3 in a 9×26 interleaver matrix 480. Accordingly, the band parser 720c arranges the data of each user on an interleaver memory in accordance with a corresponding matrix 481, 482, 483, or 484. As described with reference to FIG. 10, data of the different user can be input to the last row of each matrix. Accordingly, the data of the user 1 are arranged in remaining elements of the last row in the 9×7 matrix 481 allocated to the user 0, and the data of the user 3 are arranged in remaining elements of the last row in the 9×7 matrix 483 allocated to the user 2. As a result, the interleaver matrix 480 includes two nulls.

Referring to FIG. 49, the band parser 720c may use an interleaver matrix 490 when transmitting data of user 0 on band 0 of 40 MHz bandwidth, data of user 1 on band 1 of 20 MHz bandwidth, and data of user 2 on band 2 of 20 MHz bandwidth in the OFDMA 80 MHz mode. The band 0 of 40 MHz bandwidth can use 108 data tones and each of the bands 0 and 1 of 20 MHz bandwidth can use 52 data tones like the previous WLAN. Then, in the 9×26 interleaver matrix 490, a 9×12 matrix 491 is allocated to the user 0, a 9×6 matrix 492 is allocated to the user 1, a 9×6 matrix 493 is allocated to the user 2, and a remaining 9×2 matrix is filled with nulls. Accordingly, the band parser 720c arranges the data of each user on an interleaver memory in accordance with a corresponding matrix 491, 492, or 493. Since remaining elements of each 9×6 matrix 492 or 493 are filled with nulls, the interleaver matrix 490 includes 22 nulls.

In another embodiment, the number of nulls in the 9×26 interleaver matrix may be minimized in FIG. 49 such that the 40 MHz bandwidth can use 117 data tones and each 20 MHz bandwidth can use 58 data tones. In this case, as shown in FIG. 50, a 9×13 matrix 501 is allocated to the user 0, a 9×7 matrix 502 is allocated to the user 1, and a 9×6 matrix 503 is allocated to the user 2, in a 9×26 interleaver matrix 500. Accordingly, the band parser 720c arranges the data of each user on an interleaver memory in accordance with a corresponding matrix 501, 502, or 503. As described with reference to FIG. 10, since data of the different user can be input to the last row of each matrix, the data of the user 2 are arranged in remaining elements of the last row in the 9×7 matrix 502 allocated to the user 1. As a result, the interleaver matrix 500 includes one null.

Referring to FIG. 51, the band parser 720c may use an interleaver matrix 510 when transmitting data of user 0 on band 0 of 40 MHz bandwidth and data of user 1 on band 1 of 40 MHz bandwidth in the OFDMA 80 MHz mode. Each of the bands 0 and 1 of 40 MHz bandwidth can use 108 data tones like the previous WLAN. Then, in the 9×26 interleaver matrix 510, the first 9×12 matrix 511 is allocated to the user 0, the second 9×12 matrix 512 is allocated to the user 1, and a remaining 9×2 matrix is filled with nulls. Accordingly, the band parser 720c arranges the data of each user on an interleaver memory in accordance with a corresponding matrix 511 or 512. In this case, the interleaver matrix 510 includes 18 nulls.

In another embodiment, the number of nulls in the 9×26 interleaver matrix may be minimized in FIG. 51 such that each of the 40 MHz bandwidths can use 117 data tones. In this case, as shown in FIG. 52, the first 9×13 matrix 521 is allocated to the user 0 and the second 9×13 matrix 522 is allocated to the user 1 in a 9×26 interleaver matrix 520. The band parser 720c arranges the data of each user on an interleaver memory in accordance with a corresponding matrix 521 or 522. In this case, the interleaver matrix 520 includes no null.

Referring to FIG. 53, the band parser 720c may use an interleaver matrix 530 when transmitting data of user 0 on band 0 of 60 MHz bandwidth and data of user 1 on band 1 of 20 MHz bandwidth in the OFDMA 80 MHz mode. Since the previous WLAN uses 108 data tones in 40 MHz bandwidth and 52 data tones in 20 MHz bandwidth, the band 0 of 60 MHz bandwidth can use 160 (=108+52) data tones and the band 1 of 20 MHz bandwidth can use 52 data tones. Then, in the 9×26 interleaver matrix 530, a 9×19 matrix 531 is allocated to the user 0, a 9×6 matrix 532 is allocated to the user 1, and a remaining 9×1 matrix is filled with nulls. Accordingly, the band parser 720c arranges the data of each user on an interleaver memory in accordance with a corresponding matrix 531 or 532. Since remaining elements of the 9×19 matrix 531 and the 9×6 matrix 532 are filled with nulls, the interleaver matrix 530 includes 22 nulls.

In another embodiment, the number of nulls in the 9×26 interleaver matrix may be minimized in FIG. 53 such that the 20 MHz bandwidth can use 58 data tones and the 60 MHz bandwidth can use 175 (=117+58) data tones. In this case, as shown in FIG. 54, a 9×20 matrix 541 is allocated to the user 0 and a 9×6 matrix 542 is allocated to the user 1 in a 9×26 interleaver matrix 540. The band parser 720c arranges the data of each user on an interleaver memory in accordance with a corresponding matrix 541 or 542. As described with reference to FIG. 10, since data of the other user can be input to the last row of each matrix, the data of the user 1 are arranged in remaining elements of the last row in the 9×20 matrix 541 allocated to the user 0. As a result, the interleaver matrix 540 includes one null.

As described with reference to FIG. 45 to FIG. 54, the interleaver matrix of the previous WLAN can be used and the data of the same user can be substantially arranged in one column. Exceptionally, the data of the different user may be arranged together in the last row of a certain column.

Figure 55:
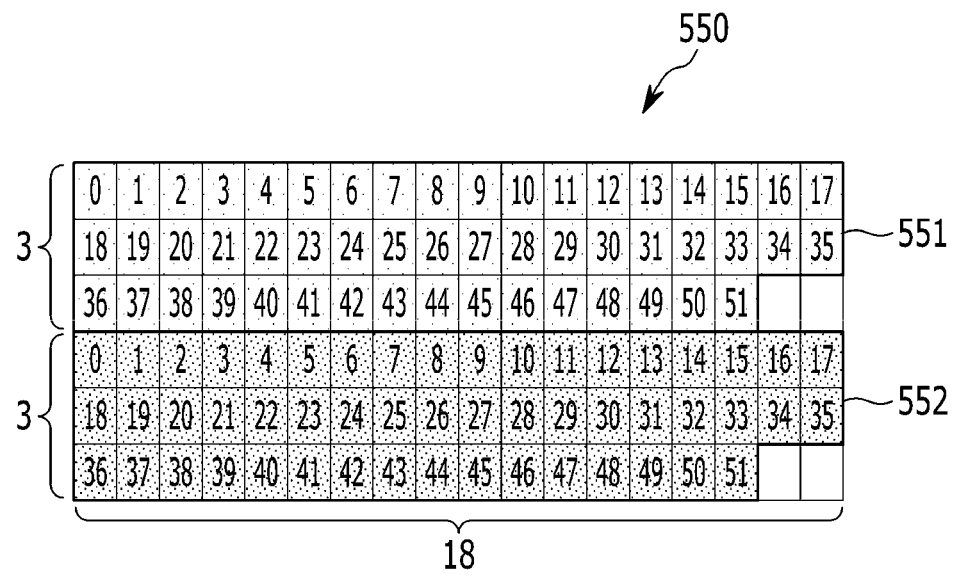
Figure 57:
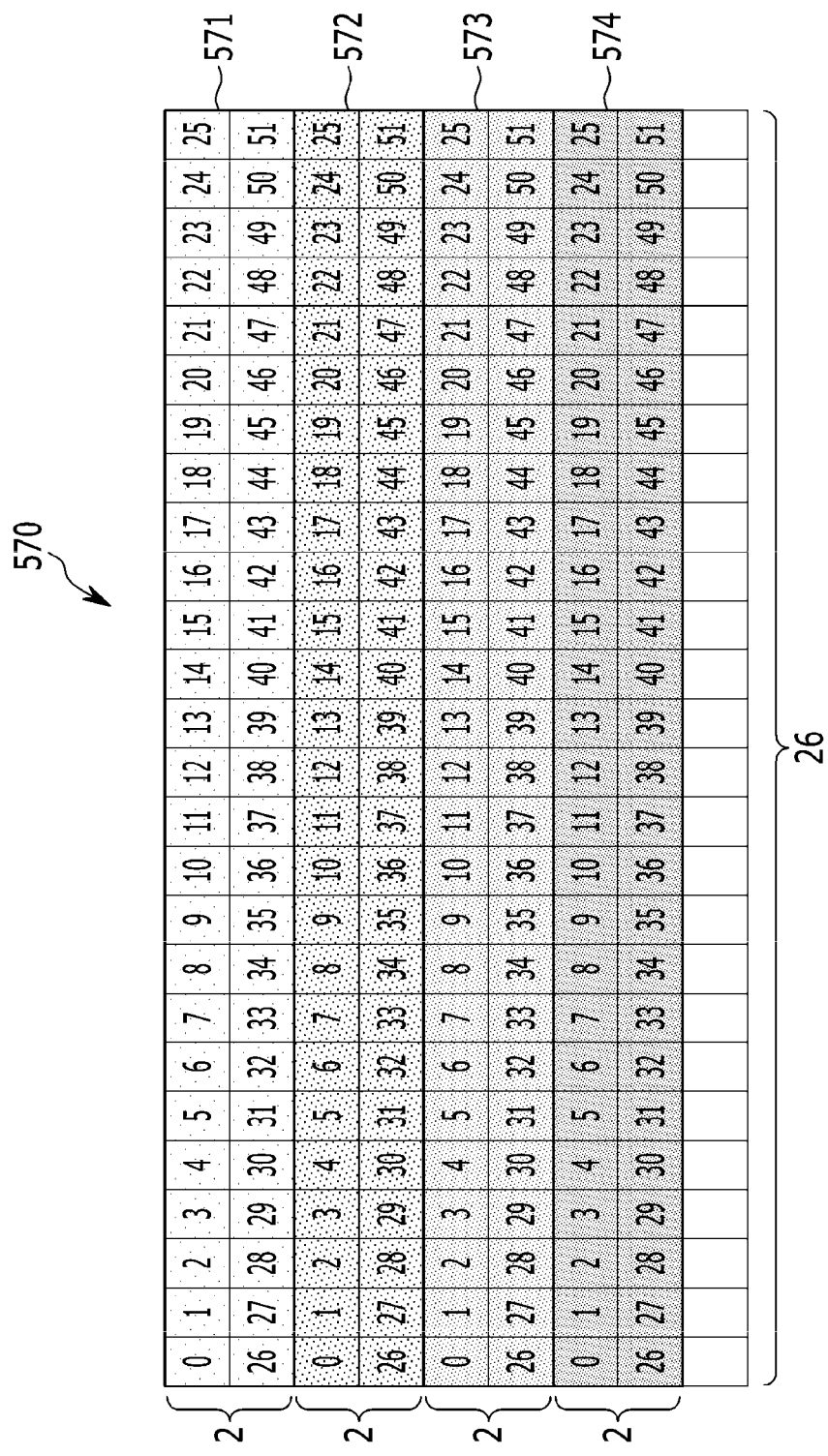
Figure 58:
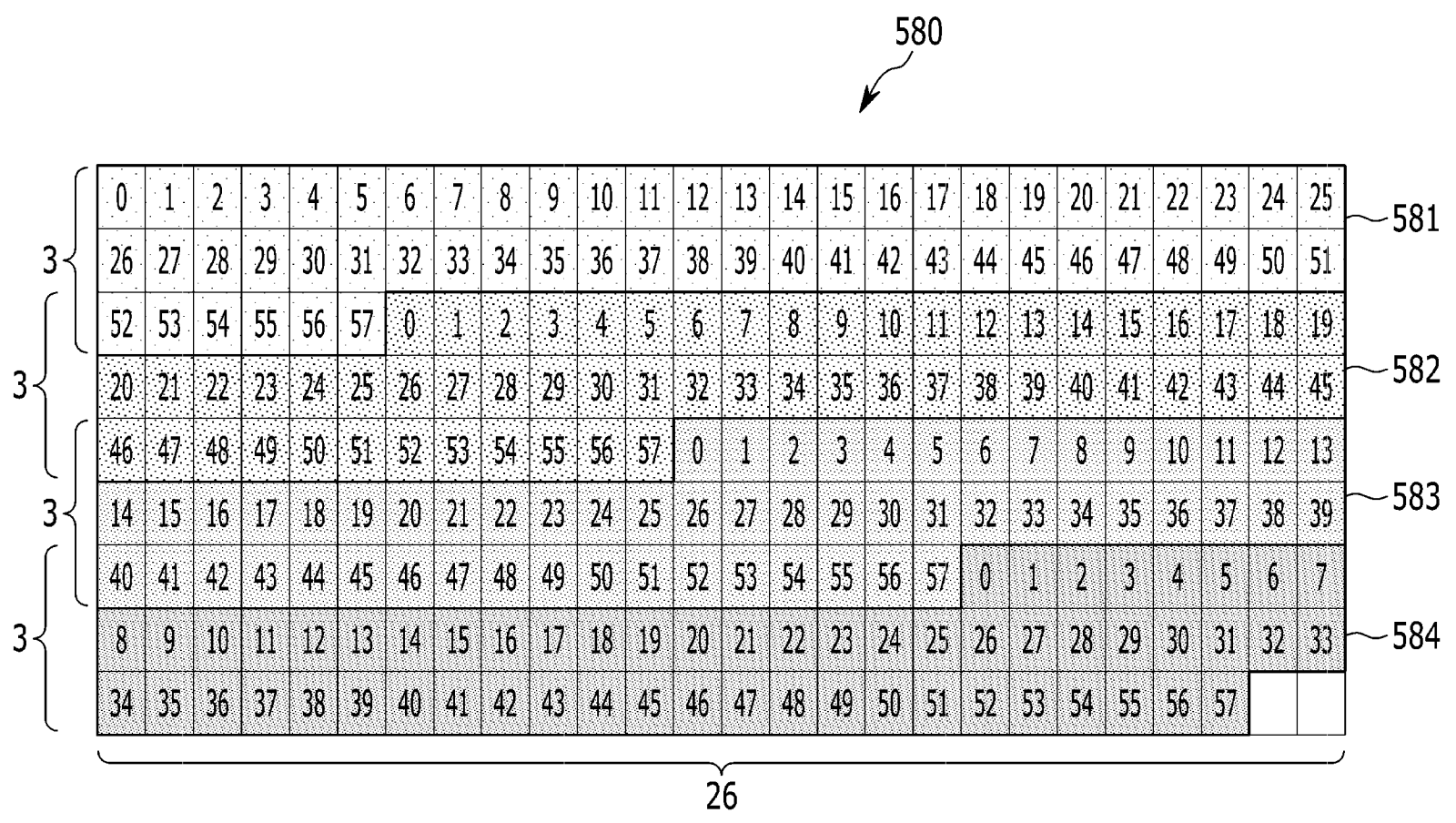
Figure 59:
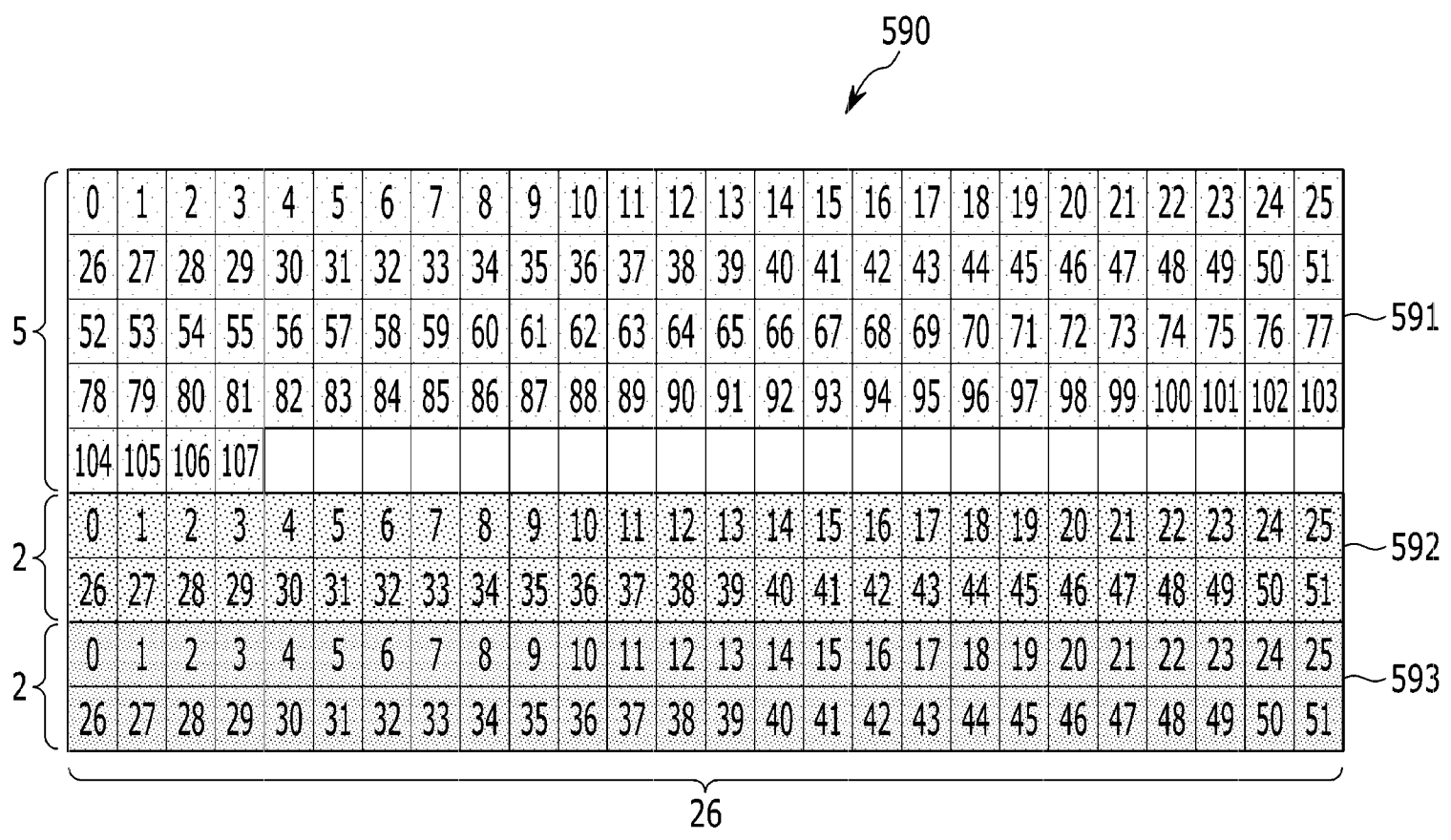
Figure 60:
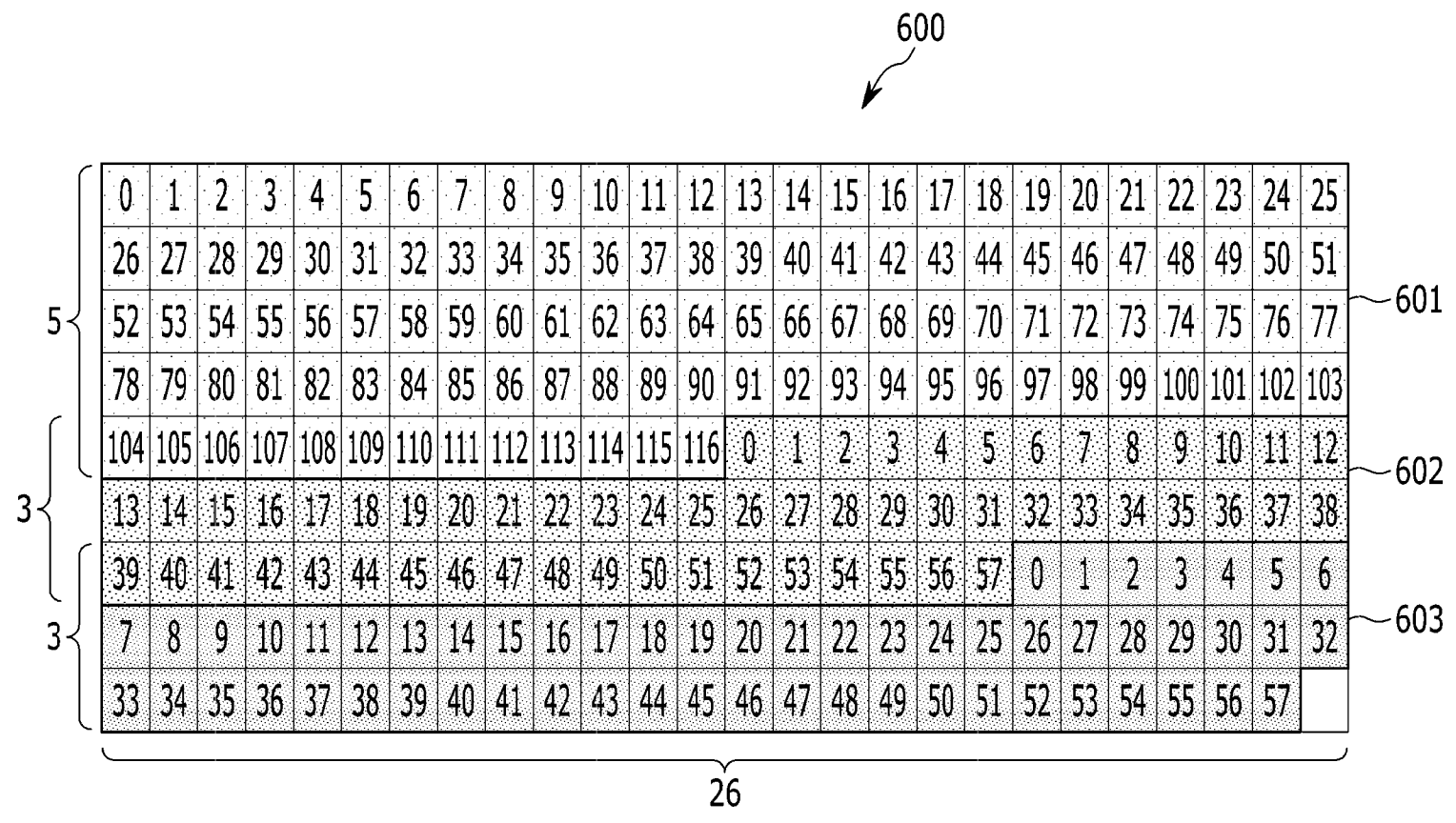
Figure 61:
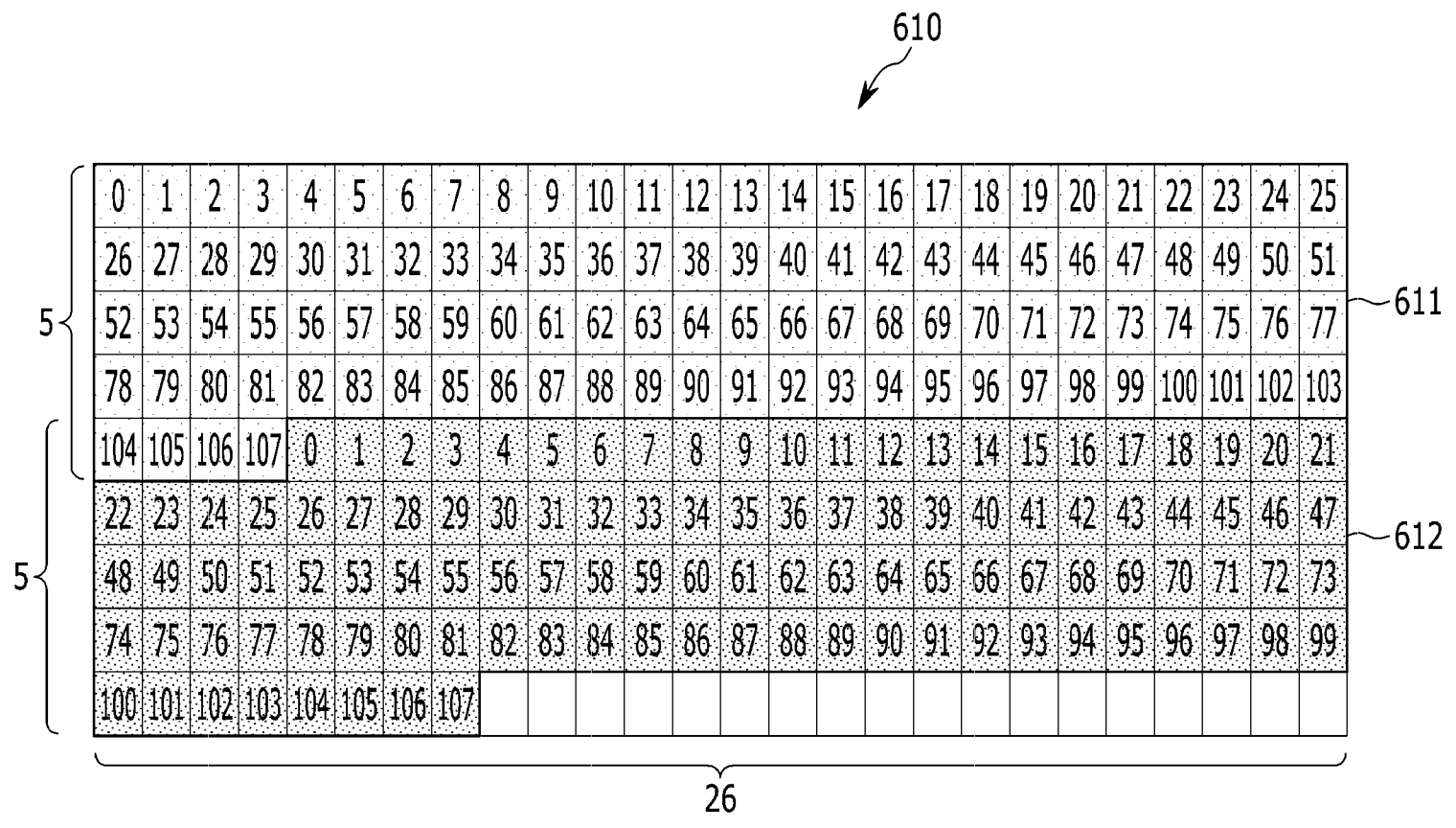
Figure 62:
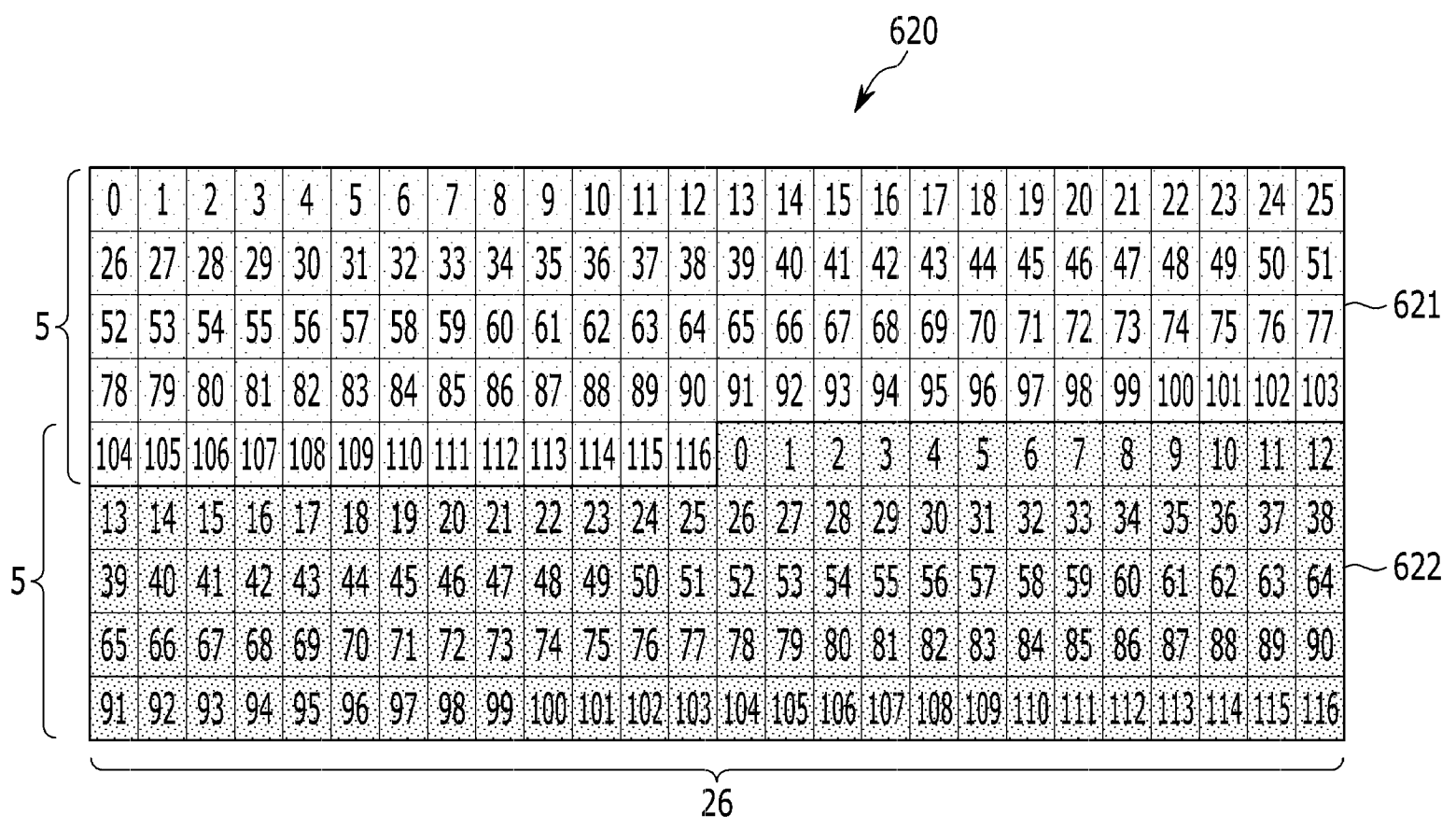

FIG. 55 and FIG. 56 show examples of an interleaver matrix being applicable to two bands of 20 MHz bandwidth in an OFDMA 40 MHz mode of a wireless communication network according to an embodiment of the present invention; FIG. 57 and FIG. 58 show examples of an interleaver matrix being applicable to four bands of 20 MHz bandwidth in an OFDMA 80 MHz mode of a wireless communication network according to an embodiment of the present invention; FIG. 59 and FIG. 60 show examples of an interleaver matrix being applicable to a band of 40 MHz bandwidth and two bands of 20 MHz bandwidth in an OFDMA 80 MHz mode of a wireless communication network according to an embodiment of the present invention; FIG. 61 and FIG. 62 show examples of an interleaver matrix being applicable to two bands of 40 MHz bandwidth in an OFDMA 80 MHz mode of a wireless communication network according to an embodiment of the present invention; and FIG. 63 and FIG. 64 show examples of an interleaver matrix being applicable to a band of 60 MHz bandwidth and a band of 20 MHz bandwidth in an OFDMA 80 MHz mode of a wireless communication network according to an embodiment of the present invention.

FIG. 45 to FIG. 54 exemplify a case that a band parser 720d shown in FIG. 11 uses an interleaver matrix of the previous WLAN.

Referring to FIG. 55, the band parser 720d may use an interleaver matrix 450 when transmitting data of user 0 on band 0 of 20 MHz bandwidth and data of user 1 on band 1 of 20 MHz bandwidth in the OFDMA 40 MHz mode. Each of the bands 0 and 1 of 20 MHz bandwidth can use 52 data tones like the previous WLAN, and the interleaver matrix 550 corresponds to a 6×18 matrix that is used in a 40 MHz transmission mode of the previous WLAN. The band parser 720d arranges the data of the user 0 on an interleaver memory in accordance with the first 3×18 matrix 551 that is an area allocated to the user 0 in the 6×18 matrix, and arranges the data of the user 1 on the interleaver memory in accordance with the second 3×18 matrix 552 that is an area allocated to the user 1 in the 6×18 matrix. Since the 52 data tones per 20 MHz bandwidth are used, remaining elements of each 3×18 matrix 551 or 552 are filled with nulls. Therefore, the interleaver matrix 450 includes four nulls.

In another embodiment, the number of nulls in the 6×18 interleaver matrix may be minimized in FIG. 55 such that each 20 MHz bandwidth can use 54 data tones. In this case, as shown in FIG. 46, a 3×18 matrix 561 is allocated to the user 0 and the a 3×18 matrix 562 is allocated to the user 1 in a 6×18 interleaver matrix 560. Since the 54 data tones per 20 MHz bandwidth are used, the interleaver matrix 560 includes no null.

Referring to FIG. 57, the band parser 720d may use an interleaver matrix 570 when transmitting data of user 0 on band 0 of 20 MHz bandwidth, data of user 1 on band 1 of 20 MHz bandwidth, data of user 2 on band 2 of 20 MHz bandwidth, and data of user 3 on band 3 of 20 MHz bandwidth in the OFDMA 80 MHz mode. Each of the bands 0, 1, 2, and 3 of 20 MHz bandwidth can use 52 data tones like the previous WLAN, and the interleaver matrix 570 corresponds to a 9×26 matrix that is used in an 80 MHz transmission mode of the previous WLAN. Because each band uses the 52 data tones, a 2×26 matrix 571, 572, 573, or 574 is allocated to each user and a remaining 1×26 matrix is filled with nulls. Accordingly, the band parser 720d arranges the data of each user on an interleaver memory in accordance with a corresponding 2×26 matrix 571, 572, 573, or 574. In this case, the interleaver matrix 570 includes 26 nulls.

In another embodiment, the number of nulls in the 9×26 interleaver matrix may be minimized in FIG. 57 such that each 20 MHz bandwidth can use 58 data tones. In this case, as shown in FIG. 58, a 3×26 matrix 581 is allocated to the user 0, a 3×26 matrix 582 is allocated to the user 1, a 3×26 matrix 583 is allocated to the user 2, and a 3×26 matrix 584 is allocated to the user 3 in a 9×26 interleaver matrix 580. As described with reference to FIG. 11, since data of the different user can be input to the first row and the last row of each matrix, the last row of the 3×26 matrix allocated to one user is overlapped with the first row of the 3×26 matrix allocated to the other user. The band parser 720d arranges the data of each user on an interleaver memory in accordance with a corresponding matrix 581, 582, 583, or 584. In the overlapped row, data of one user are arranged in some elements and data of the adjacent user are arranged in remaining elements. That is, the third row of the 3×26 matrix 581 corresponds to the first row of the 3×26 matrix 582, the data of the user 0 are arranged in this row, and the data of the user 1 are arranged in remaining elements of this row. The third row of the 3×26 matrix 582 corresponds to the first row of the 3×26 matrix 583, the data of the user 1 are arranged in this row, and then the data of the user 2 are arranged in remaining elements of this row. Further, the third row of the 3×26 matrix 583 corresponds to the first row of the 3×26 matrix 584, the data of the user 2 are arranged in this row, and the data of the user 3 are arranged in remaining elements of this row. As a result, the interleaver matrix 580 includes two nulls.

Referring to FIG. 59, the band parser 720d may use an interleaver matrix 590 when transmitting data of user 0 on band 0 of 40 MHz bandwidth, data of user 1 on band 1 of 20 MHz bandwidth, and data of user 2 on band 2 of 20 MHz bandwidth in the OFDMA 80 MHz mode. The band 0 of 40 MHz bandwidth can use 108 data tones and each of the bands 0 and 1 of 20 MHz bandwidth can use 52 data tones. Then, in the 9×26 interleaver matrix 590, a 5×26 matrix 591 is allocated to the user 0, a 2×26 matrix 592 is allocated to the user 1, and a 2×26 matrix 593 is allocated to the user 2. Accordingly, the band parser 720d arranges the data of each user on an interleaver memory in accordance with a corresponding matrix 591, 592, or 593. Since remaining elements of the 5×6 matrix 591 are filled with nulls, the interleaver matrix 590 includes 22 nulls.

In another embodiment, the number of nulls in the 9×26 interleaver matrix may be minimized in FIG. 59 such that the 40 MHz bandwidth can use 117 data tones and each 20 MHz bandwidth can use 58 data tones. In this case, as shown in FIG. 60, a 5×26 matrix 601 is allocated to the user 0, a 3×26 matrix 602 is allocated to the user 1, and a 3×26 matrix 603 is allocated to the user 2, in a 9×26 interleaver matrix 600. As described with reference to FIG. 11, since data of the different users can be input to the first row and the last row of each matrix, the last row of the 5×26 matrix 601 is overlapped with the first row of the 3 x26 matrix 602 allocated to the user 1 and the last row of the 3×26 matrix 602 allocated to the user 1 is overlapped with the first row of the 3×26 matrix 603 allocated to the user 2. The band parser 720d arranges the data of each user on an interleaver memory in accordance with a corresponding matrix 601, 602, or 603. Data of one user are arranged in the overlapped row and data of the adjacent user are arranged in remaining elements of the overlapped row. As a result, the interleaver matrix 600 includes one null.

Referring to FIG. 61, the band parser 720d may use an interleaver matrix 610 when transmitting data of user 0 on band 0 of 40 MHz bandwidth and data of user 1 on band 1 of 40 MHz bandwidth in the OFDMA 80 MHz mode. Each of the bands 0 and 1 of 40 MHz bandwidth can use 108 data tones. Then, in the 9×26 interleaver matrix 610, the first 5×26 matrix 611 is allocated to the user 0 and the second 5×26 matrix 612 is allocated to the user 1. The last row of the 5×26 matrix 611 allocated to the user 0 is overlapped with the first row of the 5×26 matrix 612 allocated to the user 1. The band parser 720d arranges the data of each user on an interleaver memory in accordance with a corresponding matrix 611 or 612. The data of the user 0 are arranged in the overlapped row and the data of the user 1 are arranged in remaining elements of the overlapped row. As a result, the interleaver matrix 610 includes 18 nulls.

In another embodiment, the number of nulls in the 9×26 interleaver matrix may be minimized in FIG. 61 such that each of the 40 MHz bandwidths can use 117 data tones. In this case, as shown in FIG. 62, the last row of a 5×26 matrix 621 allocated to the user 0 is overlapped with the first row of a 5×26 matrix 622 allocated to the user 1 in a 9×26 interleaver matrix 620. Since each of the 40 MHz bandwidths uses 117 data tones, the data of the user 0 correspond to a half of the overlapped row and the data of the user 1 correspond to the other half of the overlapped row. Accordingly, the interleaver matrix 620 includes no null.

Referring to FIG. 63, the band parser 720d may use an interleaver matrix 630 when transmitting data of user 0 on band 0 of 60 MHz bandwidth and data of user 1 on band 1 of 20 MHz bandwidth in the OFDMA 80 MHz mode. The band 0 of 60 MHz bandwidth can use 160 data tones and the band 1 of 20 MHz bandwidth can use 52 data tones. Then, in the 9×26 interleaver matrix 630, a 7×26 matrix 631 is allocated to the user 0 and a 3×26 matrix 632 is allocated to the user 1. The last row of the 7×26 matrix 631 allocated to the user 0 is overlapped with the first row of the 3×26 matrix 632 allocated to the user 1. The band parser 720d arranges the data of each user on an interleaver memory in accordance with a corresponding matrix 631 or 632. The data of the user 0 are arranged in the overlapped row and the data of the user 1 are arranged in remaining elements of the overlapped row. As a result, the interleaver matrix 630 includes 22 nulls.

In another embodiment, the number of nulls in the 9×26 interleaver matrix may be minimized in FIG. 63 such that the 20 MHz bandwidth can use 58 data tones and the 60 MHz bandwidth can use 175 data tones. In this case, as shown in FIG. 64, the last row of a 7×26 matrix 641 allocated to the user 0 is overlapped with the first row of a 3×26 matrix 642 allocated to the user 1 in a 9×26 interleaver matrix 640. The data of the user 0 correspond to 19 elements of the overlapped row and the data of the user 1 correspond to remaining 7 elements of the overlapped row. Accordingly, the interleaver matrix 640 includes no null.

As described with reference to FIG. 55 to FIG. 64, the interleaver matrix of the previous WLAN can be used and the data of the same user can be substantially arranged in one row. Exceptionally, the data of the different user may be arranged together in the first row and the last row of a matrix allocated to each user.

It has been assumed in FIG. 45 to FIG. 64 that the number $N_{BPSCS}$ of coded bits per subcarrier for all users is one. However, when the number $N_{BPSCS}$ of coded bits per subcarrier is not one, the interleaver matrix may be extended as described above.

As described with reference to FIG. 45 to FIG. 64, the band parser 720c or 720d can gather data of a user for each row or for each column without changing the interleaver matrix of the previous WLAN. Further, the above embodiments can use the same number of data tones per 20 MHz bandwidth as the previous WLAN. However, the above embodiments can increase the number of data tones thereby increasing a data rate.

While it has been described in the above embodiments of the present invention that 20 MHz bandwidth is a minimum bandwidth unit, a bandwidth being narrower or wider than 20 MHz bandwidth may be used as the minimum bandwidth unit. A FFT having a different size from the FFT of the previous WLAN used in the 20 MHz bandwidth may be used. For example, in some embodiments, the four times FFT may be used compared with the FFT of the previous WLAN. When 64 FFT is used in 20 MHz bandwidth of the previous WLAN, 256 FFT may be used in some embodiments.

In this case, the tone allocation and the number of data tones may be changed. However, the interleaver matrix of this case can be set based on the above described embodiments.

Next, an interleaving method in a wireless communication network according to an embodiment of the present invention is described.

Figure 65:
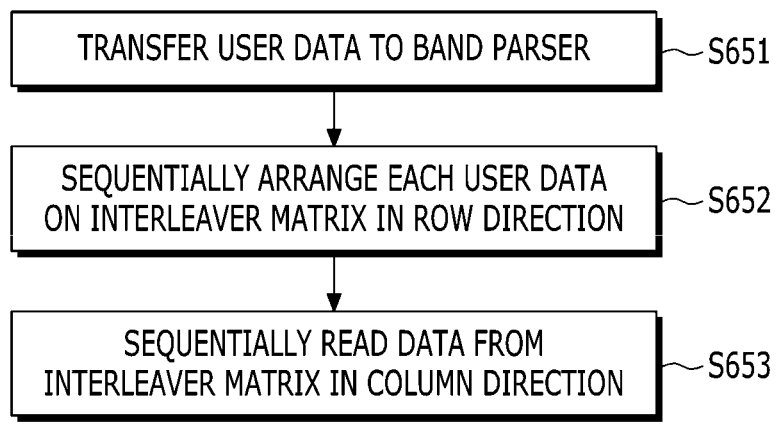
FIG. 65 is a flowchart exemplifying an interleaving method in a wireless communication network according to an embodiment of the present invention.
Figure 66:
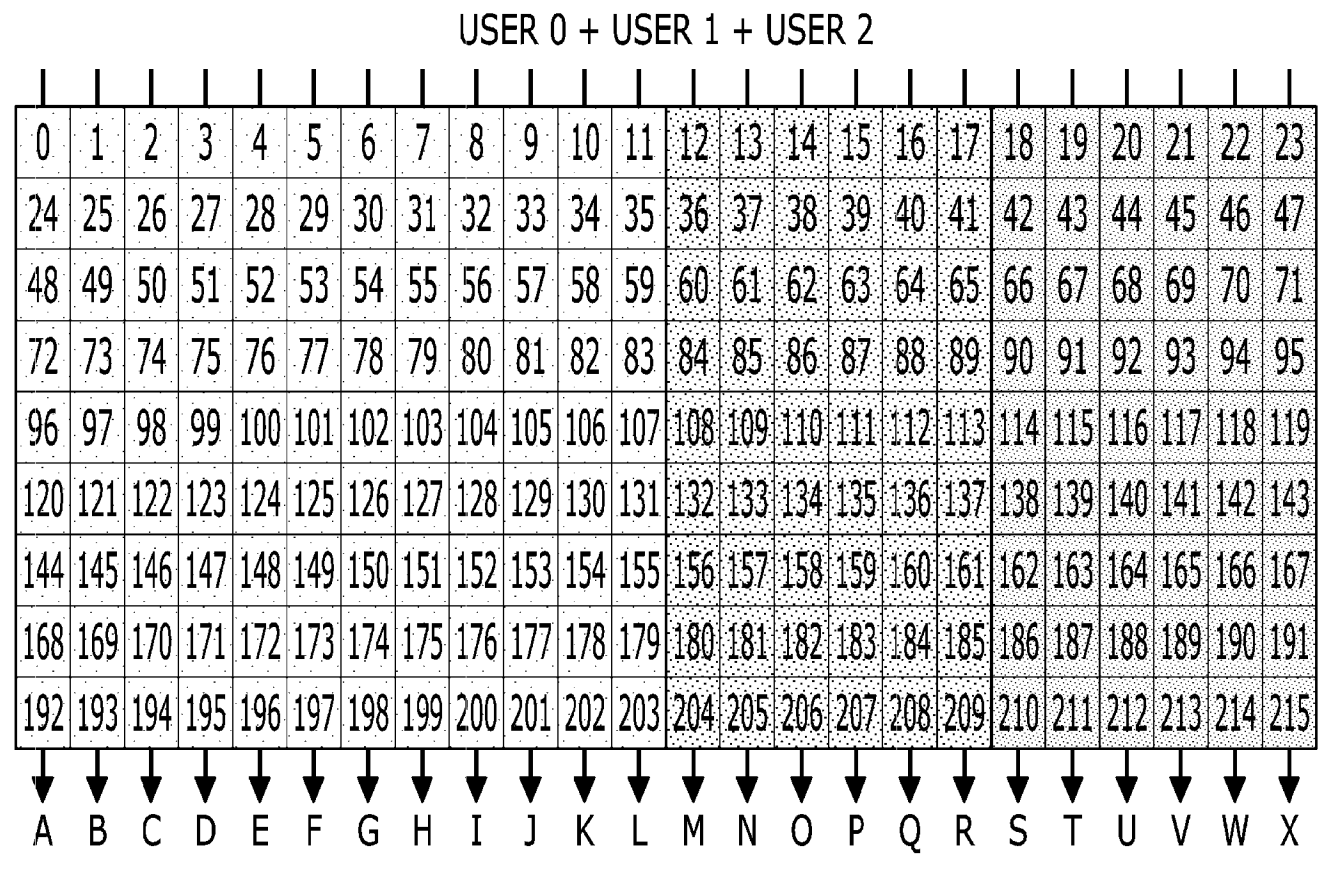

FIG. 65 is a flowchart exemplifying an interleaving method in a wireless communication network according to an embodiment of the present invention, and FIG. 66 and FIG. 67 show an example for explaining an interleaving method in a wireless communication network according to an embodiment of the present invention.

Referring to FIG. 65, a transmitting device transfers data of each user to a band parser (720 of FIG. 7) (S651). The data of each user transferred to the band parser 720 may be data output from a stream parser (714 of FIG. 7).

The band parser 720 of the transmitting device sequentially arranges the data of each user on an interleaver matrix in a row direction (S652). Next, an interleaver (730 of FIG. 7) of the transmitting device sequentially reads data from the interleaver matrix (i.e., an interleaver memory) in a column direction, thereby interleaving the data (S653). The transmitting device transfers the interleaved data to a mapper (740 of FIG. 7). The mapper 740 may allocate the data of each user to a corresponding band through tone mapping. Accordingly, the data of the same user can be allocated to the adjacent tones.

In some embodiments, sequentially arranging the data on the interleaver matrix means writing the data on the interleaver memory in accordance with an order of the interleaver matrix, and sequentially reading the data from the interleaver matrix means reading the data from the interleaver memory in accordance with an order of the interleaver matrix.

As exemplified in FIG. 66, the band parser 720 sequentially input data to a 9×24 interleaver matrix in the row direction. A numeral in FIG. 66 represents an input order of the data. When the 9×24 interleaver matrix is divided into a plurality of matrices in the row direction by a plurality of bands assigned to a plurality of users, data of one user are arranged in a corresponding area and then data of a next user are arranged in a corresponding area at each row. As exemplified in FIG. 23, when the 9×24 interleaver matrix is divided into a 9×12 matrix corresponding to user 0 and two 9×6 matrices corresponding to users 1 and 2, data of each user are sequentially input to a corresponding matrix in the row direction, from the first row to the last row. The interleaver 730 sequentially reads the data from the interleaver matrix in the column direction from the first column to the last column. An alphabet in FIG. 66 represents a reading order of the data. Accordingly, the interleaver 730 can read data of the same user each time reading the data in the column direction.

As another example, as shown in FIG. 67, the band parser 720 sequentially input data to a 9×26 interleaver matrix in the row direction. When the 9×26 interleaver matrix is divided into a plurality of matrices in the row direction by a plurality of bands assigned to a plurality of users, data for one symbol of one user are arranged in a corresponding area and then data for one symbol of a next user are arranged in a corresponding area. As exemplified in FIG. 61, when the 9×26 interleaver matrix is divided into a 5×26 matrix corresponding to user 0 and a 5×26 matrix corresponding to user 1 and the last row of the first 5×26 matrix is overlapped with the first row of the second 5×26 matrix, data of the user 0 are sequentially input to the first 5×26 matrix in the row direction and then data of the user 1 are sequentially input in the row direction beginning from empty area of the first 5×26 matrix. After sequentially reading the data from the area corresponding to the user 0 in the column direction from the first column to the last column, the interleaver 730 can read the data from the area corresponding to the user 1 in the column direction from the first column to the last column.

While it has been exemplified in FIG. 66 and FIG. 67 that data are sequentially read from the interleaver matrix in progressive mode, the data may be sequentially read in interlaced mode. In the interlaced mode, the data may be read in an order of the first column, the ($N_{col}/2$)+1)-th column, the second column, the ($N_{col}/2$)+2)-th column, . . . , the ($N_{col}/2$)-th column, and the $N_{col}$-th column. Alternatively, the data may be sequentially read in other modes. The data may be arranged on a deinterleaver matrix in a mode in which the data are read from the interleaver matrix.

Next, a deinterleaving method in a wireless communication network an embodiment of the present invention is described.

Figure 68:
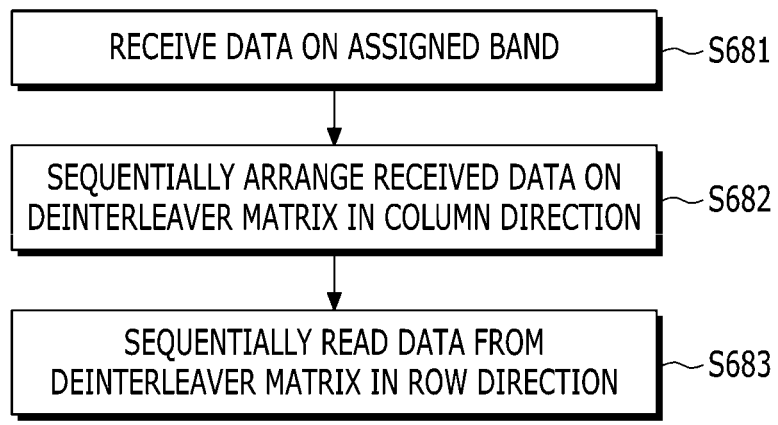
FIG. 68 and FIG. 70 are flowcharts exemplifying a deinterleaving method in a wireless communication network according to an embodiment of the present invention.
Figure 69:
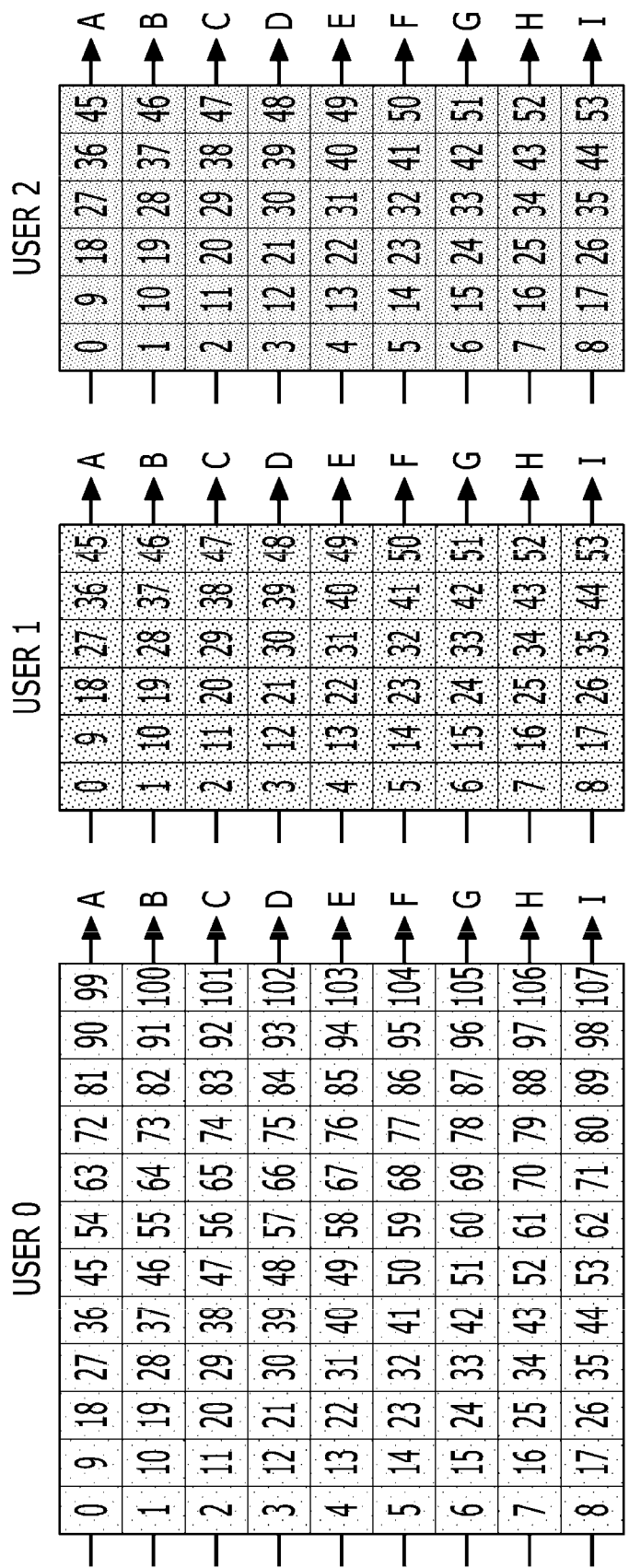
Figure 70:
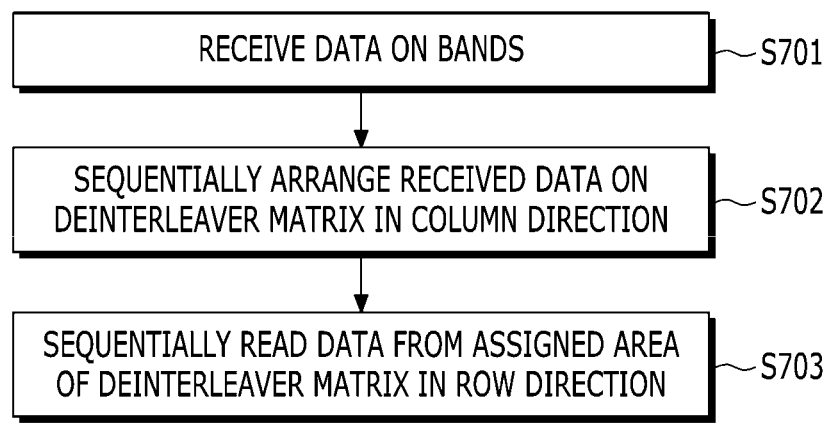
Figure 71:
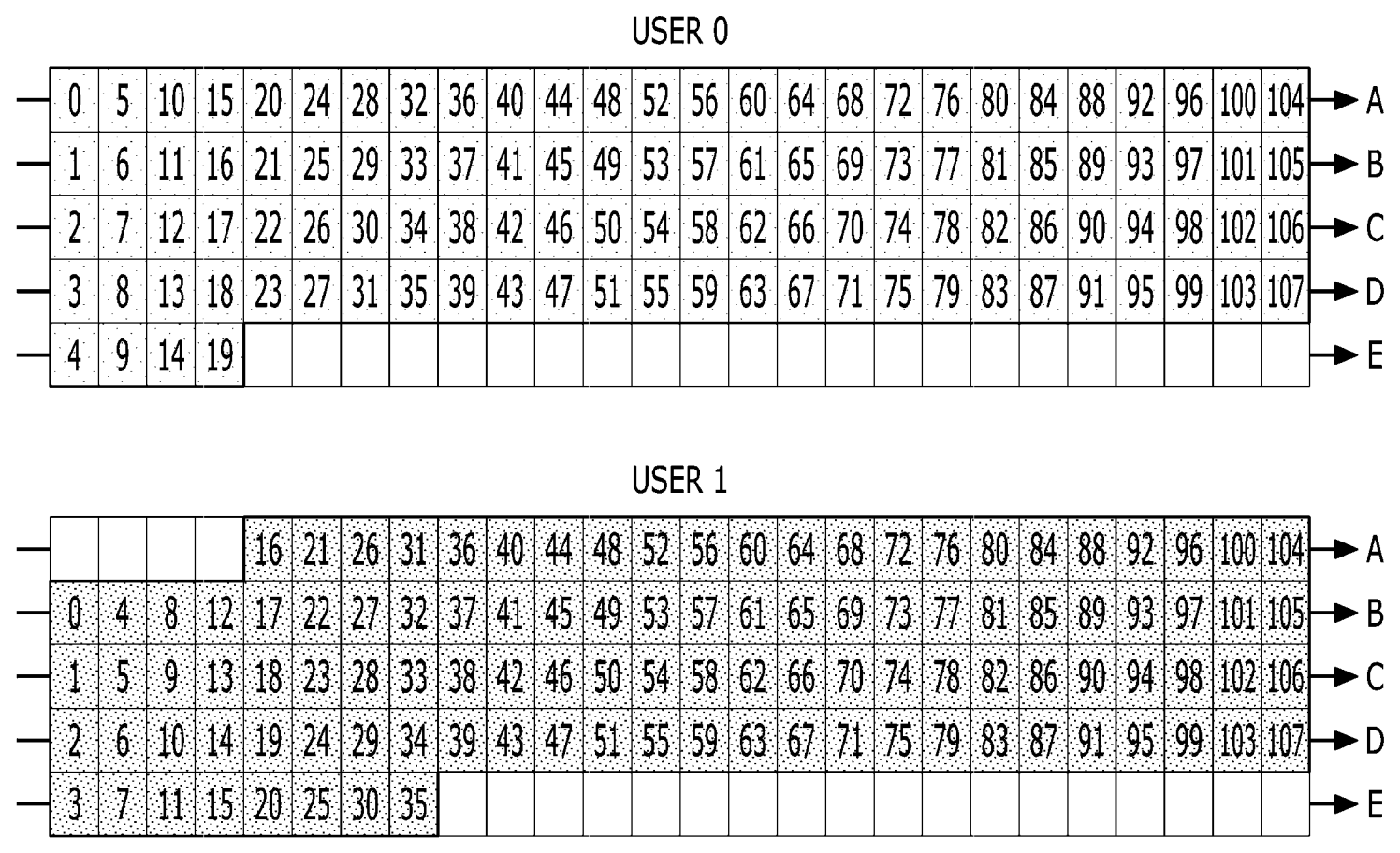

FIG. 68 and FIG. 70 are flowcharts exemplifying a deinterleaving method in a wireless communication network according to an embodiment of the present invention, and FIG. 69 and FIG. 71 show examples for explaining a deinterleaving method in a wireless communication network according to an embodiment of the present invention.

Referring to FIG. 68, when a transmitting device transmits data on a plurality of bands using a band parser (720*a* of FIG. 8 or 720*b* of FIG. 9), a receiving device receives data transmitted on a band assigned to the receiving device from among the data transmitted on the plurality of bands (S681). The receiving device may transfer the received data to a demapper (240 of FIG. 3), and the demapper 240 may extract user data that are allocated to tones of the band assigned to the receiving device, through a reverse process of the tone mapping.

The receiving device sequentially arranges the received data on a deinterleaver matrix in a column direction (S682). Next, a deinterleaver (250 of FIG. 3) of the receiving device sequentially reads data from the deinterleaver matrix in a row direction thereby deinterleaving the data (S683).

In some embodiments, sequentially arranging the data on the deinterleaver matrix means writing the data on the deinterleaver memory in accordance with an order of the deinterleaver matrix, and sequentially reading the data from the deinterleaver matrix means reading the data from the deinterleaver memory in accordance with an order of the deinterleaver matrix. In some embodiments, the deinterleaver matrix corresponds to the interleaver matrix.

For example, when data are interleaved as shown in FIG. 66 and then transmitted, a receiving device of user 0 sequentially arranges the received data of a corresponding band on a 9×12 deinterleaver matrix corresponding to the user 0 in the column direction, and sequentially reads data from the deinterleaver matrix in the row direction, as shown in FIG. 69. A receiving device of user 0 sequentially arranges the received data of a corresponding band on a 9×6 deinterleaver matrix corresponding to the user 1 in the column direction, and sequentially reads data from the deinterleaver matrix in the row direction. A receiving device of user 2 sequentially arranges the received data of a corresponding band on a 9×6 deinterleaver matrix corresponding to the user 2 in the column direction, and sequentially reads data from the deinterleaver matrix in the row direction.

Referring to FIG. 70, when a transmitting device transmits data on a plurality of bands using a band parser (720*c* of FIG. 10 or 720*d* of FIG. 11), a receiving device receives data transmitted on the plurality of bands (S701). The receiving device may transfer the received data to a demapper (240 of FIG. 3), and the demapper 240 may extract data that are allocated to tones of the plurality of bands, through a reverse process of the tone mapping.

The receiving device sequentially arranges the received data on a deinterleaver matrix in a column direction (S702). Next, a deinterleaver (250 of FIG. 3) of the receiving device sequentially reads data from an area, which is allocated to the receiving device in the deinterleaver matrix, in a row direction thereby deinterleaving the data (S703).

For example, when data are interleaved as shown in FIG. 67 and then transmitted, a receiving device of user 0 sequentially arranges the received data on a 9×26 deinterleaver matrix in the column direction, and sequentially reads data from a 5×26 deinterleaver matrix, which corresponds to the user 0 in the 9×26 deinterleaver matrix, in the row direction, as shown in FIG. 71. Further, a receiving device of user 1 sequentially arranges the received data on the 9×26 deinterleaver matrix in the column direction, and sequentially reads data from a 5×26 deinterleaver matrix, which corresponds to the user 1 in the 9×26 deinterleaver matrix, in the row direction.

An interleaving method or a deinterleaving method according to above embodiments of the present invention may be executed by a baseband processor 10 shown in FIG. 1 to FIG. 3. In some embodiments, instructions for executing the interleaving method or the deinterleaving method according to above embodiments of the present invention may be stored in a recording medium such as a memory 40. In some embodiments, at least some of the instructions may be MAC software. In some embodiments, at least some of the instructions may be transmitted from a recording medium of a certain server and may be stored in the memory 40.

While this disclosure has been described in connection with what is presently considered to be practical embodiments, it is to be understood that the invention is not limited to the disclosed embodiments, but, on the contrary, is intended to cover various modifications and equivalent arrangements included within the spirit and scope of the appended claims. Further, two or more embodiments may be combined.

What is claimed is:

1. An interleaving method by a transmitting device, the method comprising:
   dividing a bandwidth into a plurality of bands;
   assigning data of a plurality of users to the plurality of bands, respectively;
   dividing an interleaver matrix into a plurality of matrices corresponding to the plurality of bands respectively in a predetermined direction; and
   arranging data of each user of the plurality of users assigned to a corresponding band among the plurality of bands in each matrix of the plurality of matrices,
   wherein when a maximum number of coded bits per subcarrier for a certain user from among the plurality of users corresponding to a certain matrix from among the plurality of matrices is N, each row of the certain matrix is extended to N rows.

2. The method of claim 1, wherein a plurality of elements in each matrix correspond to a plurality of data tones in the corresponding band, respectively.

3. The method of claim 2, wherein arranging data of each user comprises filling an element that does not correspond to the data tones in the interleaver matrix with a null.

4. The method of claim 1, further comprising sequentially reading the arranged data from the interleaver matrix in a column direction,
   wherein arranging data of each user comprises sequentially arranging the data of a corresponding user in each matrix in a row direction.

5. The method of claim 1, wherein the predetermined direction is a row direction.

6. The method of claim 5, wherein the plurality of bands include a first band and a second band, the plurality of users include a first user assigned to the first band and a second user assigned to the second band, and the plurality of matrices include a first matrix and a second matrix,
   wherein arranging data of each user comprises:
   arranging data of the first user in the first matrix, and
   arranging data of the second user in the second matrix, and
   wherein the data of the first user are arranged in only the first matrix and the data of the second user are arranged in only the second matrix.

7. The method of claim 5, wherein the plurality of bands includes a first band and a second band, the plurality of users include a first user assigned to the first band and a second user assigned to the second band, and the plurality of matrices include a first matrix and a second matrix,
   wherein arranging data of each user comprises:
   arranging data of the first user in the first matrix, and
   arranging data of the second user in the second matrix, and
   wherein a part of the data of the second user is arranged in a last row of the first matrix.

8. The method of claim 5, wherein a number of columns in each matrix is substantially proportional to a bandwidth of the corresponding band.

9. The method of claim 5, wherein arranging data of each user comprises filling with a null (N-M) rows among the extended N rows in each row of a matrix corresponding to a user whose number of coded bits per subcarrier is M being less than N.

10. The method of claim 1, wherein the predetermined direction is a column direction.

11. The method of claim 10, wherein the plurality of bands include a first band and a second band, the plurality of users include a first user assigned to the first band and a second user assigned to the second band, and the plurality of matrices include a first matrix and a second matrix,
    wherein arranging data of each user comprises:
    arranging data of the first user in the first matrix, and
    arranging data of the first user in the first matrix, and
    arranging data of the second user in the second matrix, and
    wherein the data of the first user are arranged in only the first matrix and the data of the second user are arranged in only the second matrix.

12. The method of claim 10, wherein the plurality of bands includes a first band and a second band, the plurality of users include a first user assigned to the first band and a second user assigned to the second band, and the plurality of matrices include a first matrix and a second matrix,
    wherein arranging data of each user comprises:
    arranging data of the first user in the first matrix, and
    arranging data of the second user in the second matrix, and
    wherein a last row of the first matrix is overlapped with an initial row of the second matrix, and
    a part of the data of the first user and a part of the data of the second user are arranged in the overlapped row.

13. The method of claim 10, wherein a number of rows in each matrix is substantially proportional to a bandwidth of the corresponding band.

14. A deinterleaving method by a receiving device, the method comprising:
    receiving data of a band corresponding to a user of a plurality of users of the receiving device from among data that are transmitted on a plurality of bands by a transmitting device;
    sequentially arranging the received data on a deinterleaver matrix in a column direction; and
    sequentially reading data from the deinterleaver matrix in a row direction,
    wherein the data transmitted on the plurality of bands are interleaved by an interleaver matrix that is divided into a plurality of matrices corresponding to the plurality of bands respectively in a predetermined direction, data of each user of the plurality of users assigned to a corresponding band among the plurality of bands are arranged in each matrix of the plurality of matrices, and, when a maximum number of coded bits per subcarrier for a certain user from among the plurality of users corresponding to a certain matrix from among the plurality of matrices is N, each row of the certain matrix is extended to N rows.

15. A deinterleaving method by a receiving device, the method comprising:
   receiving data that are transmitted on a plurality of bands by a transmitting device;
   sequentially arranging the receiving data on a deinterleaver matrix in a column direction; and
   sequentially reading data from an area, which corresponds to a user of a plurality of users of the receiving device in the deinterleaver matrix, in a row direction,
   wherein the data transmitted on the plurality of bands are interleaved by an interleaver matrix that is divided into a plurality of matrices corresponding to the plurality of bands respectively in a predetermined direction, data of each user of the plurality of users assigned to a corresponding band among the plurality of bands are arranged in each matrix of the plurality of matrices, and, when a maximum number of coded bits per subcarrier for a certain user from among the plurality of users corresponding to a certain matrix from among the plurality of matrices is N, each row of each matrix of the plurality of matrices is extended to N rows.

16. The method of claim 15, wherein the predetermined direction is a row direction, and
   wherein the plurality of matrices include a first matrix and a second matrix, and the interleaver matrix is designed to allow a part of data of a user corresponding to the second matrix to be arranged in a last row of the first matrix.

17. The method of claim 15, wherein the predetermined direction is a column direction,
   wherein the plurality of matrices include a first matrix and a second matrix, and the interleaver matrix is designed to allow a last row of the first matrix to be overlapped with an initial row of the second matrix.

* * * * *